United States Patent
Driant

(10) Patent No.: US 11,162,462 B2
(45) Date of Patent: Nov. 2, 2021

(54) AIR INTAKE SYSTEM FOR A VEHICLE

(71) Applicant: BOMBARDIER RECREATIONAL PRODUCTS INC., Valcourt (CA)

(72) Inventor: Thomas Driant, Saint-Denis-de-Brompton (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 154 days.

(21) Appl. No.: 16/564,992

(22) Filed: Sep. 9, 2019

(65) Prior Publication Data

US 2020/0080523 A1 Mar. 12, 2020

Related U.S. Application Data

(60) Provisional application No. 62/728,735, filed on Sep. 7, 2018.

(51) Int. Cl.
*F02M 35/10* (2006.01)
*B62K 5/027* (2013.01)
(Continued)

(52) U.S. Cl.
CPC ....... *F02M 35/10262* (2013.01); *B01D 45/08* (2013.01); *B01D 46/0027* (2013.01);
(Continued)

(58) Field of Classification Search
CPC ....... F02M 35/10262; F02M 35/10229; F02M 35/046; F02M 35/161; F02M 35/10144; F02M 35/024; F02M 35/162; F16H 9/16; F16H 57/0416; B01D 2279/60; B01D 46/10; B01D 46/0005; B01D 46/0027; B01D 45/08; Y02T 10/12; B62K 11/04; B62K 5/027; B62K 5/06; B62K 5/08; B62K 5/05; B60K 15/03; B60K 17/22; B60K 17/24; B60K 5/12; B60K 1/00; B60K 5/02; B60K 5/04; B60K 13/02; B60K 17/06;
(Continued)

(56) References Cited

U.S. PATENT DOCUMENTS 3,148,043 A * 9/1964 Richardson ............ B01D 45/08
55/306
5,088,388 A * 2/1992 Schaefer ............. F24F 13/1413
454/270

(Continued)

*Primary Examiner* — Darlene P Condra
(74) *Attorney, Agent, or Firm* — BCF LLP

(57) ABSTRACT

An air intake system for a vehicle has a conduit having an internal wall forming an air passage. A deflector is disposed within the air passage. A restricting structure is disposed within the air passage between the deflector and a conduit outlet. The restricting structure defines at least in part an opening substantially laterally aligned with the deflector. The restricting structure has a lateral wall disposed downstream of the deflector and extending within the air passage. The lateral wall has a front surface generally facing a conduit inlet, and a plurality of surface-increasing features provided on the front surface. Each of the surface-increasing features has a length of at least 1 mm measured from the front surface in a direction normal thereto. An air intake system having a collector connected to the deflector and positioned to collect at least some moisture from air flowing past the deflector is also described.

20 Claims, 74 Drawing Sheets

(51) Int. Cl.
| | |
|---|---|
| B62K 5/06 | (2006.01) |
| B62K 5/08 | (2006.01) |
| B60K 5/04 | (2006.01) |
| B60K 13/02 | (2006.01) |
| F02M 35/04 | (2006.01) |
| F02M 35/16 | (2006.01) |
| B60K 17/06 | (2006.01) |
| F02M 35/024 | (2006.01) |
| B01D 46/00 | (2006.01) |
| B01D 45/08 | (2006.01) |
| F16H 9/16 | (2006.01) |
| F16H 57/04 | (2010.01) |
| B62K 5/05 | (2013.01) |

(52) U.S. Cl.
CPC ............... *B60K 5/04* (2013.01); *B60K 13/02* (2013.01); *B60K 17/06* (2013.01); *B62K 5/027* (2013.01); *B62K 5/05* (2013.01); *B62K 5/06* (2013.01); *B62K 5/08* (2013.01); *F02M 35/024* (2013.01); *F02M 35/046* (2013.01); *F02M 35/10144* (2013.01); *F02M 35/10229* (2013.01); *F02M 35/161* (2013.01); *F02M 35/162* (2013.01); *F16H 9/16* (2013.01); *F16H 57/0416* (2013.01); *B01D 2279/60* (2013.01)

(58) Field of Classification Search
CPC .......... B60Y 2200/12; B60Y 2200/122; B60Y 2400/72; B60Y 2306/05
See application file for complete search history.

(56) References Cited

U.S. PATENT DOCUMENTS

| | | | | |
|---|---|---|---|---|
| 5,899,196 | A * | 5/1999 | Chite | F02M 31/064 123/556 |
| 2010/0050578 | A1* | 3/2010 | Khouw | B01D 45/02 55/290 |
| 2011/0017535 | A1* | 1/2011 | Salvesen | F02M 35/08 180/68.3 |
| 2014/0130677 | A1* | 5/2014 | Guerry | B01D 45/08 96/383 |
| 2015/0274003 | A1* | 10/2015 | Laakso | F02M 35/04 180/68.3 |
| 2018/0347522 | A1* | 12/2018 | Ooki | F02M 35/104 |
| 2020/0049082 | A1* | 2/2020 | Hjelm | B60K 13/02 |

* cited by examiner

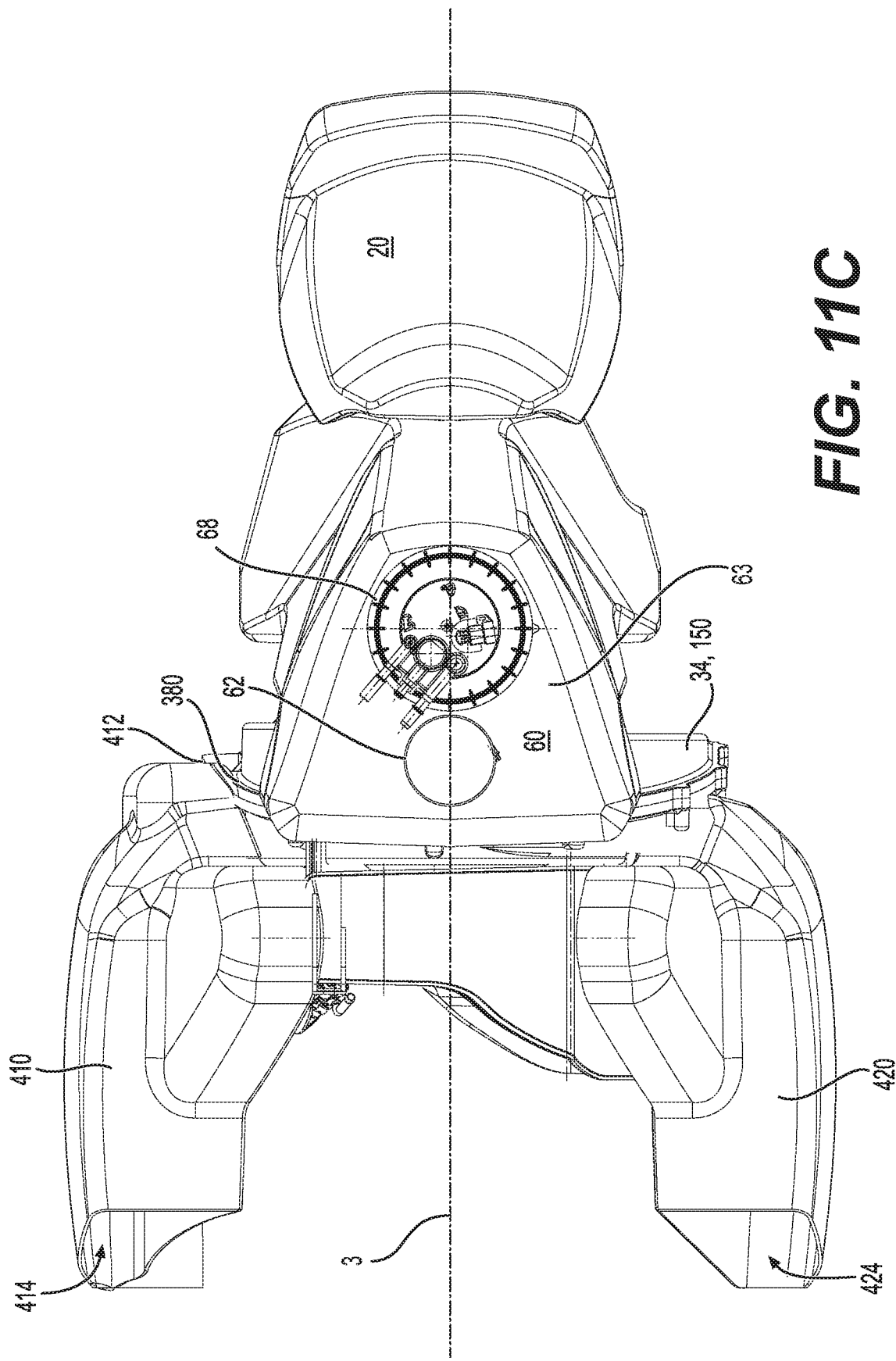

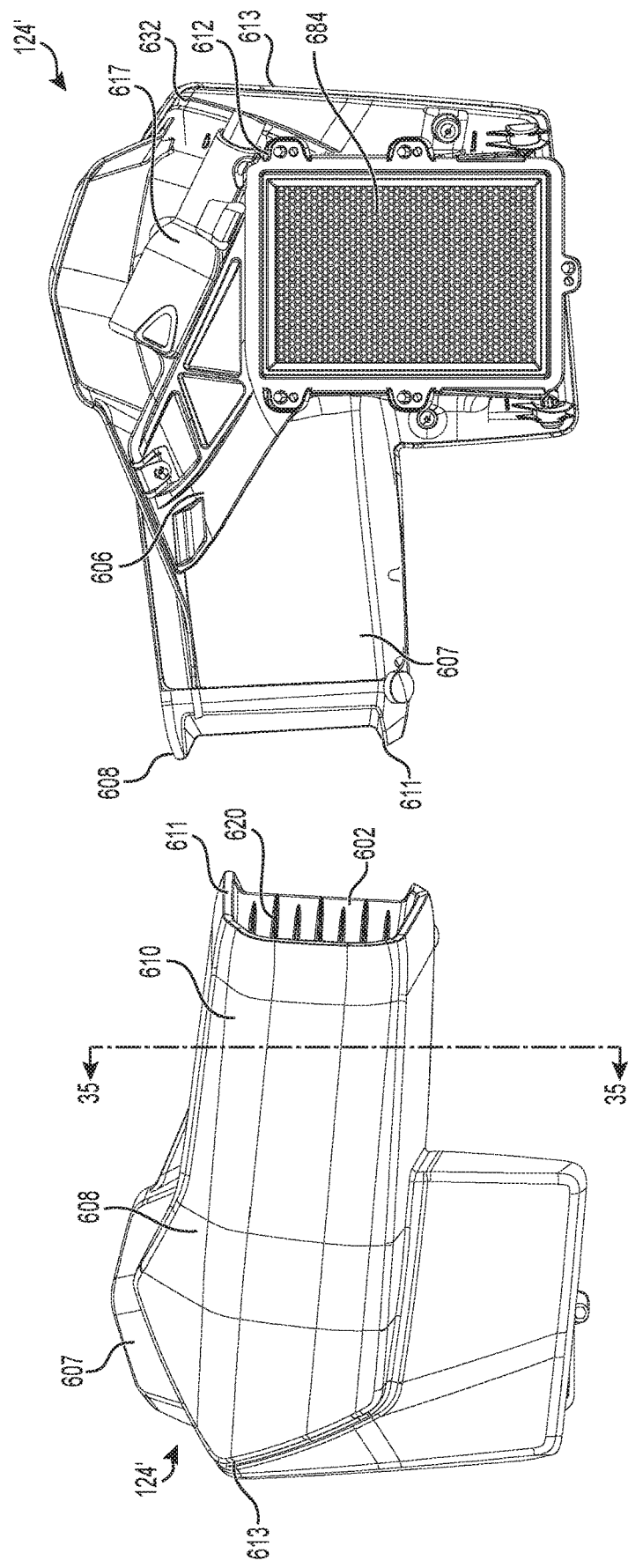

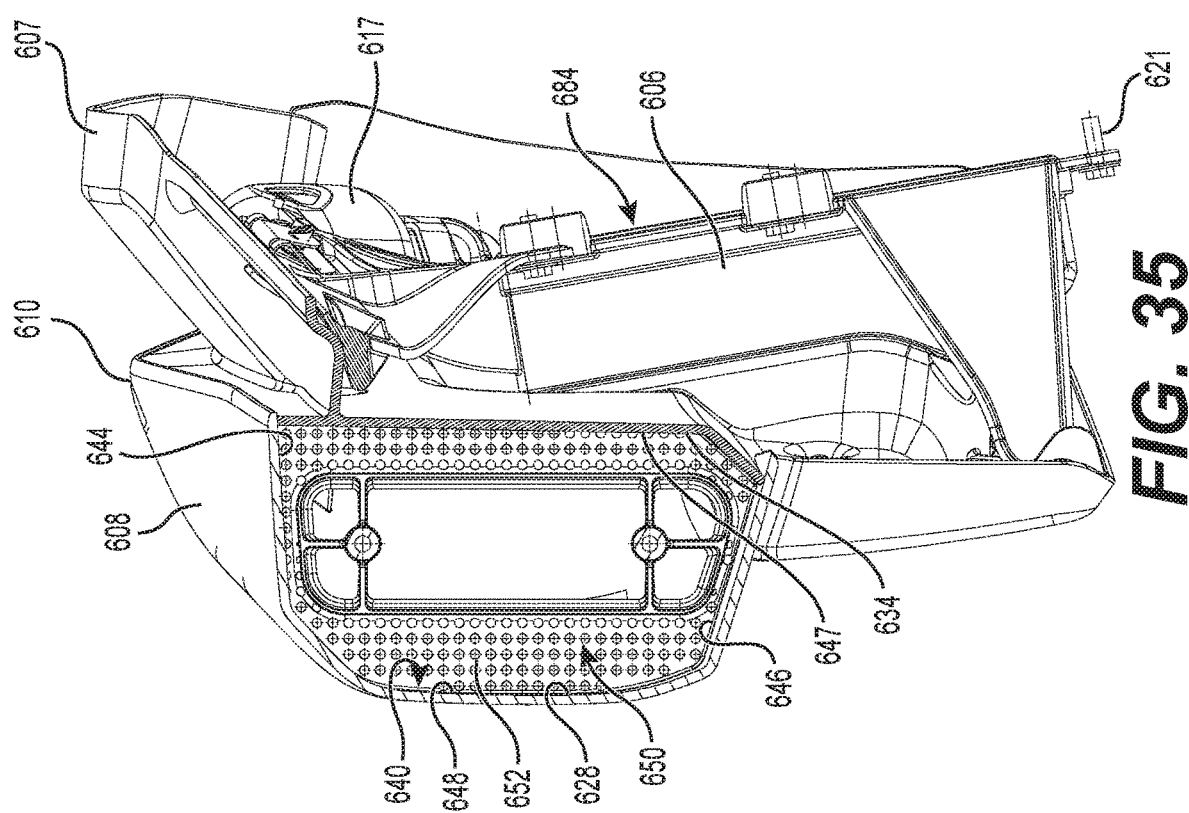

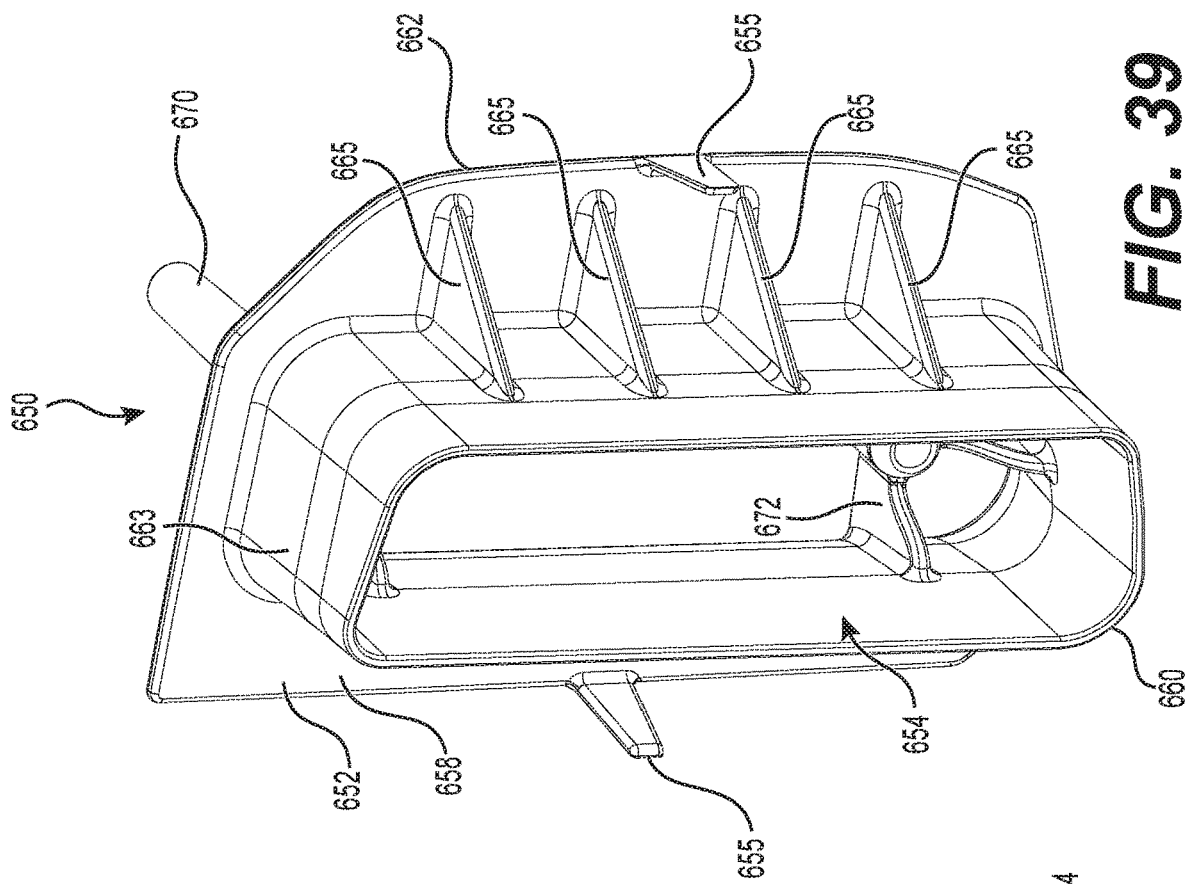
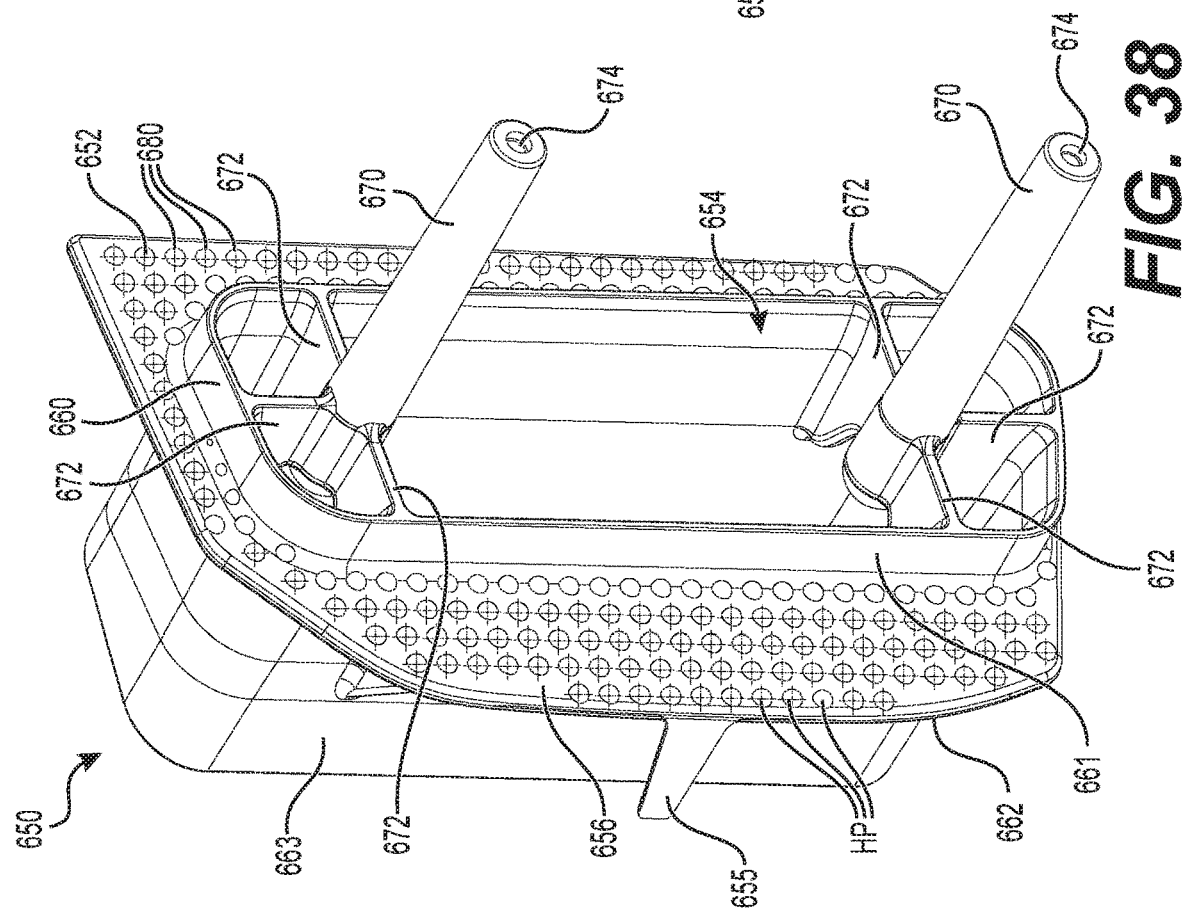

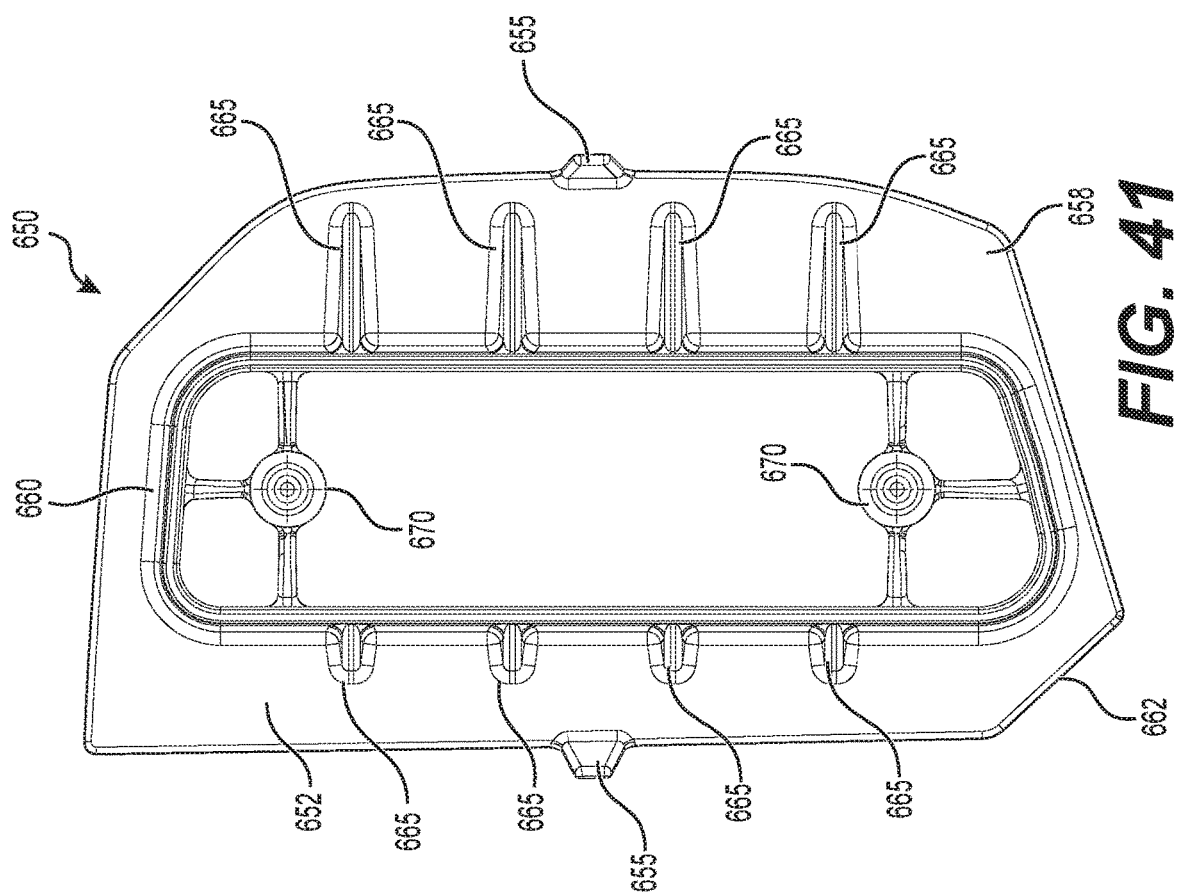
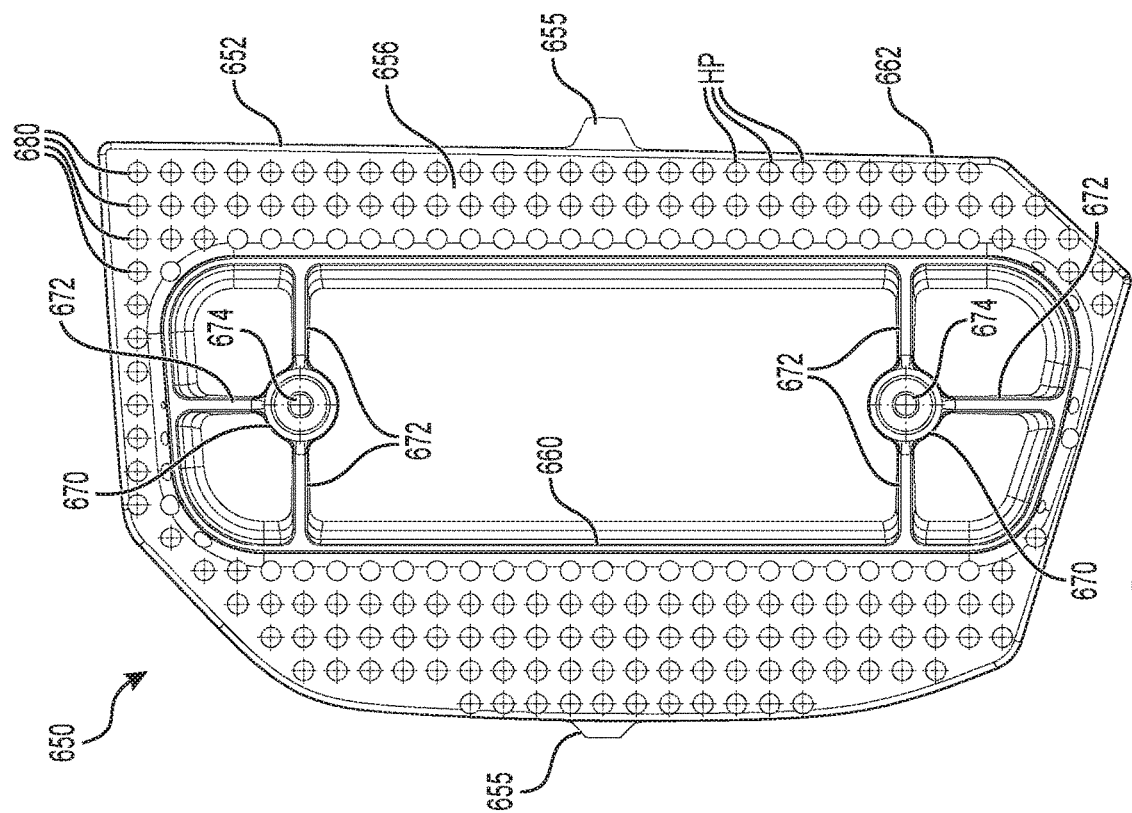

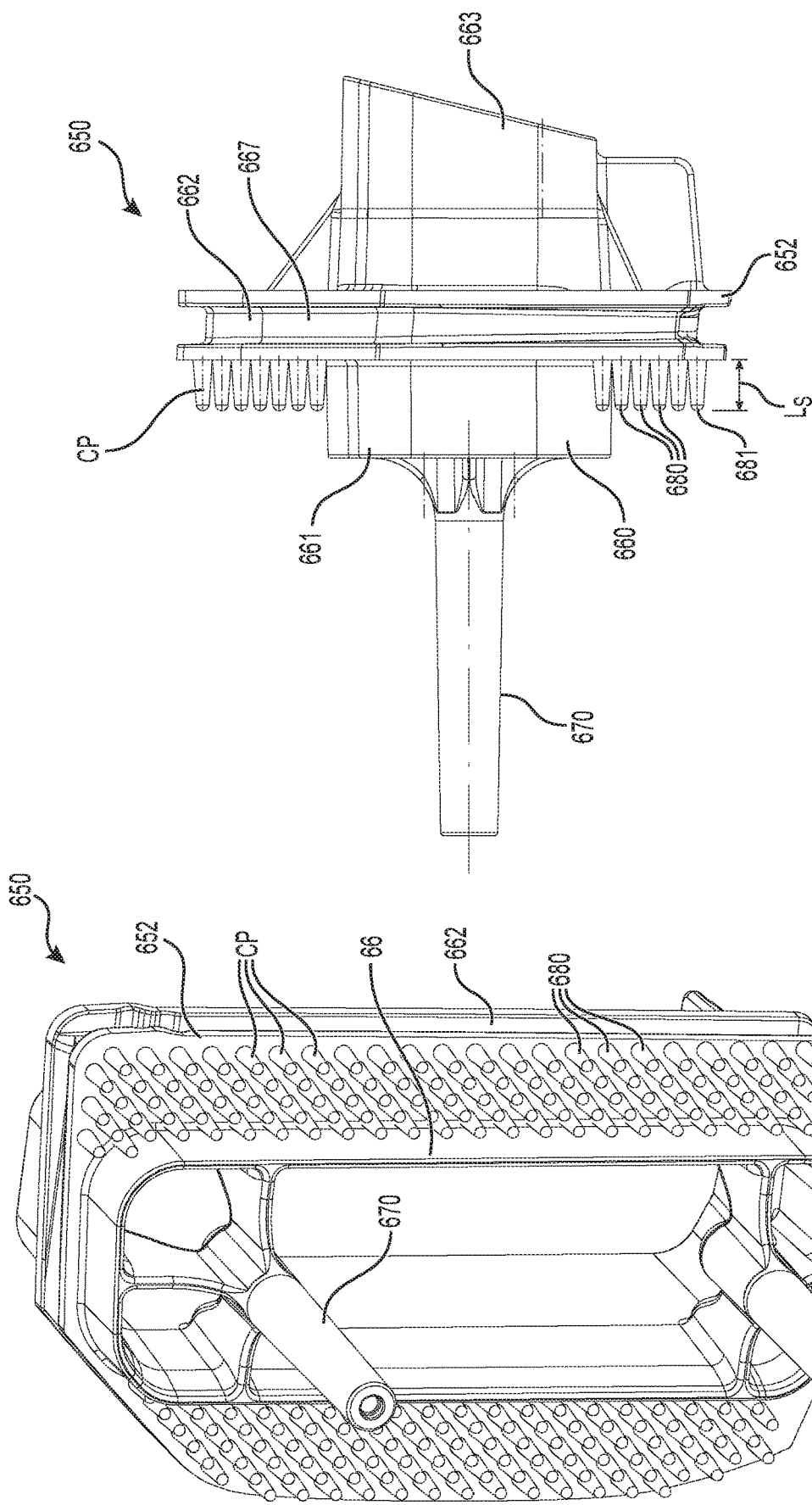

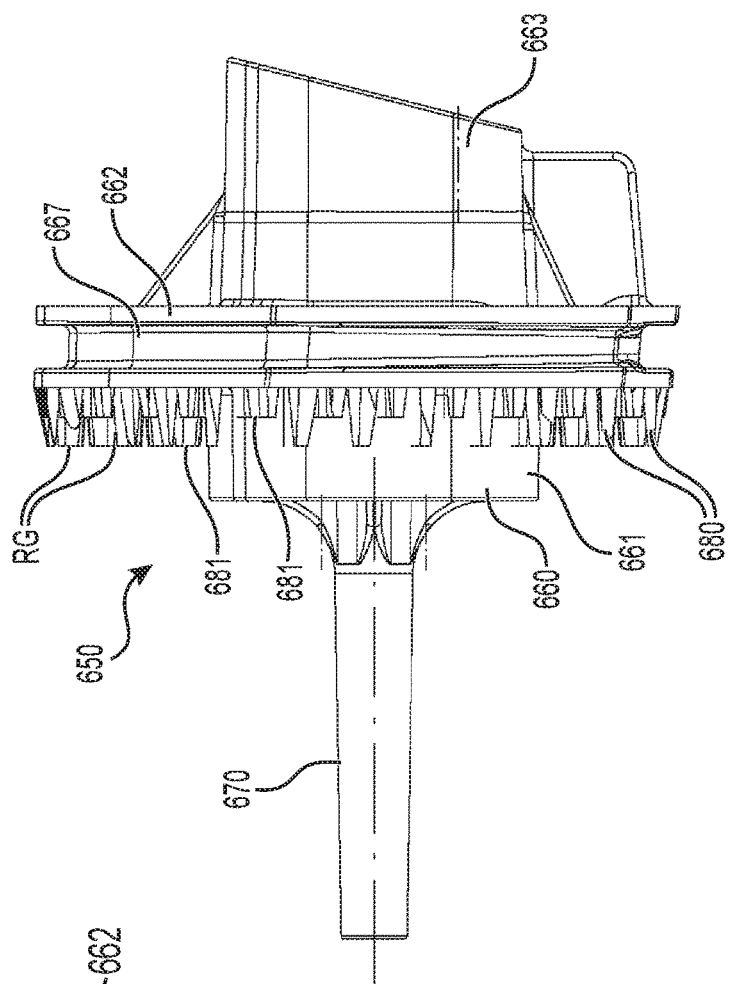
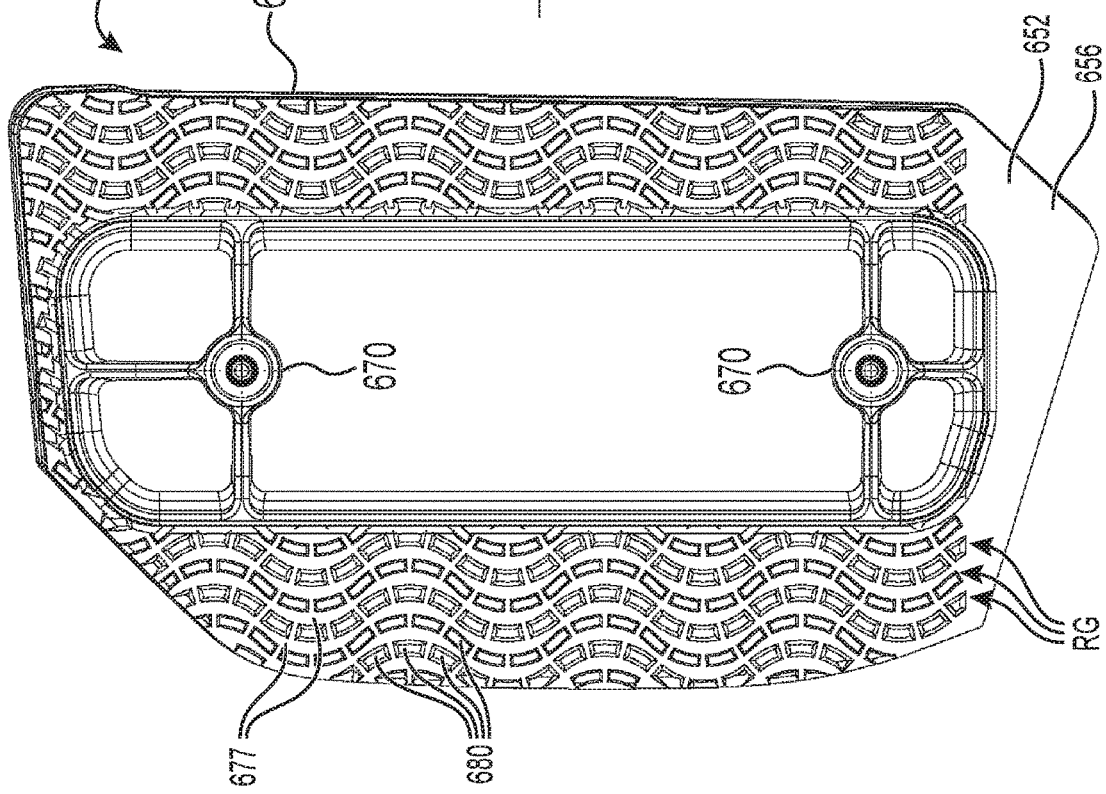
FIG. 51
FIG. 50

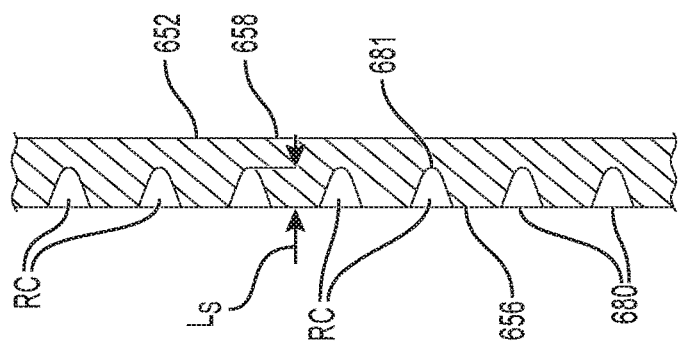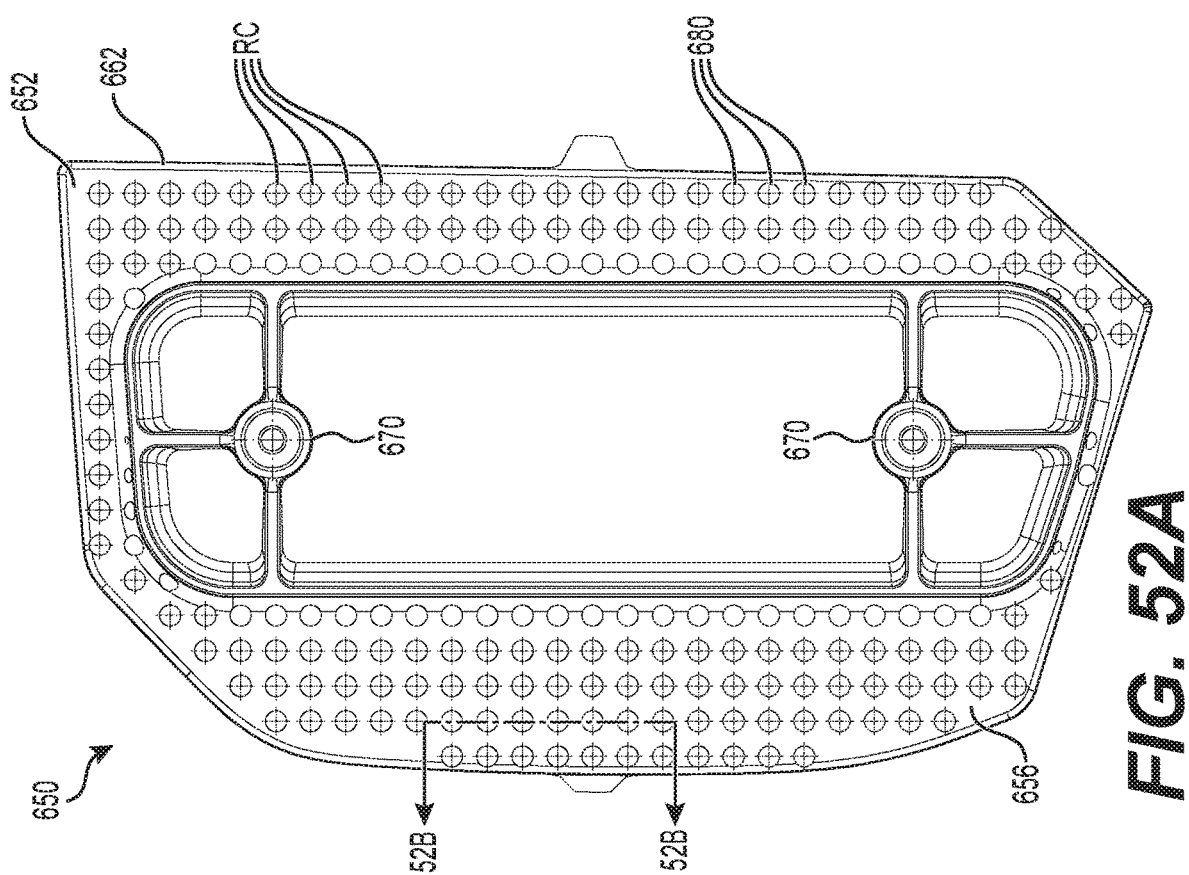

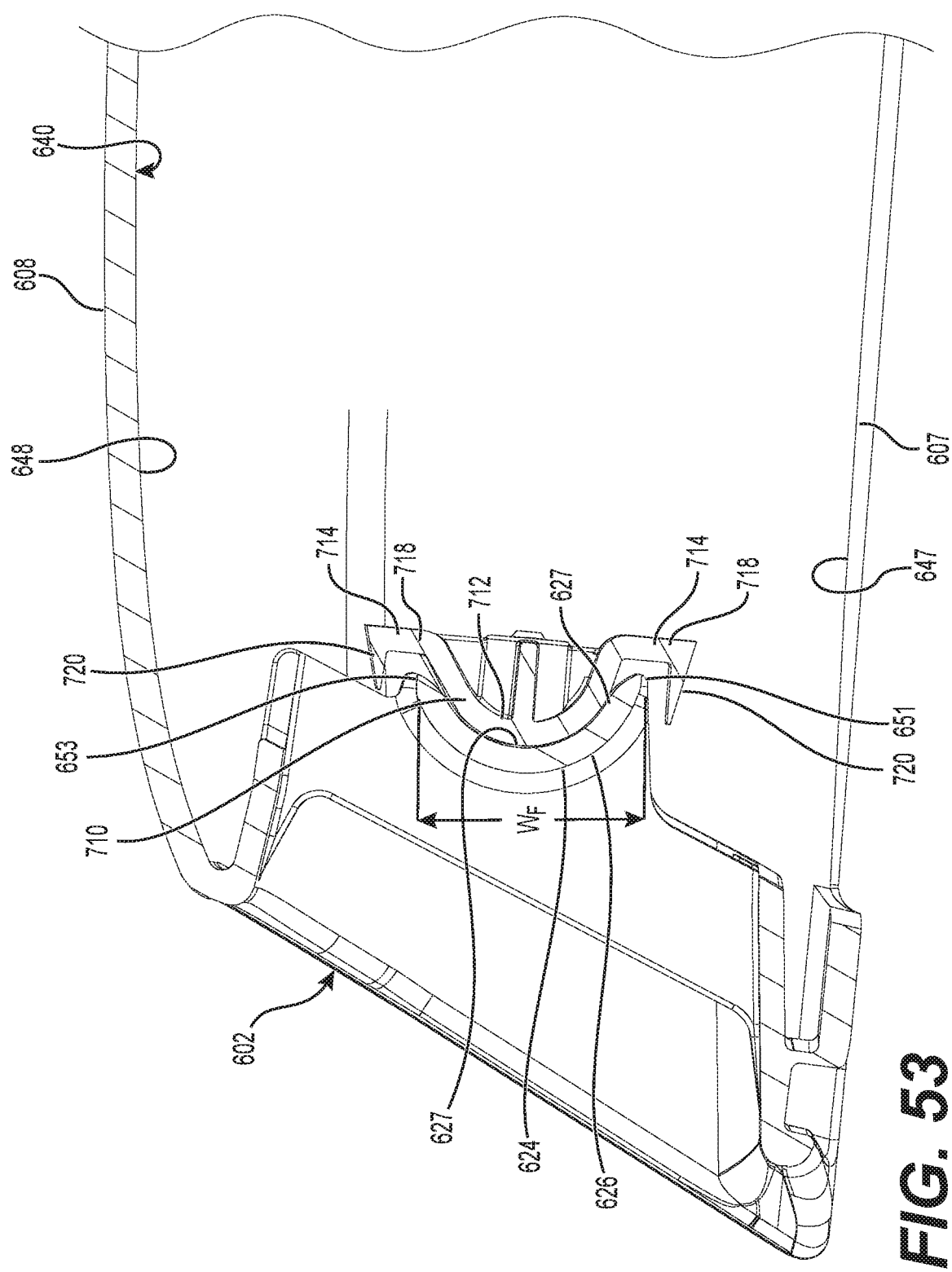

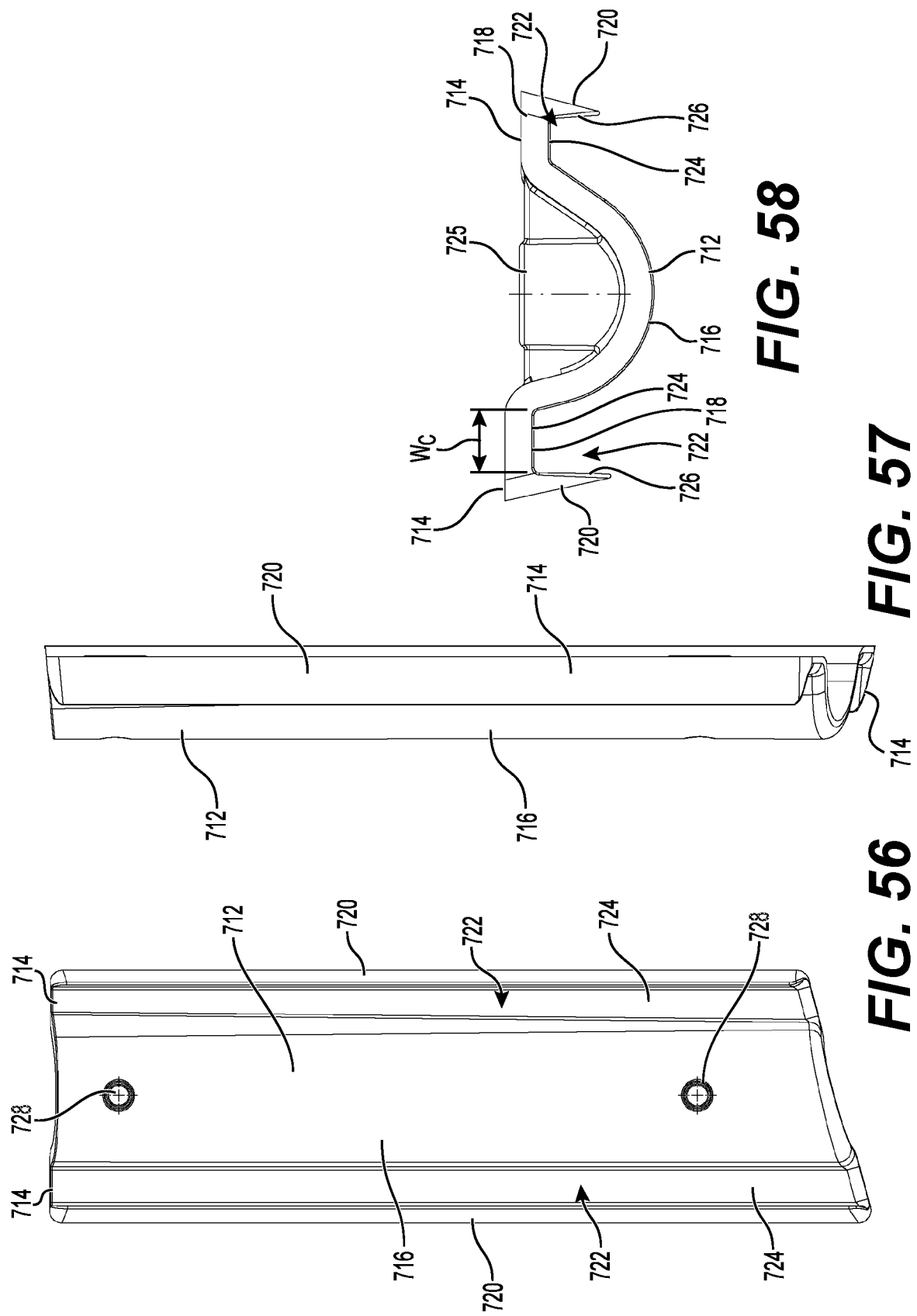

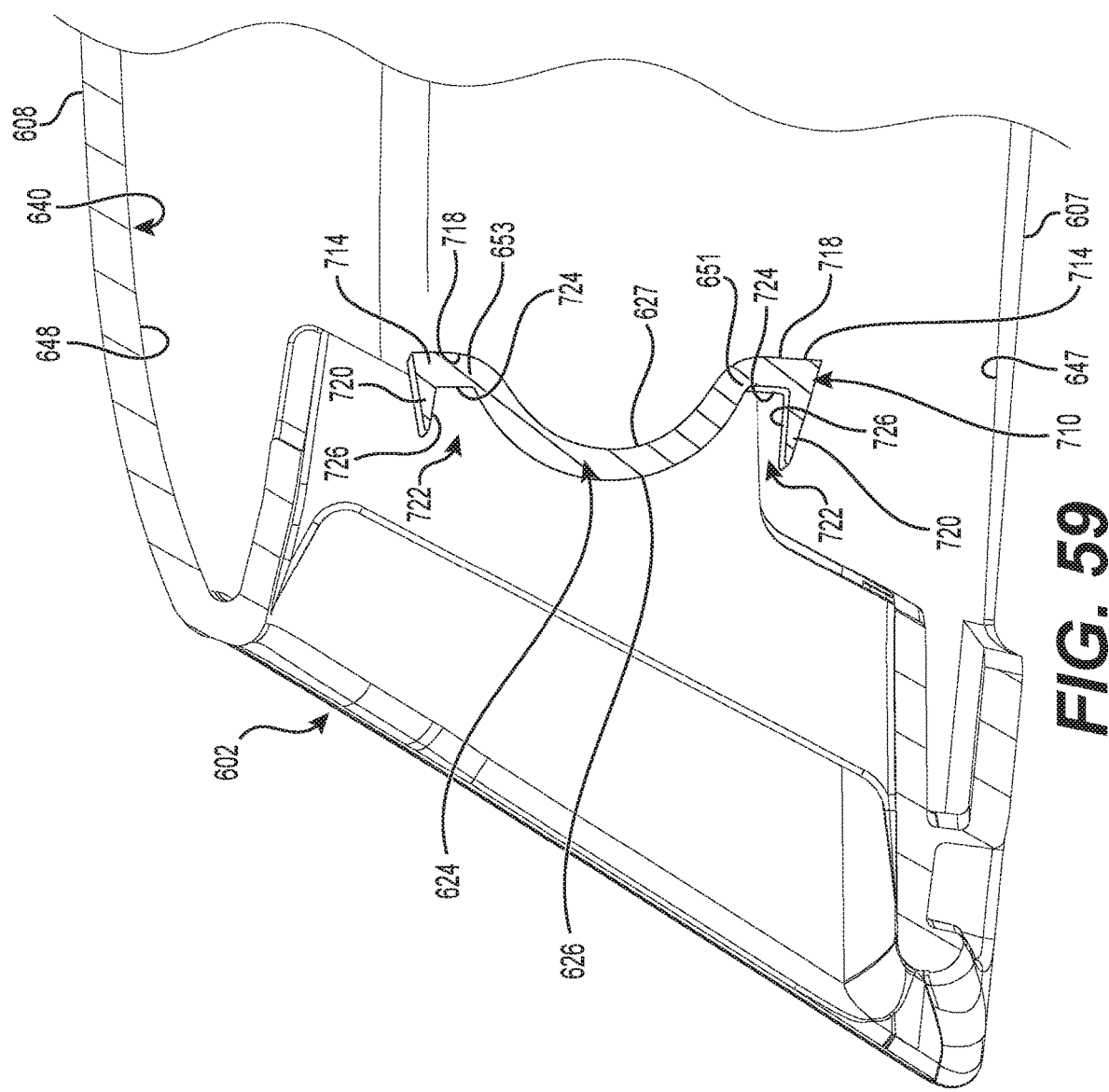

AIR INTAKE SYSTEM FOR A VEHICLE

CROSS-REFERENCE

The present application claims priority to U.S. Provisional Patent Application No. 62/728,735, filed Sep. 7, 2018, the entirety of which is incorporated herein by reference.

FIELD OF TECHNOLOGY

The present technology relates to air intake systems for vehicles.

BACKGROUND

Vehicles that include an internal combustion engine and a continuously variable transmission (CVT) typically require air flow to both the engine and the CVT. Notably, the engine requires air for performing combustion of fuel, while the CVT requires air for cooling its components (e.g., a fiber-reinforced rubber belt). However, providing an air intake system for each of the engine and the CVT can be challenging given the usually limited space available for such air intake systems, particularly in on-road straddle seat vehicles. Moreover, engines with higher power require an increased volumetric flow rate of air both for combustion and CVT cooling and thus efficient air intake systems for the engine and the CVT are desirable.

An additional consideration for such air intake systems is moisture management. Notably, excessive moisture in the air fed to the engine and/or the CVT can negatively affect the vehicle's performance. For instance, in the case of the engine, the combustion process in the combustion chamber(s) of the engine can be detrimentally affected by the presence of excessive moisture. Similarly, excessive moisture can cause slippage between the pulleys and the belt of the CVT. To that end, conventional air intake systems often implement a tortuous path to cause air flowing therein to release some moisture, and/or an airbox for collecting moisture therein. However, such solutions typically require a significant amount of space which is not available in all vehicles. Some conventional air intake systems have a filter to catch debris and impurities before entry into the engine or CVT and may catch water droplets. However, moisture can damage such filters and compromise their ability to block impurities as they are typically designed to prevent the flow of debris and impurities and not for water removal.

There is thus a need for a vehicle with efficient yet compact engine and CVT air intake systems with improve moisture management.

SUMMARY

It is an object of the present technology to ameliorate at least some of the inconveniences mentioned above.

In accordance with one aspect of the present technology, there is provided an air intake system for a vehicle. The air intake system includes: a conduit comprising an internal wall forming an air passage, the conduit defining a conduit inlet for receiving air into the air passage and a conduit outlet for discharging air from the air passage; a deflector connected to the conduit and disposed within the air passage; and a restricting structure disposed within the air passage between the deflector and the conduit outlet, the restricting structure defining at least in part an opening substantially laterally aligned with the deflector. The restricting structure includes a lateral wall disposed downstream of the deflector and extending within the air passage. The lateral wall has: a front surface generally facing the conduit inlet; and a plurality of surface-increasing features provided on the front surface. Each of the surface-increasing features has a length of at least 1 mm measured from the front surface in a direction normal to the front surface.

In some implementations, the lateral wall extends substantially perpendicular to the direction of air flow entering the conduit inlet.

In some implementations, the surface-increasing features are recesses extending from the front surface into the lateral wall. The length of each of the surface-increasing features corresponds to a depth of each of the recesses measured from the front surface in the direction normal to the front surface.

In some implementations, the surface-increasing features are projections extending from the front surface.

In some implementations, the projections are arranged in a uniform pattern.

In some implementations, at least some of the projections have a hemispherical shape.

In some implementations, the at least some of the projections have a diameter between 2 mm and 10 mm inclusively.

In some implementations, at least some of the projections are generally conical.

In some implementations, at least some of the projections form ridges extending generally vertically.

In some implementations, the ridges have a generally sinusoidal shape.

In some implementations, laterally-adjacent ones of the ridges define a channel therebetween.

In some implementations, the laterally-adjacent ones of the ridges have different lengths.

In some implementations, the length of each of the surface-increasing features is between 1 mm and 20 mm inclusively.

In some implementations, the length of each of the surface-increasing features is between 2 mm and 10 mm inclusively.

In some implementations, at least 30% of the front surface is covered by the projections.

In some implementations, the lateral wall surrounds the opening of the restricting structure.

In some implementations, the lateral wall is straight.

In some implementations, the restricting structure is affixed to the deflector.

In some implementations, a ratio of a width of the opening over a width of the deflector is between 0.8 and 1.5 inclusively.

In some implementations, the restricting structure also includes a peripheral wall defining the opening, the peripheral wall extending generally normal to the lateral wall. The peripheral wall extends forwardly of the front surface of the lateral wall.

In some implementations, the peripheral wall extends rearwardly of the lateral wall.

In some implementations, during use of the air intake system, at least some air flows sequentially: into the conduit inlet; past the deflector to be deflected laterally away from the opening; laterally inward toward the opening downstream of the deflector; into the opening; and into the conduit outlet.

In some implementations, the air intake system also includes a filter disposed between the restricting structure and the conduit outlet.

In some implementations, the conduit comprises at least one drainage hole disposed between the conduit inlet and the lateral wall.

In some implementations, a vehicle includes the air intake system.

In accordance with another aspect of the present technology, there is provided a vehicle. The vehicle includes: a frame; a plurality of ground-engaging members; a steering assembly operatively connected to at least one ground-engaging member of the plurality of ground-engaging members for steering the vehicle; at least one of: an internal combustion engine supported by the frame, the engine defining an engine air inlet for receiving air therein; and a continuously variable transmission (CVT) operatively connecting the engine to at least one of the plurality of ground-engaging members, the CVT defining a CVT air inlet for receiving air therein; and an air intake system fluidly communicating with the at least one of: (i) the engine air inlet for providing air to the engine, or (ii) the CVT air inlet for providing air to the CVT. The air intake system includes: a conduit comprising an internal wall forming an air passage, the conduit defining a conduit inlet for receiving air into the air passage and a conduit outlet for discharging air from the air passage; a deflector connected to the conduit and disposed within the air passage; and a restricting structure disposed within the air passage between the deflector and the conduit outlet, the restricting structure defining at least in part an opening substantially laterally aligned with the deflector. The restricting structure includes a lateral wall disposed downstream of the deflector and extending within the air passage. The lateral wall has a front surface generally facing the conduit inlet, and a plurality of surface-increasing features provided on the front surface. Each of the surface-increasing features has a length of at least 1 mm measured from the front surface in a direction normal to the front surface.

In some implementations, the conduit inlet faces generally forwardly.

In some implementations, during use of the vehicle, at least some air flows sequentially: into the conduit inlet; past the deflector to be deflected laterally away from the opening; laterally inward toward the opening downstream of the deflector; into the opening; and into the conduit outlet.

In accordance with another aspect of the present technology, there is provided an air intake system for a vehicle. The air intake system includes: a conduit comprising an internal wall forming an air passage, the internal wall having a top, a bottom, a first lateral side and a second lateral side, the conduit defining a conduit inlet for receiving air into the air passage and a conduit outlet for discharging air from the air passage; a deflector connected to the conduit and disposed within the air passage, the deflector having a convex surface facing the conduit inlet, the deflector having a first lateral end and a second lateral end, the first lateral end being spaced apart from the first lateral side of the internal wall, the first lateral end being closer to the first lateral side than the second lateral side; and a collector connected to the deflector and positioned to collect at least some moisture from air flowing past the deflector. The collector defines a channel extending generally vertically. The channel is defined by: a collection surface generally facing the conduit inlet, at least part of the collection surface extending laterally from the first lateral end of the deflector towards the first lateral side of the internal wall; and a limiting surface extending from the collection surface towards the conduit inlet, the collection surface being at least partially laterally between the limiting surface and the first lateral end of the deflector.

In some implementations, the collection surface of the collector is planar.

In some implementations, the collection surface extends from the top to the bottom of the deflector.

In some implementations, the limiting surface is substantially perpendicular to the collection surface.

In some implementations, the deflector has a concave surface opposite the convex surface.

In some implementations, the collector is fastened to the deflector.

In some implementations, at least part of the collector is disposed longitudinally between the deflector and the conduit outlet.

In some implementations, the collector is made integrally with the deflector.

In some implementations, the deflector is made integrally with the conduit.

In some implementations, a ratio of a width of the collection surface over a width of the convex surface is between 0.8 and 1.2 inclusively.

In some implementations, the second lateral end is spaced apart from the second lateral side of the internal wall.

In some implementations, the deflector extends from the top to the bottom of the internal wall.

In some implementations, the first lateral end of the deflector is a first lateral end of the convex surface and the second lateral end of the deflector is a second lateral end of the convex surface.

In some implementations, the channel is a first channel; the collection surface is a first collection surface; the limiting surface is a first limiting surface; the collector defines a second channel extending generally vertically; and the second channel is defined by: a second collection surface generally facing the conduit inlet, at least part of the second collection surface extending laterally from the second lateral end of the deflector towards the second lateral side of the internal wall; and a second limiting surface extending from the second collection surface towards the conduit inlet, the second collection surface being at least partially laterally between the second limiting surface and the second lateral end of the deflector.

In some implementations, the collector has an intermediate portion extending laterally between the first channel and the second channel; and the intermediate portion of the collector is fastened to the deflector.

In some implementations, the air intake system also includes a filter disposed longitudinally between the collector and the conduit outlet.

In some implementations, the conduit includes at least one drainage hole for draining moisture collected by the collector from the air passage.

In some implementations, the air intake system also includes a lateral wall disposed downstream of the deflector and extending within the air passage, the lateral wall defining at least in part an opening substantially laterally aligned with the deflector.

In some implementations, a vehicle includes the air intake system.

In accordance with another aspect of the present technology, there is provided a vehicle. The vehicle includes a frame; a plurality of ground-engaging members; a steering assembly operatively connected to at least one ground-engaging member of the plurality of ground-engaging members for steering the vehicle; at least one of: an internal combustion engine supported by the frame, the engine defining an engine air inlet for receiving air therein; and a continuously variable transmission (CVT) operatively connecting the engine to at least one of the plurality of ground-engaging members, the CVT defining a CVT air inlet for receiving air therein; and an air intake system fluidly communicating with the at least one of: (i) the engine air inlet for providing air to the engine, or (ii) the CVT air inlet for providing air to the CVT. The air intake system includes: a conduit comprising an internal wall forming an air passage, the internal wall having a top, a bottom, a left side and a right side, the conduit defining a conduit inlet for receiving air into the air passage and a conduit outlet for discharging air from the air passage; a deflector connected to the conduit and disposed within the air passage, the deflector having a convex surface facing the conduit inlet, the deflector having a left end and a right end, at least one of the left and right ends of the deflector being spaced apart from a corresponding one of the left and right sides of the internal wall; and a collector connected to the deflector and positioned to collect at least some moisture from air flowing past the deflector. The collector defines a channel extending generally vertically, the channel being defined by: a collection surface generally facing the conduit inlet, at least part of the collection surface extending laterally from the at least one of the left and right ends of the deflector towards the corresponding one of the left and right sides of the internal wall; and a limiting surface extending forwardly from the collection surface towards the conduit inlet, the collection surface being at least partially laterally between the limiting surface and the at least one of the left and right ends of the deflector.

In some implementations, the conduit inlet faces generally forwardly.

For the purpose of this application, terms related to spatial orientation such as downwardly, rearward, forward, front, rear, left, right, above and below are as they would normally be understood by a driver of the vehicle sitting thereon in an upright position with the vehicle in a straight ahead orientation (i.e. not steered left or right), and in an upright position (i.e. not tilted).

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 11C is a top plan view of the seat, fuel tank, CVT, CVT air conduit and engine air conduit of FIG. 11A;

FIG. 31 is a right side elevation view of the CVT air intake system of FIG. 16;

FIG. 32 is a left side elevation view of the CVT air intake system of FIG. 16;

FIG. 35 is a cross-sectional view of the CVT air intake system taken along line 35-35 in FIG. 31;

FIG. 38 is a perspective view, taken from a front, top and right side, of the restricting structure of FIG. 37;

FIG. 39 is a perspective view, taken from a rear, top and right side, of the restricting structure of FIG. 37;

FIG. 40 is a front elevation view of the restricting structure of FIG. 37;

FIG. 41 is a rear elevation view of the restricting structure of FIG. 37;

FIG. 44 is a perspective view, taken from a front, top and left side, of an alternative implementation of the restricting structure of FIG. 38;

FIG. 45 is a top plan view of the restricting structure of FIG. 44;

FIG. 50 is a front elevation view of the restricting structure of FIG. 49;

FIG. 51 is a top plan view of the restricting structure of FIG. 49;

FIG. 52A is a front elevation view of another alternative implementation of the restricting structure of FIG. 38;

FIG. 52B is a cross cross-sectional view of the restricting structure of FIG. 52A, taken along the line 52B-52B of FIG. 52A;

FIG. 53 is a cross-sectional view of part of the CVT air intake system in accordance with an implementation in which the CVT air intake system includes a collector;

FIG. 56 is a front elevation view of the collector of FIG. 54;

FIG. 57 is a left side elevation view of the collector of FIG. 54;

FIG. 58 is a top plan view of the collector of FIG. 54; and

FIG. 59 is a cross-sectional view of part of the CVT air intake system showing an alternative implementation of the collector.

DETAILED DESCRIPTION

Figure 1A:
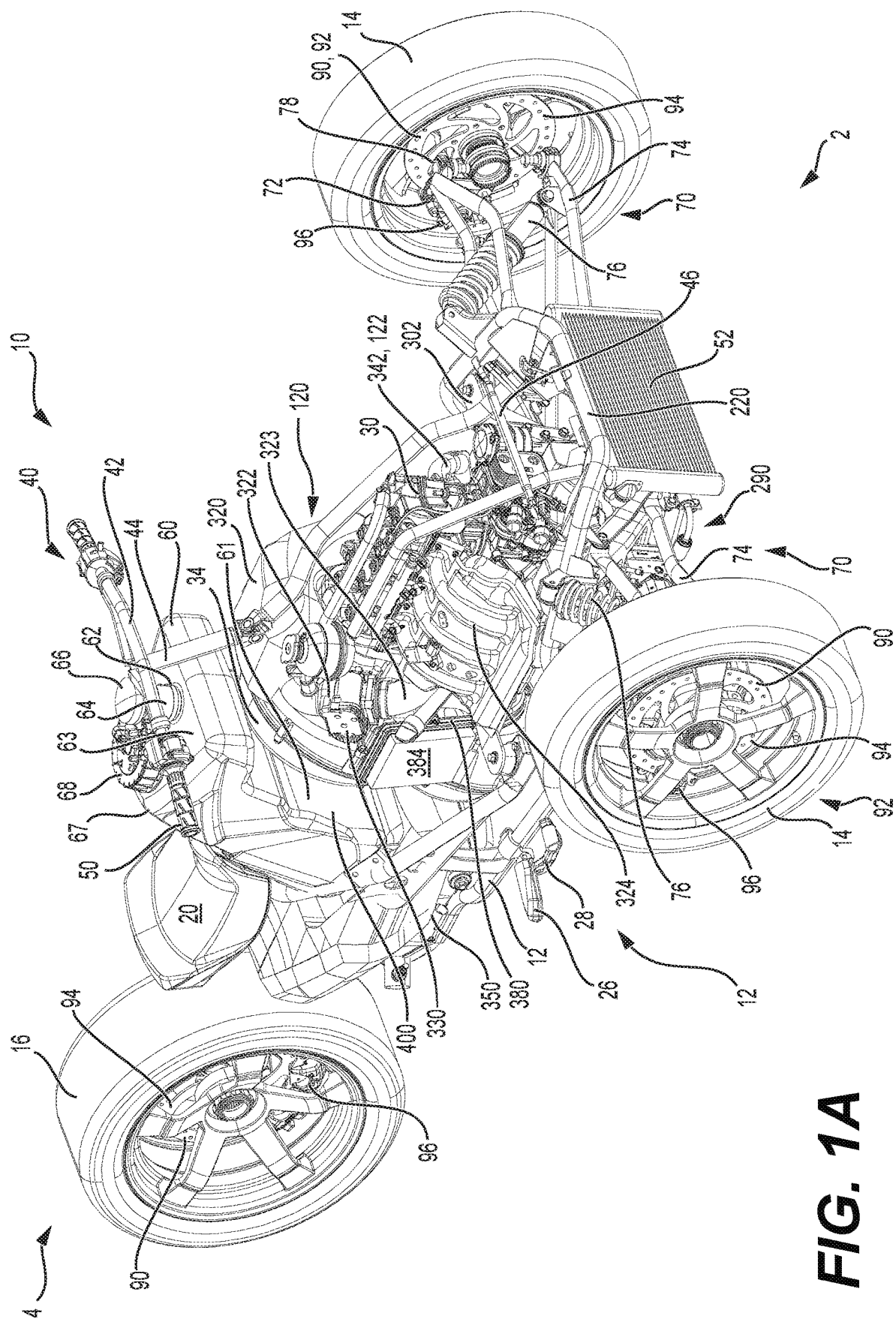
FIG. 1A is a perspective view, taken from a front, top and right side, of a three-wheeled straddle-seat vehicle in accordance with one implementation of the present technology with the fairings thereof being removed for clarity.

The present technology is being described with respect to a three-wheeled straddle-type vehicle 10.

General Description

With reference to FIGS. 1A to 1H, a vehicle 10 has a front end 2 and a rear end 4 defined consistently with the forward travel direction of the vehicle 10. The vehicle 10 has a frame 12 defining a longitudinal centerplane 3 (FIGS. 1D to 1G).

The vehicle 10 is a three-wheeled vehicle 10 including a left front wheel 14 mounted to the frame 12 by a left front suspension assembly 70, a right front wheel 14 mounted to the frame 12 by a right front suspension assembly 70, and a single rear wheel 16 mounted to the frame 12 by a rear suspension assembly 80. The left and right front wheels 14 and the rear wheel 16 each have a tire secured thereto. It is contemplated that both front wheels 14 and/or the rear wheel 16 could have more than one tire secured thereto. The front wheels 14 are disposed equidistant from the longitudinal centerplane 3, and the rear wheel 16 is centered with respect to the longitudinal centerplane 3. The front wheels 14 each rotate about a corresponding rotation axis 14a. The rear wheel 16 rotates about a rotation axis 16a. In the illustrated implementation of the vehicle 10, each of the rotation axes 14a, 16a of the wheels 14, 16 is disposed horizontally. When the vehicle 10 is placed on level ground and without a driver, passenger, and/or any cargo loaded thereon, the rotation axes 14a, 16a of the wheels 14, 16, are all contained in a common plane 15 extending generally horizontally, referred to hereinafter as a rotation plane 15 (FIG. 1B, 1C). It is contemplated that each of the rotation axes 14a of the front wheels 14 could be disposed at an angle with respect to the horizontal, and therefore not disposed in the common generally horizontal plane 15. It is contemplated that the rotation axis 16a of the rear wheel 16 could be vertically higher than the axes of rotation 14a of the front wheels 14. In this case, the rotation plane 15 is defined as a plane perpendicular to the longitudinal centerplane 3 and passing through the centers of the wheels 14, 16. A front wheel plane 18 is defined as a plane extending normal to the longitudinal centerplane 3 and being disposed tangentially to the rear edges of the left and right front wheels 14 when the vehicle 10 is steered straight ahead.

In the illustrated implementation, each front suspension assembly 70 is a double A-arm type suspension, also known as a double wishbone suspension. It is contemplated that other types of suspensions, such as a McPherson strut suspension, or swing arm could be used. Each front suspension assembly 70 includes an upper A-arm 72, a lower A-arm 74 and a shock absorber 76. The right front suspension assembly 70 is a mirror image of the left front suspension assembly 70, and as such only the left front suspension assembly 70 will be described herein. Each A-arm 72, 74 has a front member and a rear member. The laterally outer ends of the front and rear members are connected to each other while the laterally inner ends of the front and rear members of each A-arm 72, 74 are spaced apart from each other. The lower end of the shock absorber 76 is connected to the front and rear members of the lower A-arm 74 slightly laterally inward of the laterally outer ends. The laterally inner ends of the upper and lower A-arms 72, 74 are pivotally connected to the frame 12 as will be described below. The laterally outer ends of the upper and lower A-arms 72, 74 are pivotally connected to the top and bottom respectively of a spindle 78 (FIG. 2A) as can be seen best in FIGS. 1A and 2A. The spindle 78 also defines a steering arm 79 which extends rearwardly and laterally inwardly from the top of the spindle 78. The spindle 78 pivots, relative to the A-arms 72, 74, about a steering axis extending generally vertically. The front wheel 14 is connected to a hub 71 (FIG. 2A) that is connected to the spindle 78 such that the hub 71 and the corresponding front wheel 14 can rotate about the generally vertical steering axis. A sway bar 86 is connected to the front members of both lower A-arms 74 to reduce motion of one of the left and right front wheels 14 with respect to the other of the left and right front wheels 14, and to thereby reduce rolling motion of the vehicle 10.

The rear suspension assembly 80 includes a swing arm 82 and a shock absorber 84. The swing arm 82 is pivotally mounted at a front thereof to the frame 12. The rear wheel 16 is rotatably mounted to the rear end of the swing arm 82 which extends on a left side of the rear wheel 16. The shock absorber 84 is connected between the swing arm 82 and the frame 12.

The vehicle 10 is a straddle-type vehicle having a straddle seat 20 mounted to the frame 12 and disposed along the longitudinal centerplane 3. The straddle seat is disposed longitudinally forward of the rear wheel 16. In the illustrated implementation, the straddle seat 20 is intended to accommodate a single adult-sized rider, i.e. the driver. It is however contemplated that the straddle seat 20 could be configured to accommodate more than one adult-sized rider (the driver and one or more passengers). A driver footrest 26 is disposed on either side of the vehicle 10 and vertically lower than the straddle seat 20 to support the driver's feet. In the implementation of the vehicle 10 illustrated herein, the driver footrests 26 are in the form of foot pegs disposed longitudinally forward of the straddle seat 20. It is also contemplated that the footrests 26 could be in the form of footboards. It is contemplated that the vehicle 10 could also be provided with one or more passenger footrests disposed rearward of the driver footrest 26 on each side of the vehicle 10, for supporting a passenger's feet when the seat 20 is configured to accommodate one or more passengers in addition to the driver. A brake operator 28, in the form of a foot-operated brake pedal, is connected to the right driver footrest 26 for braking the vehicle 10. The brake operator 28 extends upwardly and forwardly from the right driver footrest 26 such that the driver can actuate the brake operator 28 with a front portion of the right foot while a rear portion of the right foot remains on the right driver footrest 26.

A handlebar 42, which is part of a steering assembly 40, is disposed in front of the seat 20. The handlebar 42 is used by the driver to turn the front wheels 14 to steer the vehicle 10. A central portion of the handlebar 42 is connected to an upper end of a steering column 44. From the handlebar 42, the steering column 44 extends downwardly and leftwardly. A lower end of the steering column 44 is connected to a left pitman arm 46 and a right pitman arm 46. A left steering rod 48 connects the left pitman arm 46 to the steering arm 79 of the left suspension assembly 70 and a right steering rod 48 connects the right pitman arm 46 to the steering arm 79 of the right suspension assembly 70 such that turning the handlebar 42 turns the steering column 44 which, through the pitman arm 46 and the steering rods 48, turns the wheels 14. In the illustrated implementation of the vehicle 10, the steering assembly 40 includes a power steering unit (not shown) to facilitate steering of the vehicle 10. It is contemplated that the power steering unit could be omitted.

A left hand grip is placed around the left side of the handlebar 42 near the left end thereof and a right hand grip is placed respectively right sides of the handlebar 42 near the right end to facilitate gripping for turning the handlebar 42 and thereby steering the vehicle 10. In the illustrated implementation, the right hand grip is a throttle operator 50, in the form of a rotatable hand grip, which can be rotated by the driver to control power delivered by the engine 30. It is contemplated that the throttle operator could be in the form of a thumb-operated or finger-operated lever and/or that the throttle operator 50 could be connected near the right end of the handlebar 42. The handlebar 42 has connected thereto various controls such as an engine start-up button and an engine cut-off switch located laterally inwardly of the left and right grips.

The frame 12 supports and houses a motor 30 located forwardly of the straddle seat 20. In the illustrated implementation of the vehicle 10, the motor 30 is in the form of an internal combustion engine. It is however contemplated that the motor 30 could be other than an internal combustion engine. For example, the motor 30 could be an electric motor, a hybrid or the like. The motor 30 will be referred to hereinafter as engine 30 for convenience. In the illustrated implementation of FIG. 1, the engine 30 is an inline three-cylinder four-stroke internal combustion engine. Another implementation of a vehicle 10' having an inline two-cylinder four-stroke internal combustion engine will be discussed later. It is contemplated that other types of internal combustion engines could be used. The engine 30 has a crankshaft 31 (FIGS. 5C and 5D) which rotates about a crankshaft axis 31a (FIGS. 5C and 5D) disposed generally longitudinally and horizontally.

The engine 30 is operatively connected to the rear wheel 16 to drive the rear wheel 16. The rear wheel 16 is operatively connected to the crankshaft 31 of the engine 30 via an engine output shaft 32 (FIGS. 5C and 5D), a continuously variable transmission (CVT) 34, a transfer case 36 and a driveshaft 38. It is contemplated that the engine 30 could be connected to the front wheels 14 instead of, or in addition to, the rear wheel 16. The engine 30, engine output shaft 32, continuously variable transmission (CVT) 34, transfer case 36 and driveshaft 38 form part of a vehicle powertrain 100 which will be described below in further detail. As can be seen, the transfer case 36 is disposed rearward of the engine 30, and the CVT 34 is disposed rearward of the transfer case 36. The CVT 34 and the transfer case 36 form a transmission assembly 400 of the vehicle 10. It is contemplated that the vehicle 10 could have a transmission assembly 400 in which the CVT 34 and the transfer case 36 are replaced by a discrete gear transmission.

As can be seen in FIGS. 1A to 1E, a fuel tank 60 disposed behind the CVT 34 supplies fuel to the engine 30. The fuel tank 60 is disposed longitudinally rearward of the CVT 34 and overlapping therewith in the lateral and vertical directions. The straddle seat 20 is disposed behind the fuel tank 60. The straddle seat 20 is disposed longitudinally rearward of the fuel tank 60 and overlapping therewith in the lateral and vertical directions. The fuel tank 60 is mounted rearward of the CVT 34 and spaced therefrom. A front wall 61 of the fuel tank 60 extends rearwardly of the CVT 34 and is formed so as to be congruous with a rear cover 156 thereof. An upper portion of the front wall 61 extends forwardly above the CVT 34 and then upwardly above the CVT 34 to an upper wall 63 of the fuel tank 60. The upper wall 63 of the fuel tank 60 extends rearwardly and generally horizontally. The fill opening 62 of the fuel tank 60 is formed in the upper wall 63 and disposed above the CVT 34. A filler neck 64 extends upwardly from the fill opening 62 and is covered by a cap 66. The fuel pump 68 is mounted to the upper wall 63 of the fuel tank 60 rearward of the filler neck 64 and forward of a rear surface 67 of the fuel tank 60. The straddle seat 20 is disposed rearwardly of the fuel tank 60 in contact with the rear wall 67 thereof. The rear wall 67 slopes rearwardly and downwardly from the upper wall 63 thereof to the straddle seat 20, and then gently forwardly and downwardly below the straddle seat 20.

A radiator 52 is mounted to the vehicle frame 12 and disposed in front of the engine 30. The radiator 52 is disposed longitudinally forward of the engine 30 and overlapping therewith in the lateral and vertical directions. The radiator 52 is fluidly connected to the engine 30 for cooling the engine 30. The radiator 52 is disposed longitudinally forward of the front suspension assemblies 70, 80. The radiator 52 is disposed between the front left and right suspension assemblies 70, 80 in the lateral directions. The front left and right suspension assemblies 70, 80 extend vertically higher than the radiator 52.

Figure 1B:
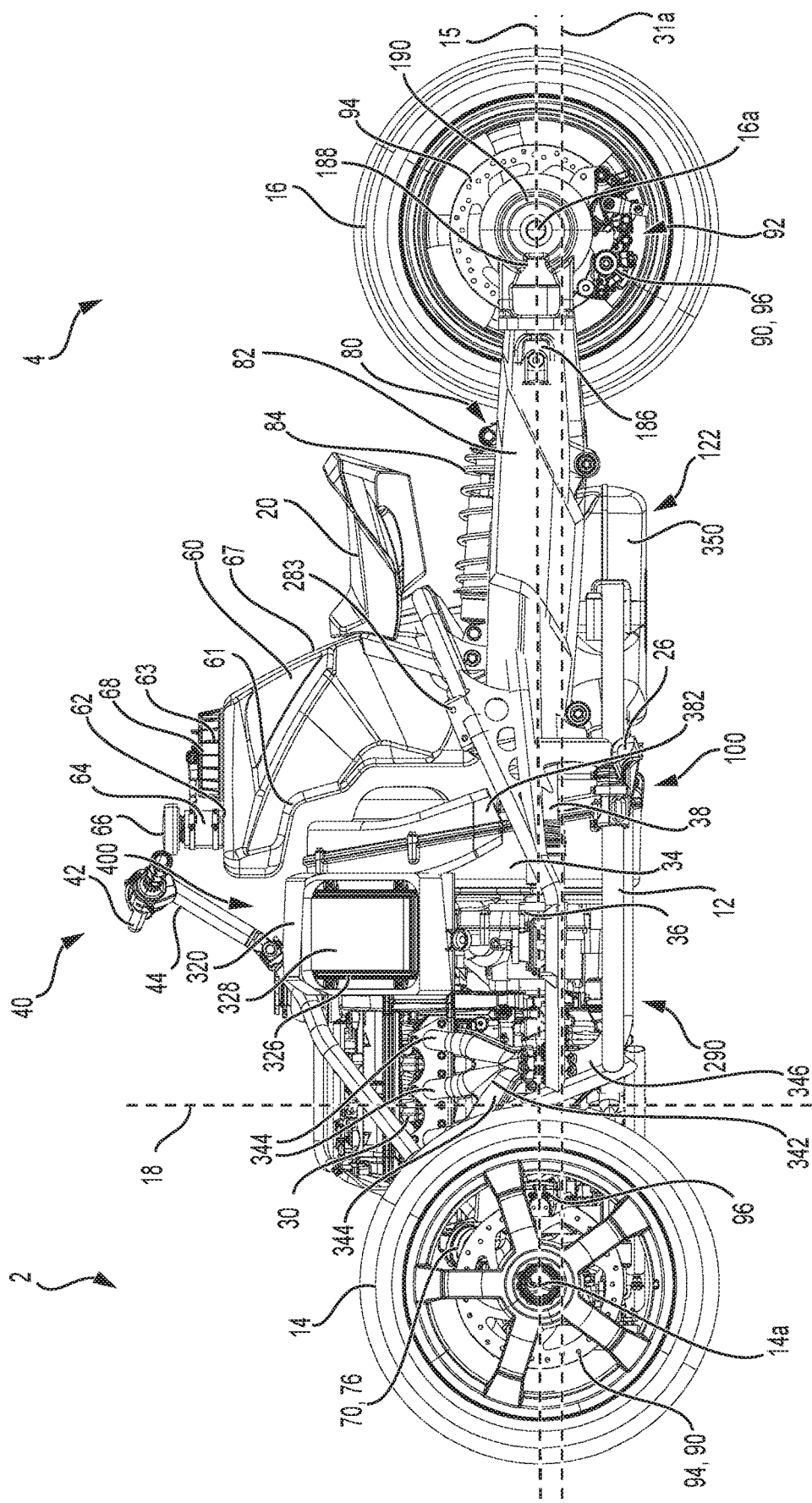
FIG. 1B is a left side elevation view of the vehicle of FIG. 1A.
Figure 1C:
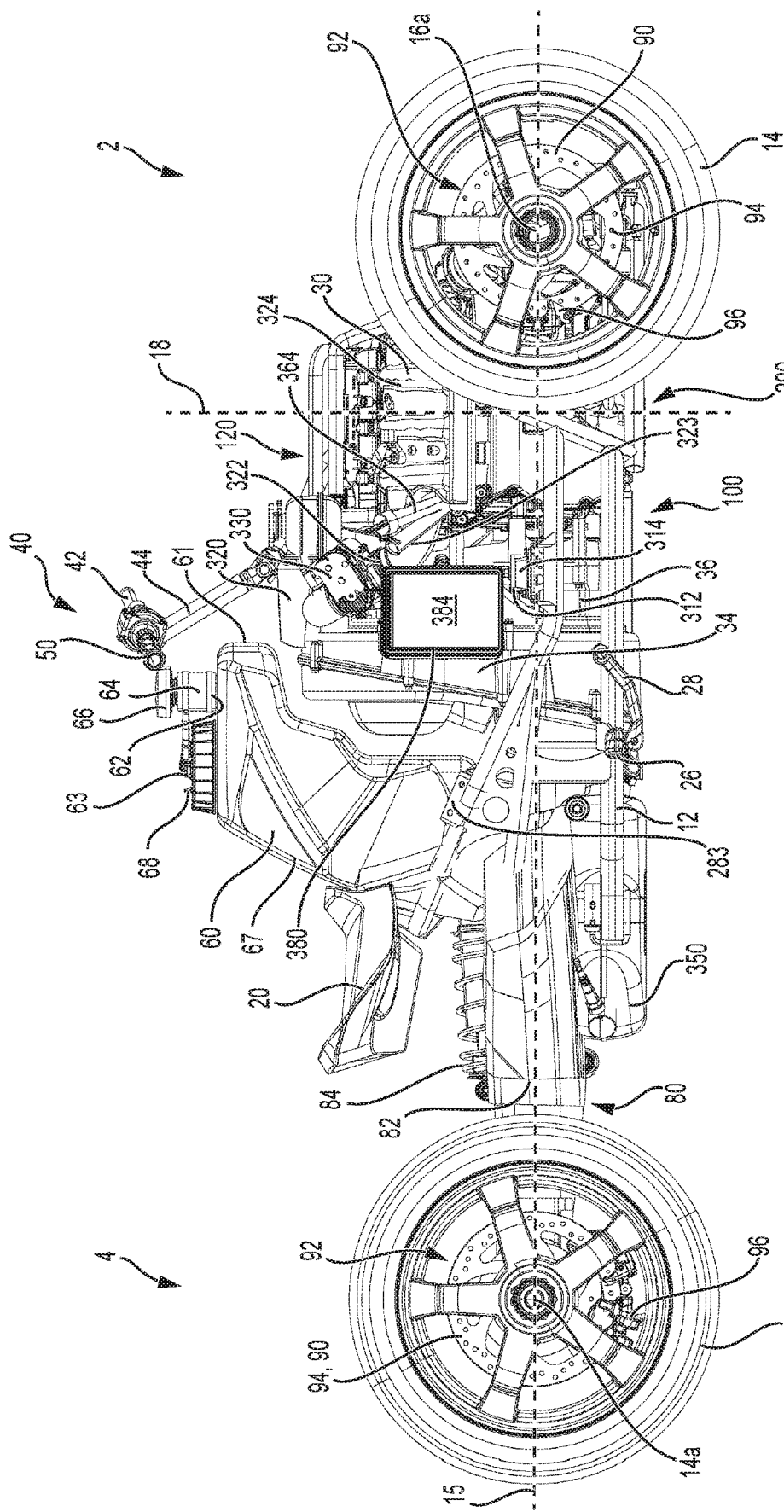
FIG. 1C is a right side elevation view of the vehicle of FIG. 1A.
Figure 1D:
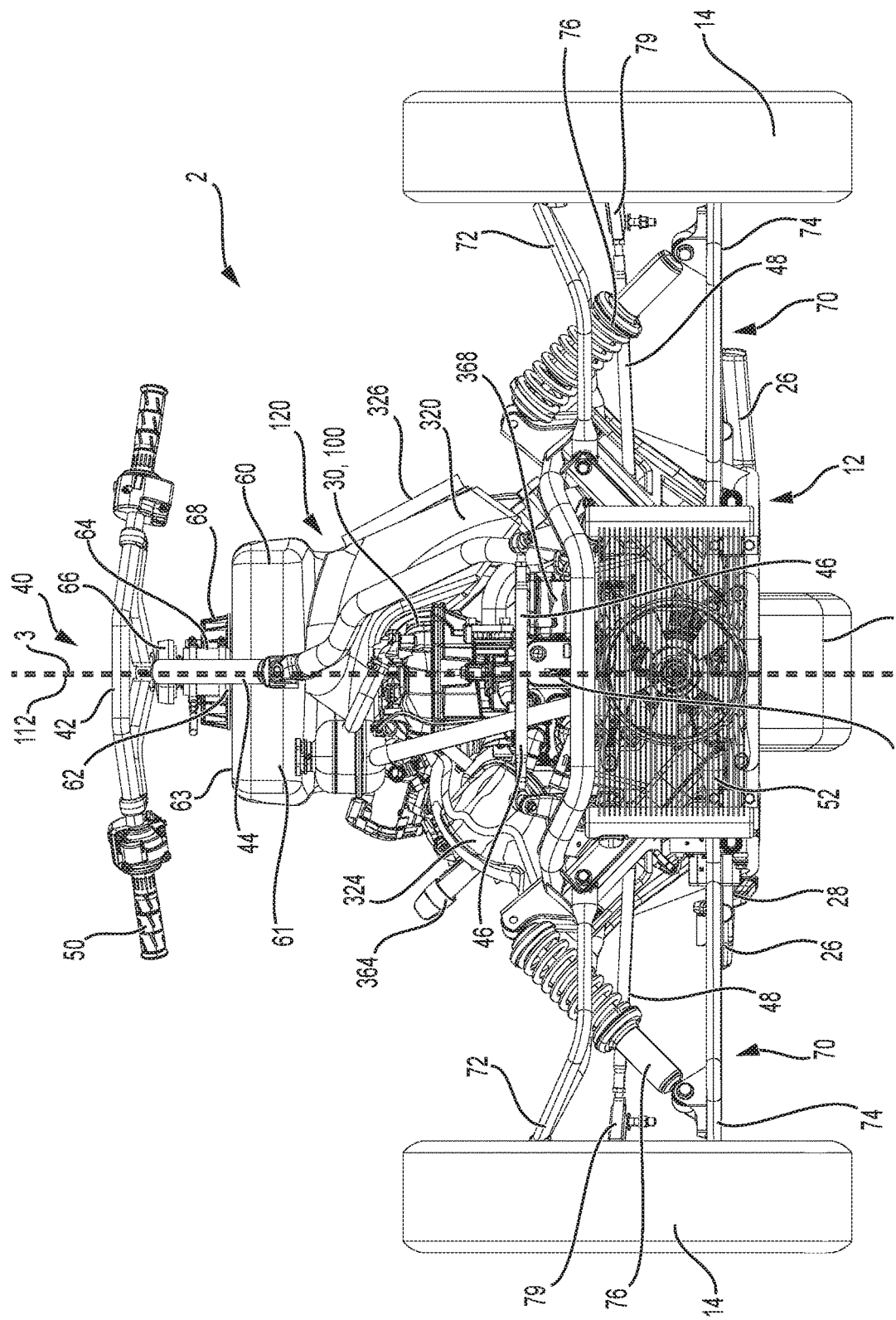
FIG. 1D is a front elevation view of the vehicle of FIG. 1A.
Figure 2A:
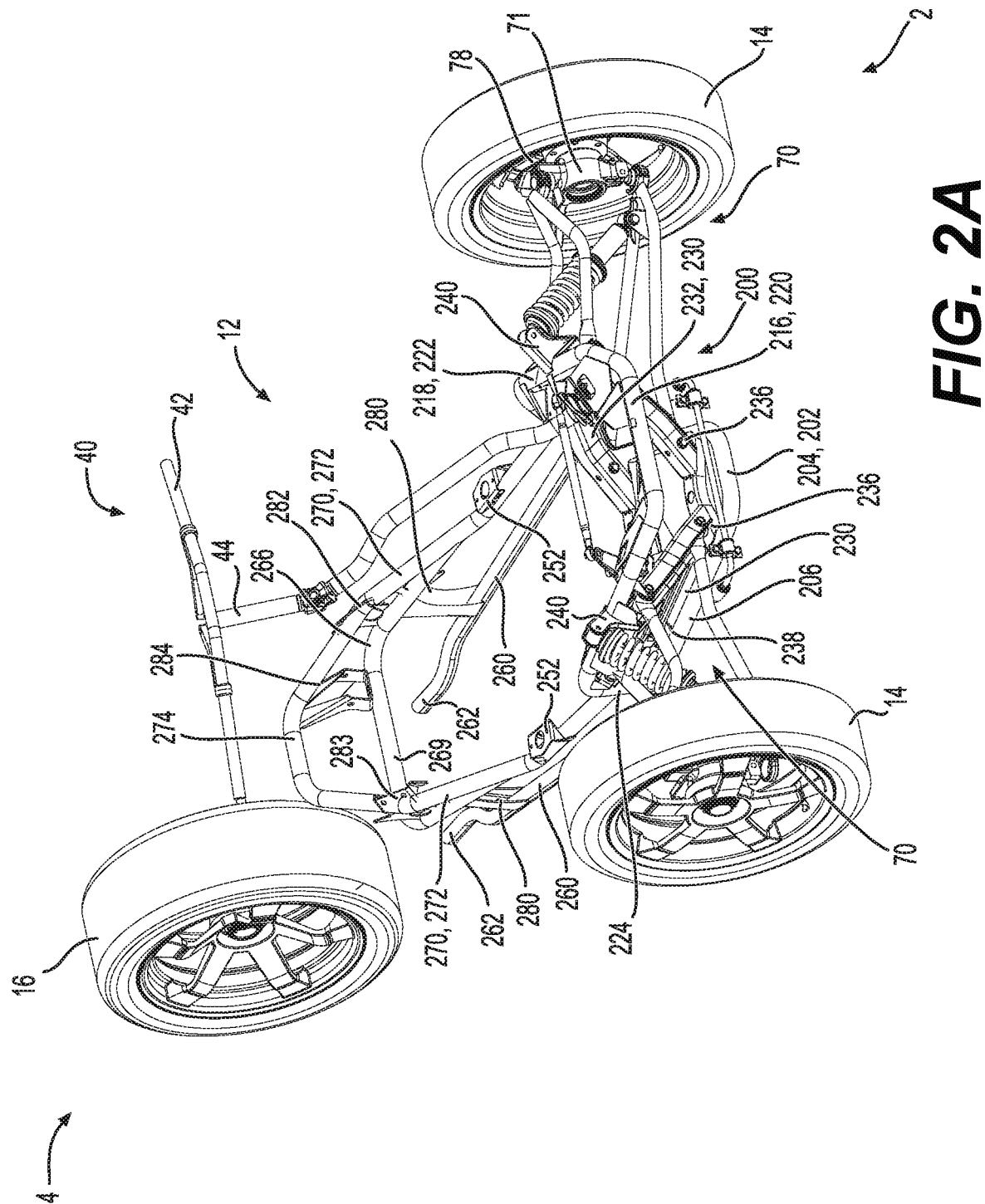
FIG. 2A is a perspective view, taken from a front, top and right side, of the vehicle frame, front and rear wheels, front suspension assemblies, and steering assembly of the vehicle of FIG. 1A.
Figure 2B:
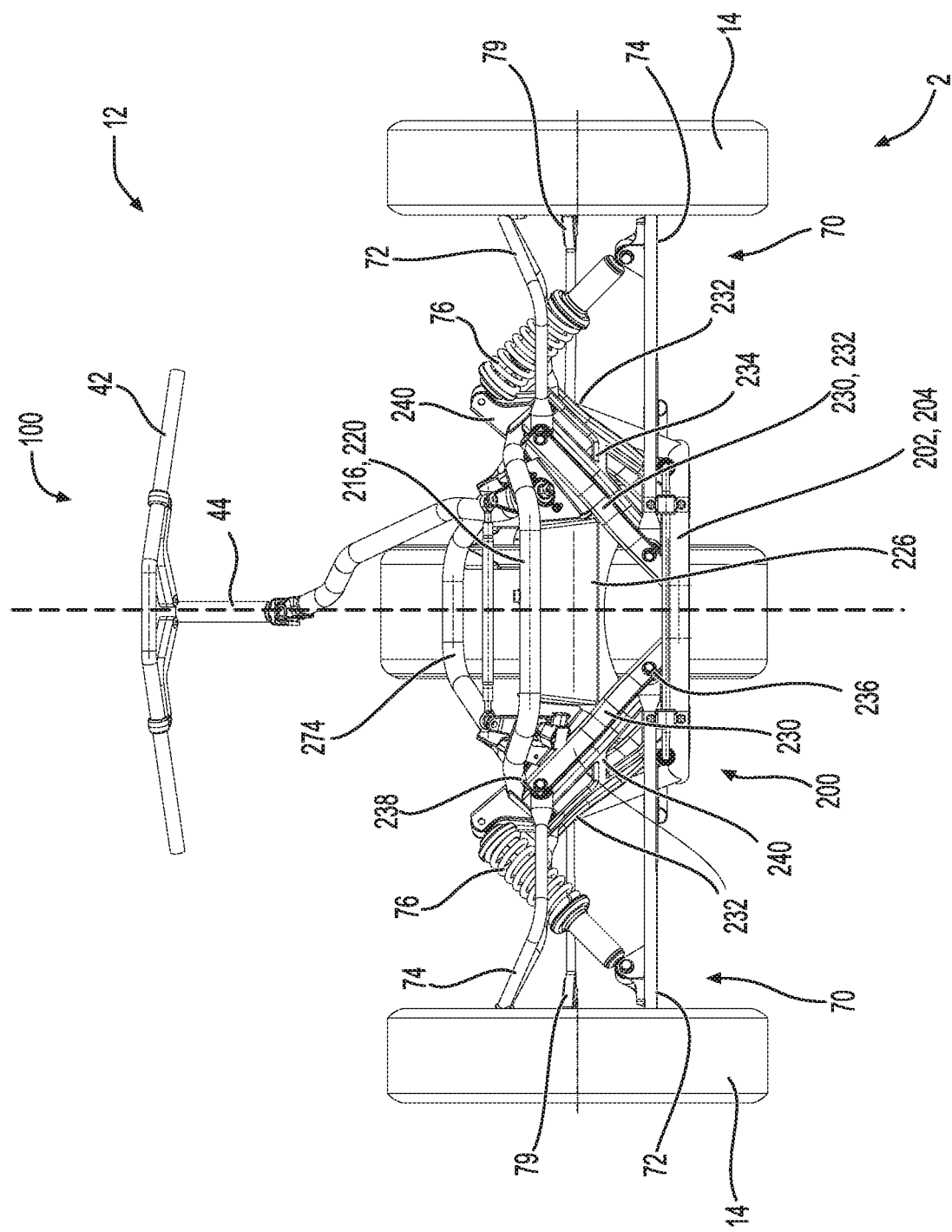
FIG. 2B is a front plan view of the vehicle frame, front and rear wheels, front suspension assemblies, and steering assembly of FIG. 2A.

With reference to FIGS. 1A to 1C, each of the two front wheels 14 and the rear wheel 16 is provided with a brake 90. The brakes 90 of the three wheels 14, 16 form a brake assembly 92. Each brake 90 is a disc-type brake mounted onto a hub of the respective wheel 14 or 16. Other types of brakes are contemplated. Each brake 90 includes a rotor 94 mounted onto the wheel hub and a stationary caliper 96 straddling the rotor 94. The brake pads (not shown) are mounted to the caliper 96 so as to be disposed between the rotor 94 and the caliper 96 on either side of the rotor 45a. The foot-operated brake operator 28 is operatively connected to the brakes 90 provided on each of the two front wheels 14 and the rear wheel 16. It is contemplated that the brake operator 28 could be in the form of a hand-operated brake lever connected to the handlebar 42 instead of the foot-operated brake pedal as shown herein. It is contemplated that the brake assembly 92 could be connected to a hand-operated brake lever mounted to the handlebar 42 in addition to the foot-operated brake pedal 28 mounted to the right footrest 26. The brake operator 28 is connected to a hydraulic cylinder (not shown) which is hydraulically connected to a hydraulic piston (not shown) of each brake caliper 96 via brake lines (not shown). When the brake operator 28 is actuated by the driver, hydraulic pressure is applied to the hydraulic cylinder and thereby to the piston of each caliper 96, causing the brake pads to squeeze their respective rotors 94 which, through friction, brakes the wheels 14 and 16. The hydraulic cylinder is also connected to a hydraulic reservoir (not shown) which ensures that adequate pressure is maintained in the brake lines and the hydraulic cylinder. The vehicle 10 also includes a vehicle stability system (not shown) operable to, inter alia, actuate each brake 90 individually in order to improve handling and stability. The vehicle stability system includes a hydraulic pump in fluidic connection with the hydraulic cylinder and each brake caliper 96. The vehicle stability system further includes an on-board computer that controls operation of the hydraulic pump in response to signals received from sensors such as a longitudinal acceleration sensor, a lateral acceleration sensor, a yaw rate sensor, an engine speed sensor or a wheel speed sensor. Examples of such a vehicle stability system are described in U.S. Pat. Nos. 8,086,382, 8,655,565 and 9,043,111, the entirety of which are incorporated herein by reference.

Although not shown, the vehicle 10 includes fairings which are connected to the frame 12 to enclose and protect the internal components of the vehicle 10 such as the engine 30. The fairings include a hood disposed at the front of the vehicle 10 between the front wheels 14, a rear deflector disposed over the rear wheel 16.

Frame

The vehicle frame 12 will now be described with reference to FIGS. 2A to 3D. For simplicity, all of the individual frame members of the vehicle frame 12 have been labeled only in FIGS. 2A to 3D. In the remaining figures, the frame 12 has been indicated generally but the specific labels for the individual frame members have been omitted to avoid crowding the figures.

The vehicle frame 12 includes a forward portion 200 and a rearward portion 201. The forward portion 200 includes a U-shaped lower frame member 202 formed of a tubular brace. The U-shaped frame member 202 has a central portion 204 (FIGS. 2A and 3C) extending generally laterally and horizontally. A left arm 206 (FIG. 3B) of the U-shaped frame member 202 extends rearwardly and laterally outwardly (leftwardly) from the left side of the central portion 204. A right arm 206 (FIG. 3A) of the U-shaped frame member 202 extends rearwardly and laterally outwardly (rightwardly) from the right side of the central portion 204. The left and right arms 206 of the U-shaped frame member 202 extend generally horizontally.

Figure 3A:
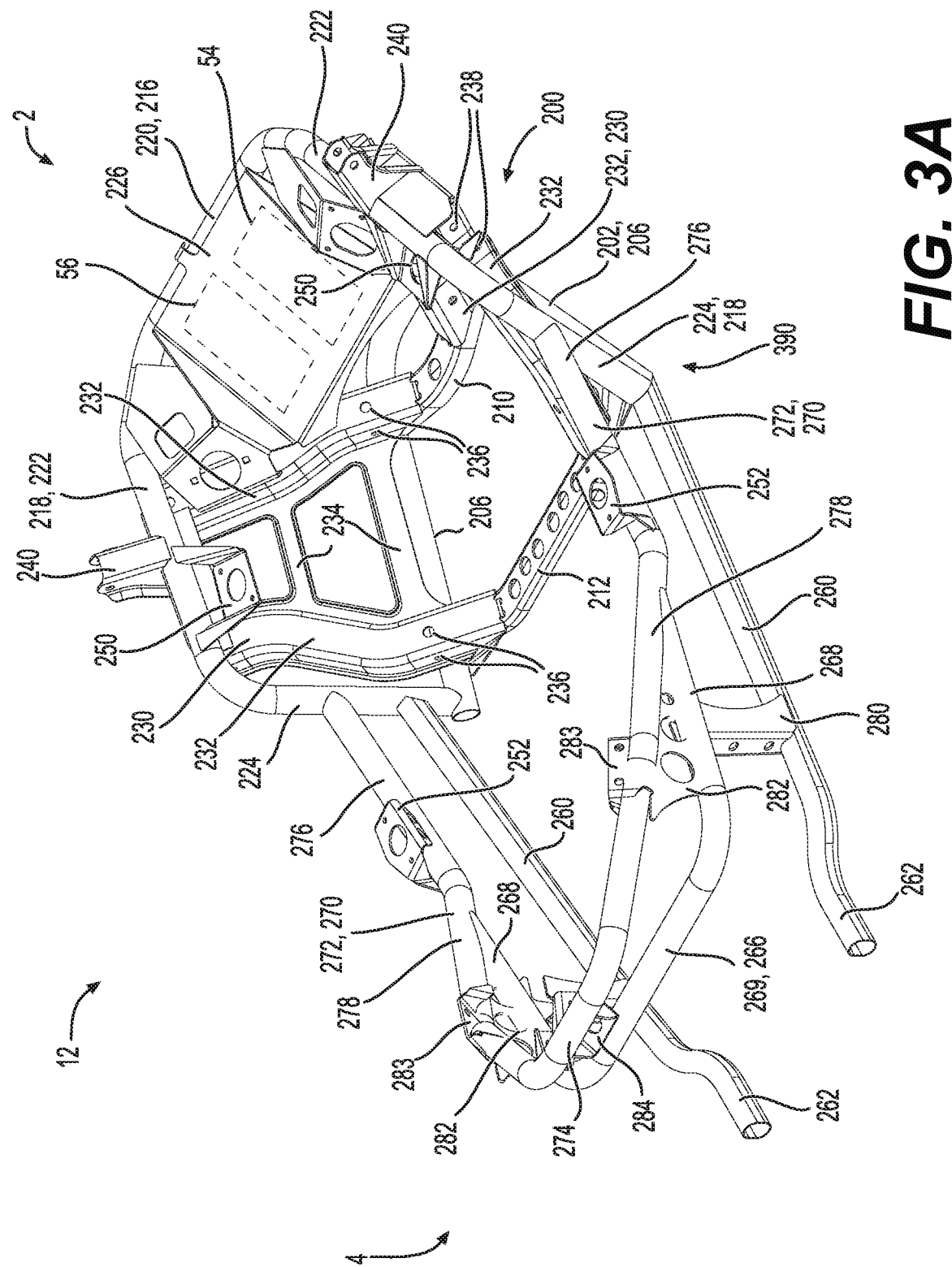
FIG. 3A is a perspective view, taken from a rear, top and right side, of the vehicle frame of FIG. 2A shown in isolation.
Figure 3B:
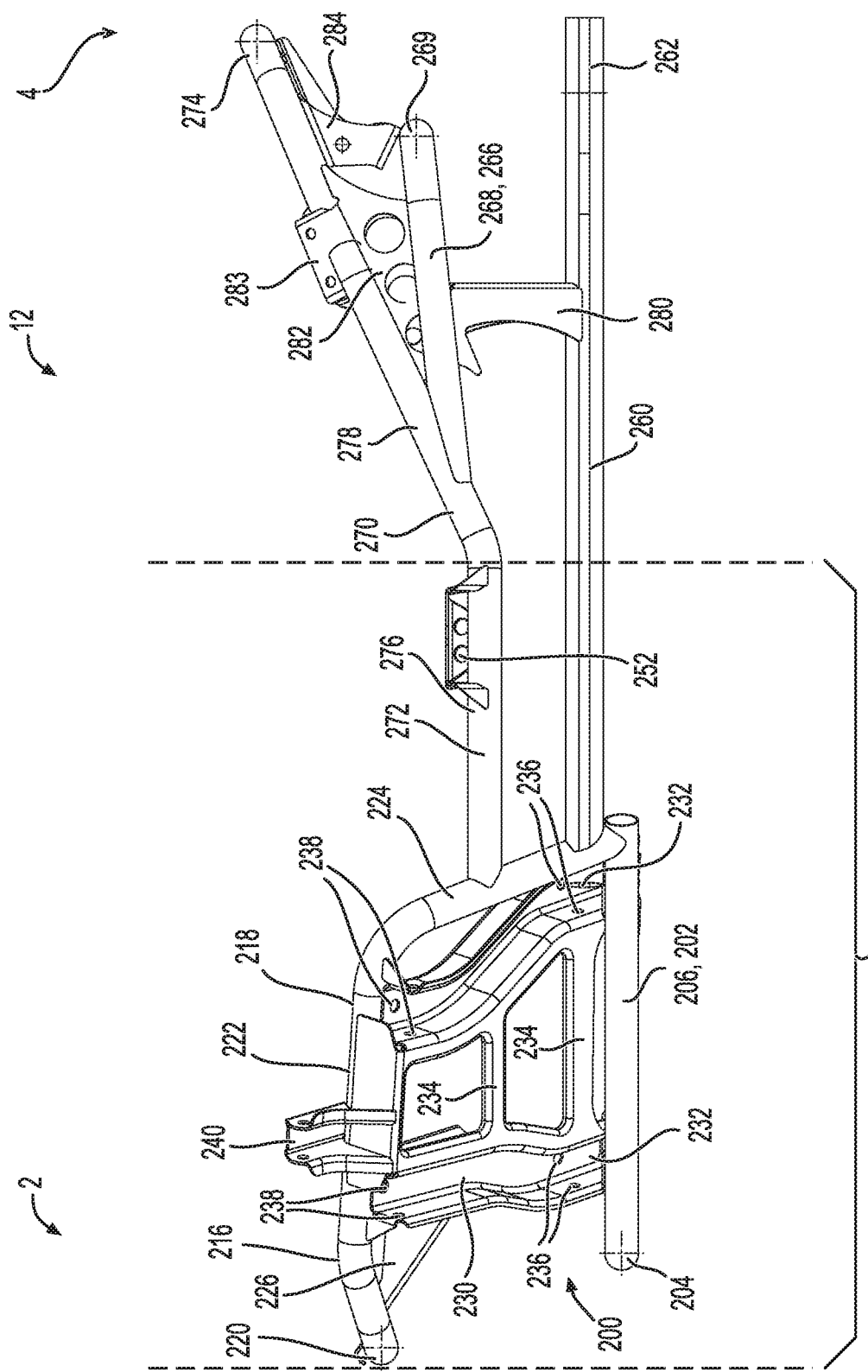
FIG. 3B is a left side elevation view of the vehicle frame of FIG. 3A.
Figure 3C:
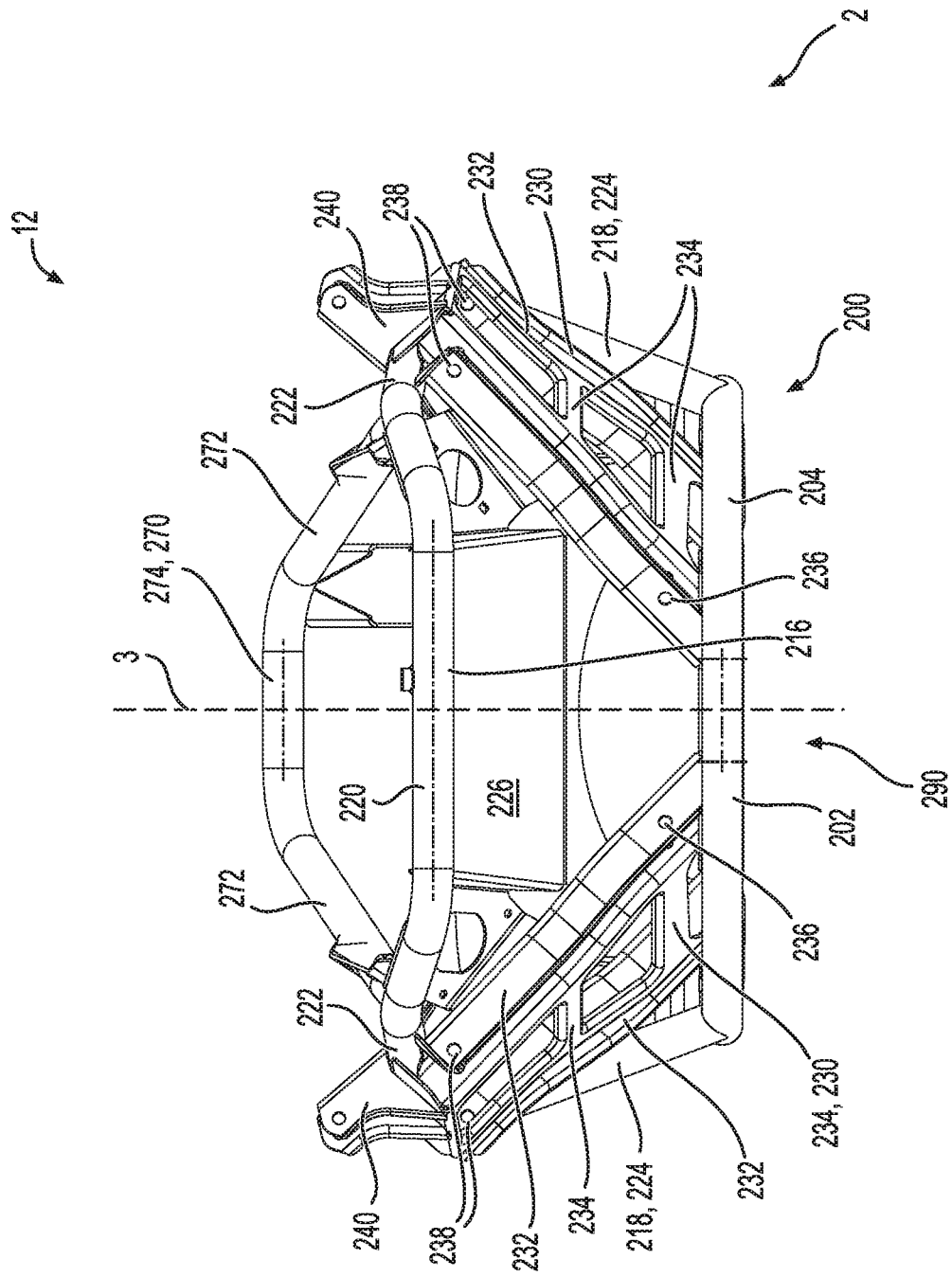
FIG. 3C is a front elevation view of the vehicle frame of FIG. 3A.
Figure 3D:
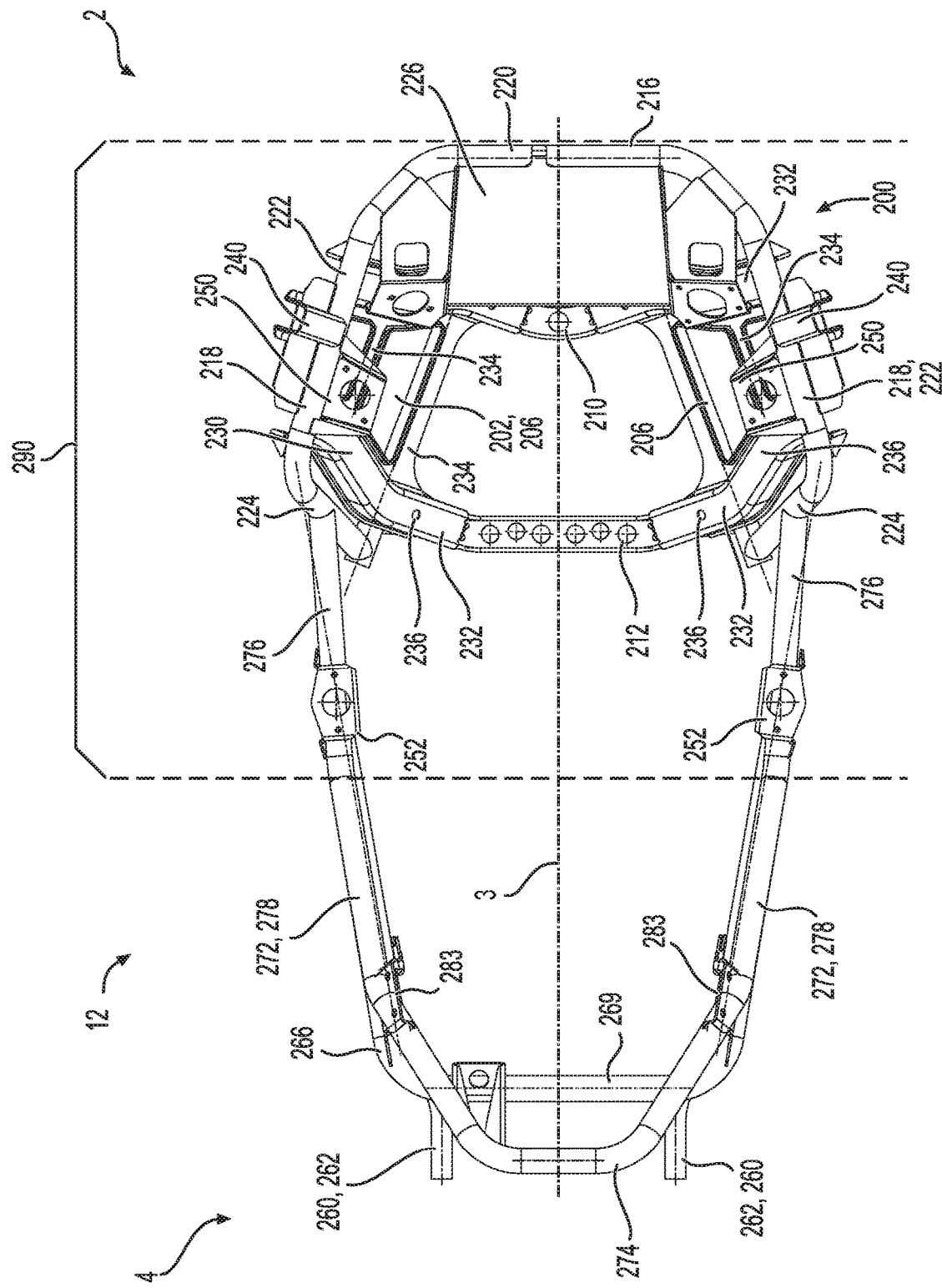
FIG. 3D is a top plan view of the vehicle frame of FIG. 3A.

As can be seen best in FIG. 3A, a front cross-member 210 and a rear cross-member 212 extend laterally between the left and right arms 206 of the U-shaped frame member 202. A left end of the front cross-member 210 is connected to the left arm 206 just rearwardly of the central portion 204 and a right end of the front cross-member 210 is connected to the right arm 206 just rearwardly of the central portion 204. The rear cross-member 212 has a left end connected to the left arm 206 near the rear end thereof and a right end connected to the right arm 206 near the rear end thereof. The cross-members 210, 212 enhance rigidity of the frame 12. The cross-members 210, 212 are made of stamped metal portions and have holes to reduce weight.

The forward portion 200 also includes an upper frame member 216 extending above the lower frame member 202. The upper frame member 216 has a left arm 218 and a right arm 218 connected together by central portion 220 extending laterally and horizontally at the front end. The left arm 218 has a horizontal portion 222 extending rearwardly and laterally outwardly from the left end of the central portion 220 to a vertical portion 224 of the left arm 218. The vertical portion 224 of the left arm 218 extends downwardly and laterally inwardly to the upper surface of left arm 206 of the lower frame member 202 near the rear end thereof. The right arm 218 has a horizontal portion 222 extending rearwardly and laterally outwardly from the right end of the central portion 220 to a vertical portion 224. The vertical portion 224 of the right arm 218 extends downwardly and laterally inwardly to the upper surface of right arm 206 of the lower frame member 202 near the rear end thereof. The lower ends of the left and right vertical portions 218 are respectively connected to the upper surfaces of the left and right arms 206 by welding. The horizontal 220 and vertical portions 218 are formed from a single tubular brace bent to form the structure describe above. The radiator 52 is mounted to the central portions 204 and 220 as can be seen in FIG. 1A.

A plate member 226 is connected to the horizontal portion 222 and extends downwardly and rearwardly therefrom. The plate member 226 is used to mount various components of the vehicle 10 such as the power steering unit, a battery 54 (shown schematically in FIG. 3A), a fuse box 56 (shown schematically in FIG. 3A), and the like.

The forward portion 200 also includes a left front suspension mounting bracket 230 and a right front suspension mounting bracket 230. The right front suspension mounting bracket 230 is generally a mirror image of the left front suspension mounting bracket 230, and as such, only the left front suspension mounting bracket 230 will be described herein. The left front suspension mounting bracket 230 includes two vertical members 232 connected together by three cross-members 234 extending horizontally therebetween. The members 232, 234 are formed by stamping metal sheets. The upper ends of the front and rear vertical members 232 are connected to the horizontal portion of the left arm 218 of the upper frame member 216. From their respective upper ends, the front and rear vertical members 232 each extend downwardly and laterally inwardly. The lower end of the front vertical member 232 is connected to the front cross-member 210 near the left end thereof. The lower end of the rear vertical member 232 is connected to the rear cross-member 212 near the left end of. One of the cross-members 234 extends between the front and rear vertical members 232 just above the left arm 206 of the lower frame member 202. Bolt holes 236 are defined in each of the front and rear vertical members 232 near the connection with the cross-member 234 for pivotally connecting the lower A-arm 74 of the left front suspension 70. Bolt holes 238 are defined in each of the front and rear vertical members 232 near their respective upper ends for connecting the upper A-arm 72 of the left front suspension 70.

A left shock absorber mounting bracket 240 is connected to the horizontal portion 222 of the left arm 218 of the upper frame member 216 between the front and rear vertical members 232 for connecting the upper end of the shock absorber 76 of the left front suspension assembly 70. The left shock absorber mounting bracket 240 is connected to the upper and laterally outer surface of the horizontal portion 222. The left shock absorber mounting bracket 240 extends upwardly and laterally outwardly from the horizontal portion 222. The left shock absorber mounting bracket 240 is U-shaped in cross-section with two spaced apart generally planar flanges extending parallel to each another and another planar flange extending between the two parallel flanges. A throughhole is defined in each of the two parallel flanges. The upper end of the shock absorber 76 is pivotally connected to the shock absorber mounting bracket 240 by a bolt inserted through the throughholes and the upper end of the shock absorber 76 disposed therebetween. A right shock absorber mounting bracket 240 is similarly connected to the horizontal portion 222 of the right arm 218 of the upper frame member 216 between the front and rear vertical members 232 for connecting the upper end of the shock absorber 76 of the right front suspension assembly 80. The right shock absorber mounting bracket 240 is generally a mirror image of the left shock absorber mounting bracket 240, and as such, will not be described herein.

A front left bracket 250 is connected to the horizontal portion 222 of the left arm 218 of the upper frame member 216 just rearwardly of the left shock absorber mounting bracket 240. The front left bracket 250 extends laterally inwardly from the horizontal portion 222. The front left bracket 250 has two vertical spaced apart flanges connected together at their lower ends by a horizontal plate having a central aperture. Similarly, a front right bracket 250 is connected to the horizontal portion of the right arm 218 of the upper frame member 216 just rearwardly of the right shock absorber mounting bracket 240. The front right bracket 250 is generally a mirror image of the front left bracket 250, and as such will not be described herein in detail. The brackets 250 are formed by stamping metal sheets. The brackets 250 are connected to the horizontal portion 222 by welding. A front portion of the engine 30 is connected to the left and right brackets 250 as will be described below in further detail.

The rearward portion 201 of the vehicle frame 12 includes a lower left frame member 260 extending rearwardly from the vertical portion 224 of the left arm 218 of the lower frame member 202 and a lower right frame member 260 extending rearwardly from the vertical portion 224 of the right arm 218 of the lower frame member 202. The lower left frame member 260 is formed of a tubular brace and extends generally horizontally. The front end of the lower left frame member 260 is connected to the vertical portion 224 just above the lower end thereof. From the front end, the lower left frame member extends generally horizontally and laterally inwardly towards a rear end portion 262. Just forward of the rear end portion 262, the lower left frame member 260 curves sharply laterally inwardly. The lower right frame member 260 is generally a mirror image of the lower left frame member 260 and as such, only the lower left frame member 260 will be described herein.

The rearward portion 201 includes a generally U-shaped rear upper frame member 270 disposed above the lower left frame member 260. The rear upper frame member 270 includes a left arm 272, a right arm 272 and a central portion 274 extending therebetween. The right arm 272 is generally a mirror image of the left arm 272 and as such, only the left arm will be described herein. The front end of the left arm 272 is connected to the vertical portion 224 of the left arm 218 of the lower frame member 202 above the lower left frame member 260. From the front end, left arm 272 extends generally longitudinally and laterally inwardly toward the central portion 274. A front portion 276 of the left arm 272 extends generally horizontally. A rear portion 278 of the left arm 272 extends upwardly and rearwardly away from the horizontal front portion 276 thereof. The central portion 274 extends generally laterally between the rear ends of the left and right arms 272. The central portion 274 is disposed vertically higher than the central portion 220. The rear upper frame member 270 is formed of a single tubular brace bent to form the portions 272, 274 described above.

Another U-shaped rear member 266 of the rearward portion 201 is connected to the rear portion 278 of the rear upper frame member 270. The rear member 266 is disposed below the upper frame member 270 and above the lower left and right frame members 260. The rear member 266 has a left arm 268, a right arm 268 and a central portion 269 connecting therebetween. A front end of the left arm 268 is connected to the rear portion 278 of the upper frame member left arm 272 and a front end of the right arm 268 is connected to the rear portion 278 of the upper frame member right arm 272. Each of the left and right arms 268 extend rearwardly and gently upwardly from the respective front ends to the central portion 269. The central portion 269 is disposed longitudinally forwardly of the rear upper frame member central portion 274. The rear member 266 is formed of a single tubular brace bent to form the portions 268, 269 described above.

A rear left bracket 252 is connected to the horizontal front portion 276 of the left arm 272 of the rear upper frame member 270 just forward of the bend where the left arm 272 begins to extend upwardly. Similarly, a rear right bracket 252 is connected to the horizontal front portion 276 of the right arm 272 of the rear upper frame member 270 just forward of the bend where the right arm 272 begins to extend upwardly. The transfer case 36 is mounted to the rear left and right brackets 252 as will be described below in further detail.

A left bracket 280 is connected between the left arm 268 of the rear member 266 and the lower left frame member 260. A left bracket 282 is connected between the left arm 268 of the rear member 266 and the left arm 272 of the upper frame member 270. A left bracket 283 extends upwardly from the left arm 272 above the left bracket 282. The vehicle frame 12 similarly includes a right bracket 280 connected between the right arm 268 of the rear member 266 and the lower right frame member 260. A right bracket 282 is connected between the right arm 268 of the rear member 266 and the right arm 272 of the upper frame member 270. A right bracket 283 extends upwardly from the right arm 272 above the right bracket 282. The brackets 280, 282 enhance the rigidity of the vehicle frame 12. The left and right bracket 283 are connected to the left and right sides respectively of the fuel tank 60 for mounting the fuel tank 60 to the vehicle frame 12 as can be seen in FIGS. 1B and 1C. A bracket 284 having a U-shaped cross-section extends downwardly from the central portion 274 of the rear upper frame member 270 for connecting a front end of the rear suspension assembly 24.

Figure 1E:
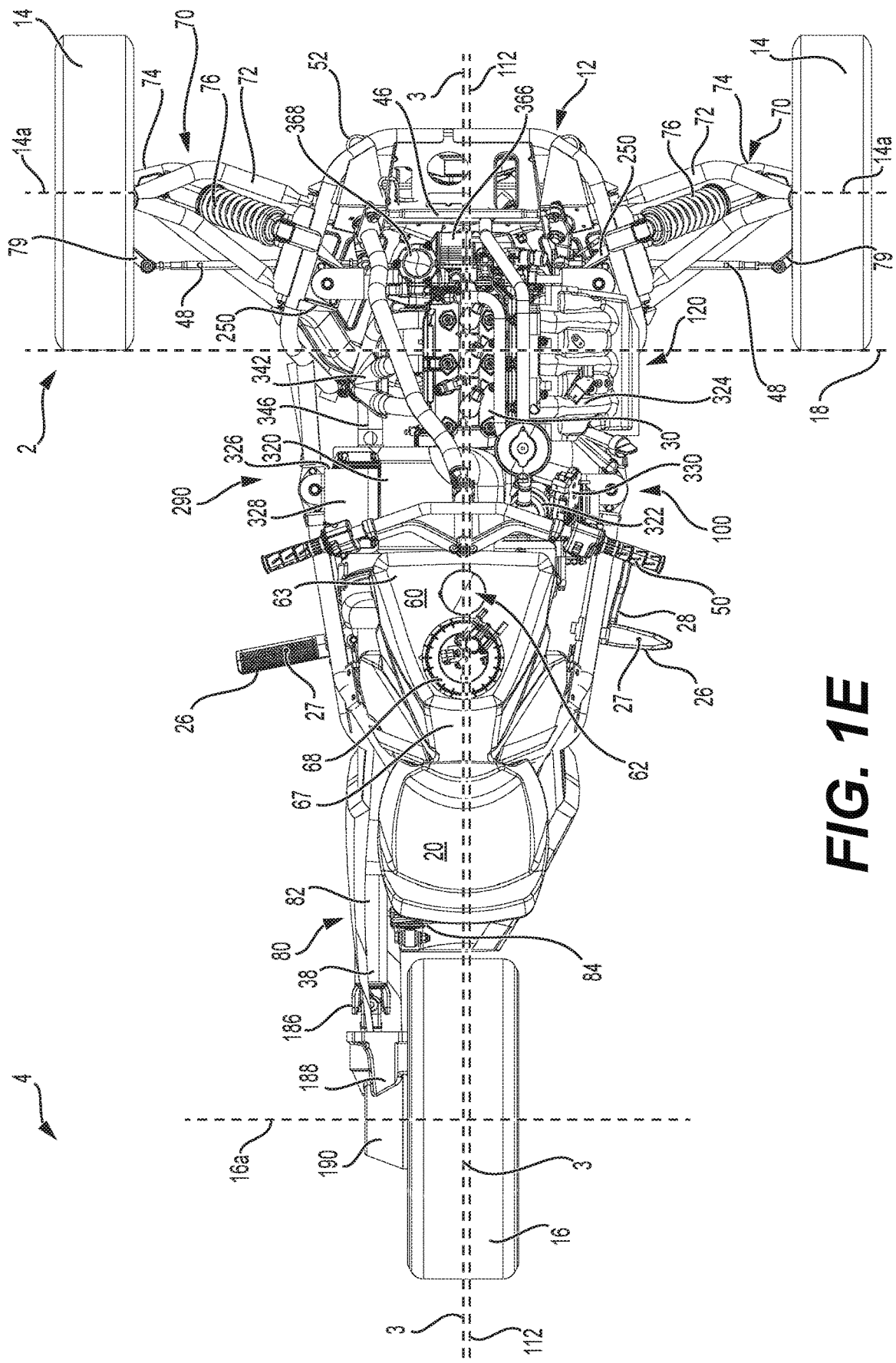
FIG. 1E is a top plan view of the vehicle of FIG. 1A.
Figure 1F:
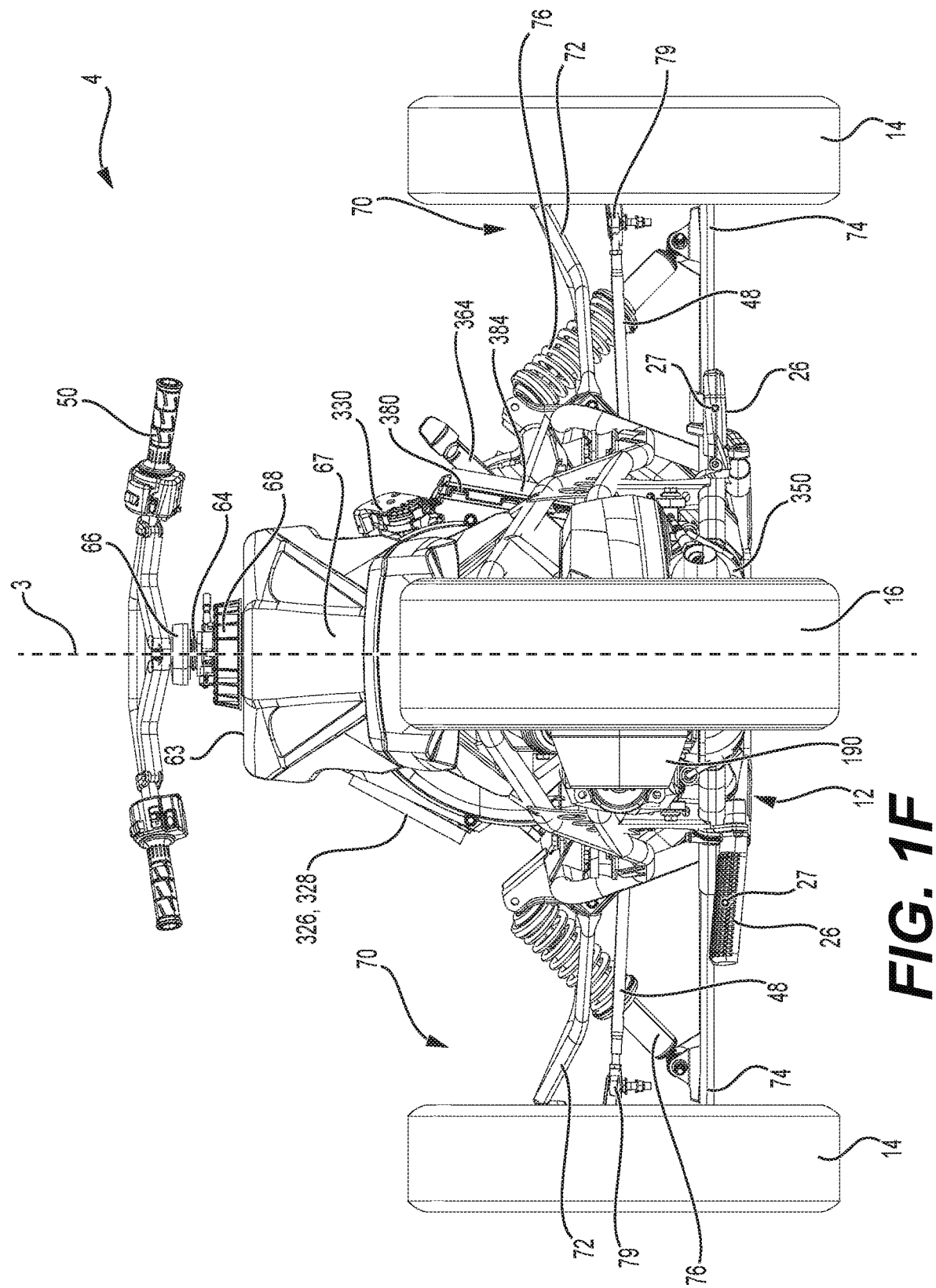
FIG. 1F is a rear elevation view of the vehicle of FIG. 1A.
Figure 1G:
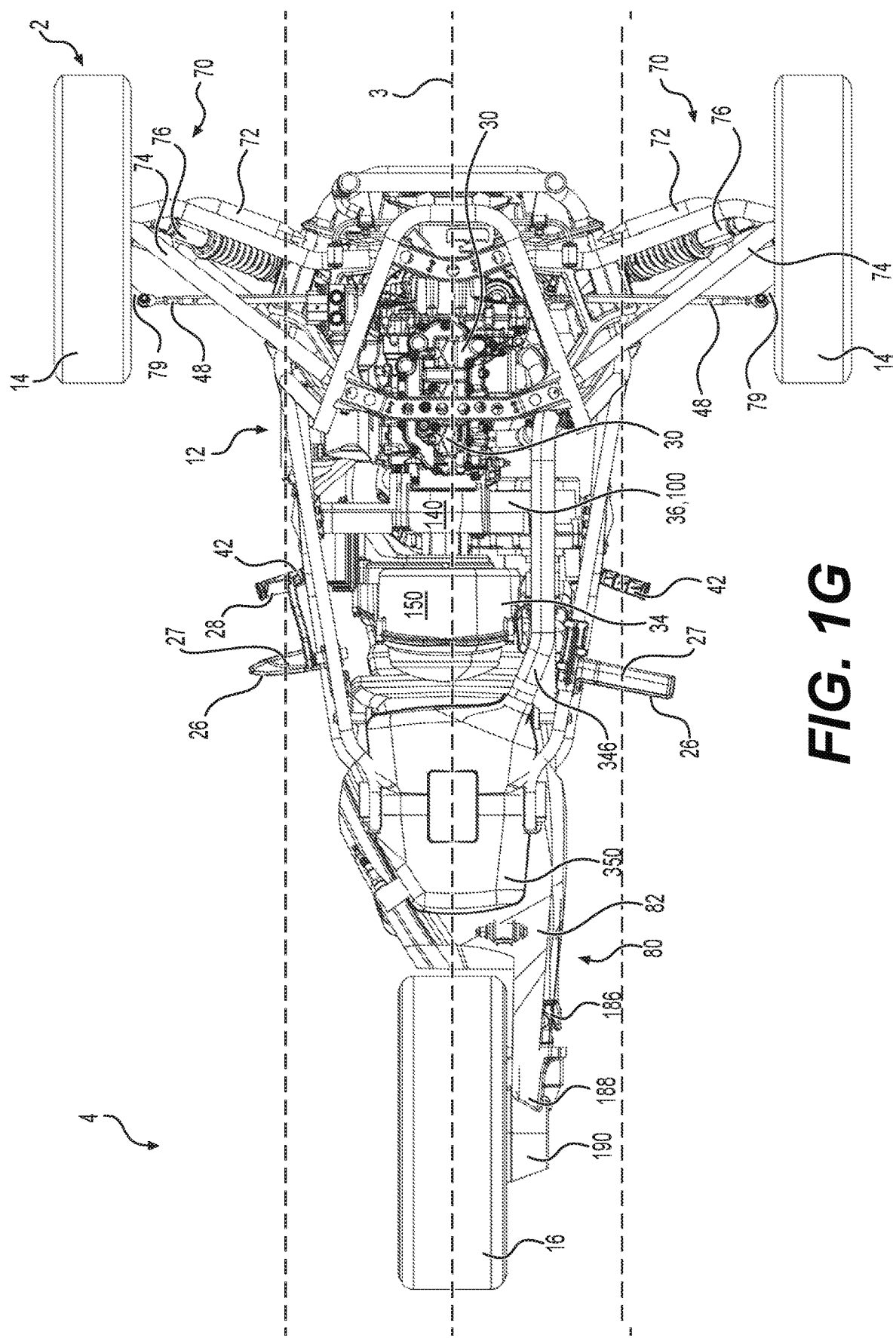
FIG. 1G is a bottom plan view of the vehicle of FIG. 1A.
Figure 1H:
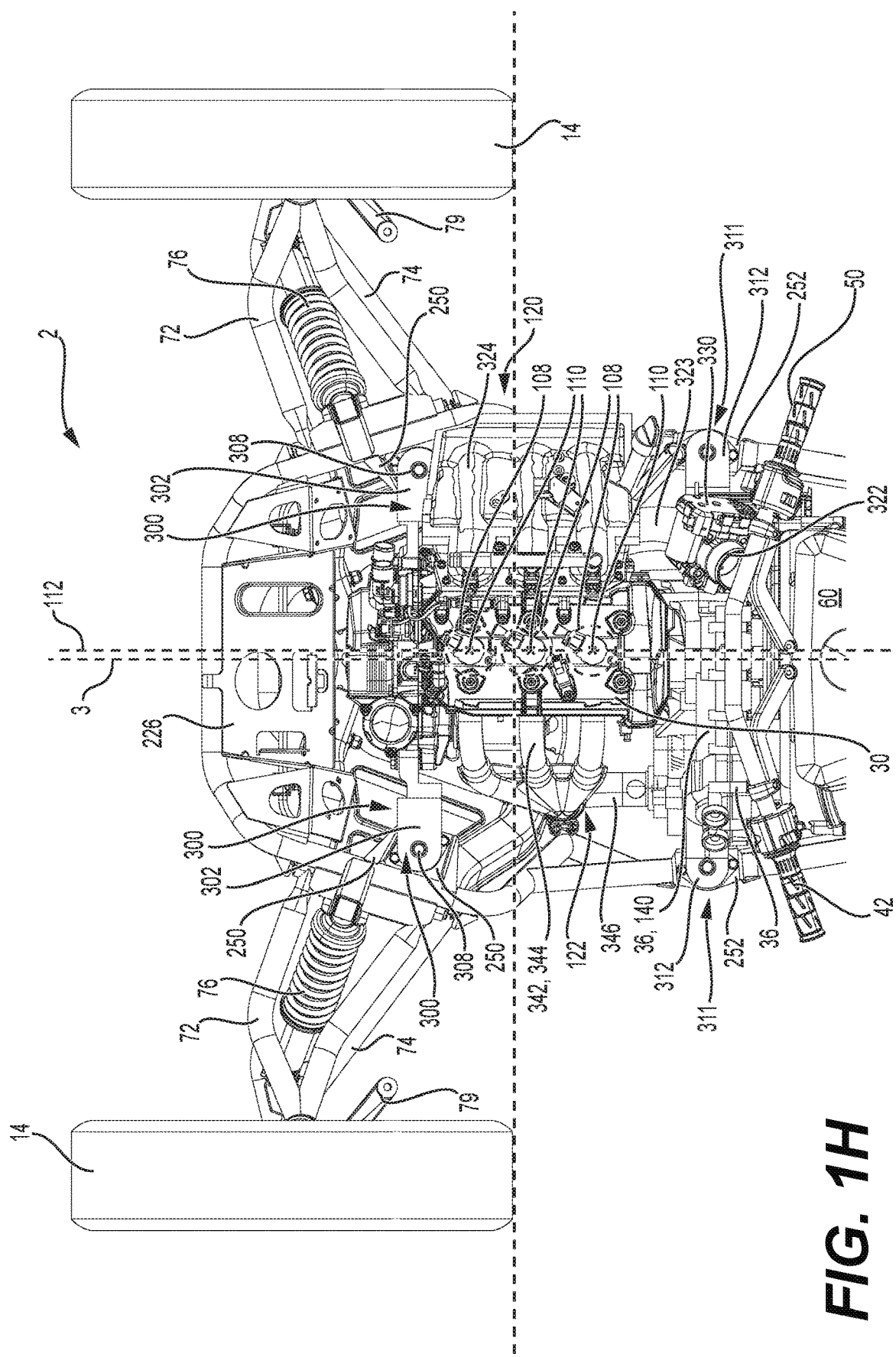
FIG. 1H is a close-up top plan view of a front portion of the vehicle of FIG. 1A.

The vehicle frame 12 defines an engine cradle 290. The engine cradle 290 is defined by the forward frame portion 200, the front portions 276 of the left and right upper frame members 270 and the respective front portions of the left and right lower frame members 260. The engine 30 is disposed in the engine cradle 290 and mounted to the vehicle frame 12 via the front left and right brackets 250 as can be seen in FIGS. 1E and 1H and described below in further detail. The rear brackets 252 are connected to the transfer case 36 as can be seen in FIGS. 1E and 1H and described below in further detail.

Powertrain

The powertrain 100 now be described with reference to FIGS. 1B, 1H, and 4A to 5E.

As mentioned above, the vehicle powertrain 100 is formed by the engine 30, the engine output shaft 32, the CVT 34, the transfer case 36 and the driveshaft 38 in the illustrated implementation of the vehicle 10.

The engine 30 has a crankcase 102, a cylinder block 104 disposed on and connected to the crankcase 102, and a cylinder head assembly 106 disposed on and connected to the cylinder block 104. The crankshaft 31 (shown schematically in FIGS. 5C and 5D) is housed in the crankcase 102.

The cylinder block 104 defines three cylinders 108 (shown schematically in FIG. 5A) d, including a rear cylinder 108, a middle cylinder 108, and a front cylinder 108, defined in the cylinder block 104. Each cylinder 108 defines a cylinder axis 110. A piston (not shown) is disposed inside each cylinder 108 for reciprocal movement therein along the cylinder axis 110. The lower end of each piston is linked by a connecting rod (not shown) to the crankshaft 31. A combustion chamber is defined in the upper portion of each cylinder 108 by the walls of the cylinder 108, the cylinder head assembly 106 and the top of the piston. Explosions caused by the combustion of an air/fuel mixture inside the combustion chambers cause the pistons to reciprocate inside the cylinders 108. The reciprocal movement of the pistons causes the crankshaft 31 to rotate, thereby allowing power to be transmitted from the crankshaft 31 to the rear wheel 16. The cylinder head assembly 106 also includes a fuel injector (not shown) for each cylinder. The fuel injectors receive fuel from a fuel tank 60 via a fuel rail 116. The engine 30 receives air from an air intake system 120 which will be described in further detail below. A spark plug 114 is provided in the cylinder head assembly 106 for each cylinder 108 ignite the air/fuel mixture in each cylinder 108. The exhaust gases resulting from the combustion of the air-fuel mixture in the combustion chamber are removed from the engine 30 and then released to the atmosphere via an exhaust system 122, also described below in further detail.

As can be seen in FIG. 1B, the engine 30 is mounted to the vehicle frame 12 such that in a projection of the vehicle 10 onto a plane extending vertically and longitudinally, the crankshaft rotation axis 31a is disposed below the rotation plane 15 defined by the wheels 14, 16.

As can be seen in FIGS. 1H and 4B to 5B, the cylinders 108 are arranged in an inline configuration such that the cylinder axes 110 of the three cylinders 108 define a cylinder plane 112 extending generally vertically and longitudinally. In the illustrated implementation, the rotation axis 31a of the crankshaft 31 is contained in the cylinder plane 112. It is contemplated that the crankshaft axis 31a could be offset from the cylinder plane 112. It is also contemplated that the engine 30 could have more than three cylinders 108 or fewer than three cylinders 108. In general, the cylinder plane 112 is defined as a plane containing the respective cylinder axes 110 of the cylinders 108 and either extending parallel to the crankshaft axis 31a or containing the crankshaft axis 31a.

In the illustrated implementation, the cylinder plane 112 is parallel to the longitudinal centerplane 3 and laterally offset therefrom. The cylinder plane 112 is disposed slightly to the right of the longitudinal centerplane 3. It is contemplated that the lateral offset of the cylinder plane 112 with respect to the longitudinal centerplane 3 could be different from that shown herein. For example, the cylinder plane 112 could be disposed on a left side of the longitudinal centerplane 3, or aligned therewith, instead of being on a right side thereof. It is also contemplated that the cylinders 108 could be arranged in an inline configuration such that the cylinder plane 112 could be disposed at an angle with respect to the longitudinal centerplane 3.

As can be seen in FIG. 1H, the engine 30 is mounted to the vehicle frame 12 such that the forwardmost cylinder 108 and a forward portion of the middle cylinder 108 are disposed forward of the front wheel plane 18. It is contemplated that the longitudinal position of the cylinders 108 could be different from that shown herein as long as at least a portion of at least one cylinder 108 is disposed forward of the front wheel plane 18. In the illustrated implementation of the vehicle 10, the footrests 26 and the handlebar 42 are both disposed longitudinally rearwardly of the engine 30.

In the lateral direction, the cylinders 108 of the engine 30 are entirely disposed between the connection of the left footrest 26 to the vehicle frame 12 and the connection of the right footrest 26 to the vehicle frame 12 as can be seen in FIG. 1E. In general, the entire engine 30 is disposed between a center 27 of the left footrest 26 and a center 27 of the right footrest 26. The cylinders 108 of the engine 30 are disposed laterally between the front left and right suspension assemblies 70 in the illustrated implementation of the vehicle 10. In general, at least a portion of at least one cylinder 108 is disposed between the front left and right suspension assemblies 70.

Figure 5A:
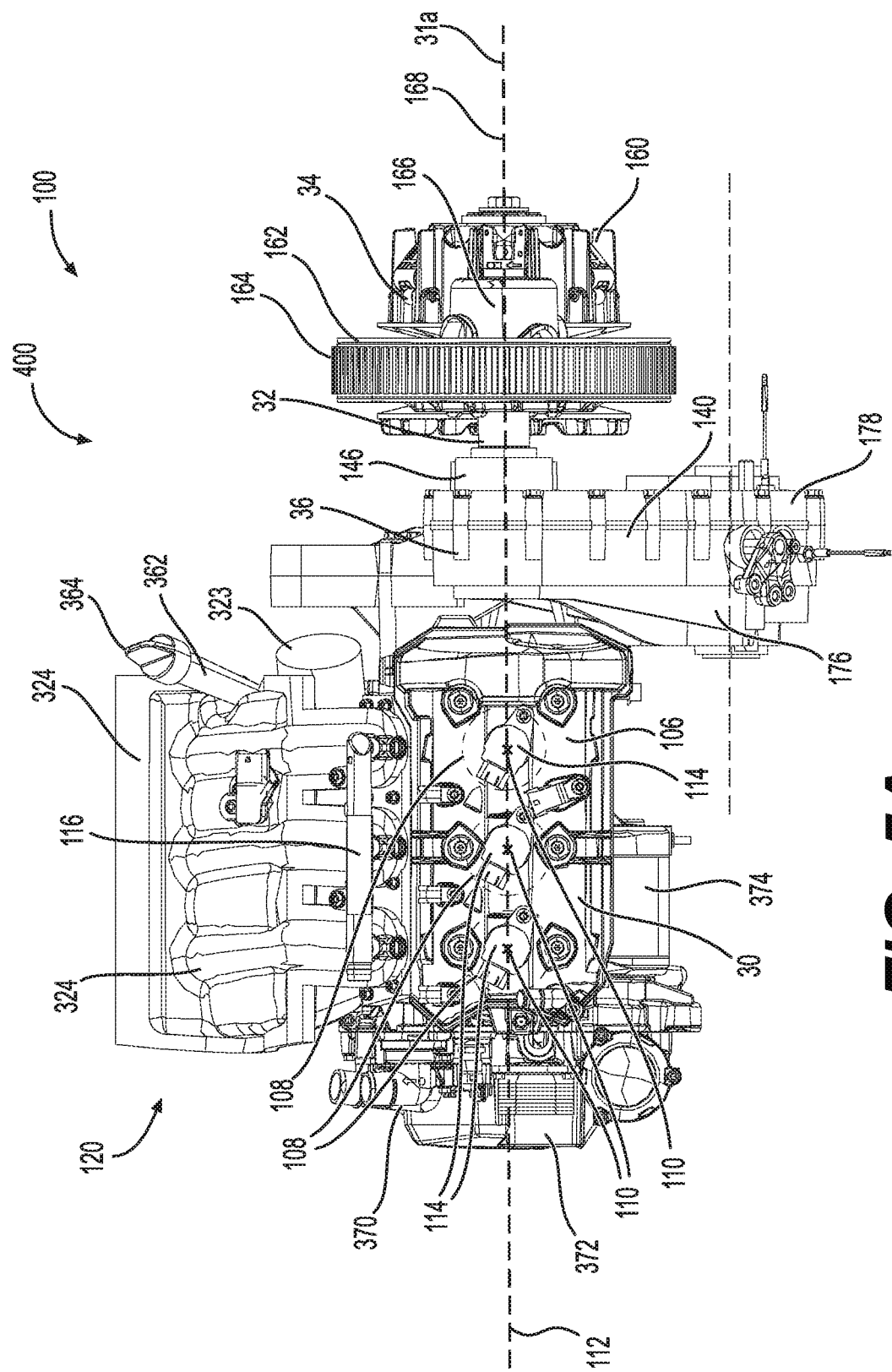
FIG. 5A is a top plan view of a portion of the powertrain of FIG. 4A showing the engine, engine output shaft, transfer case and continuously variable transmission (CVT) of the powertrain of FIG. 4A with the CVT housing being removed for clarity.
Figure 5B:
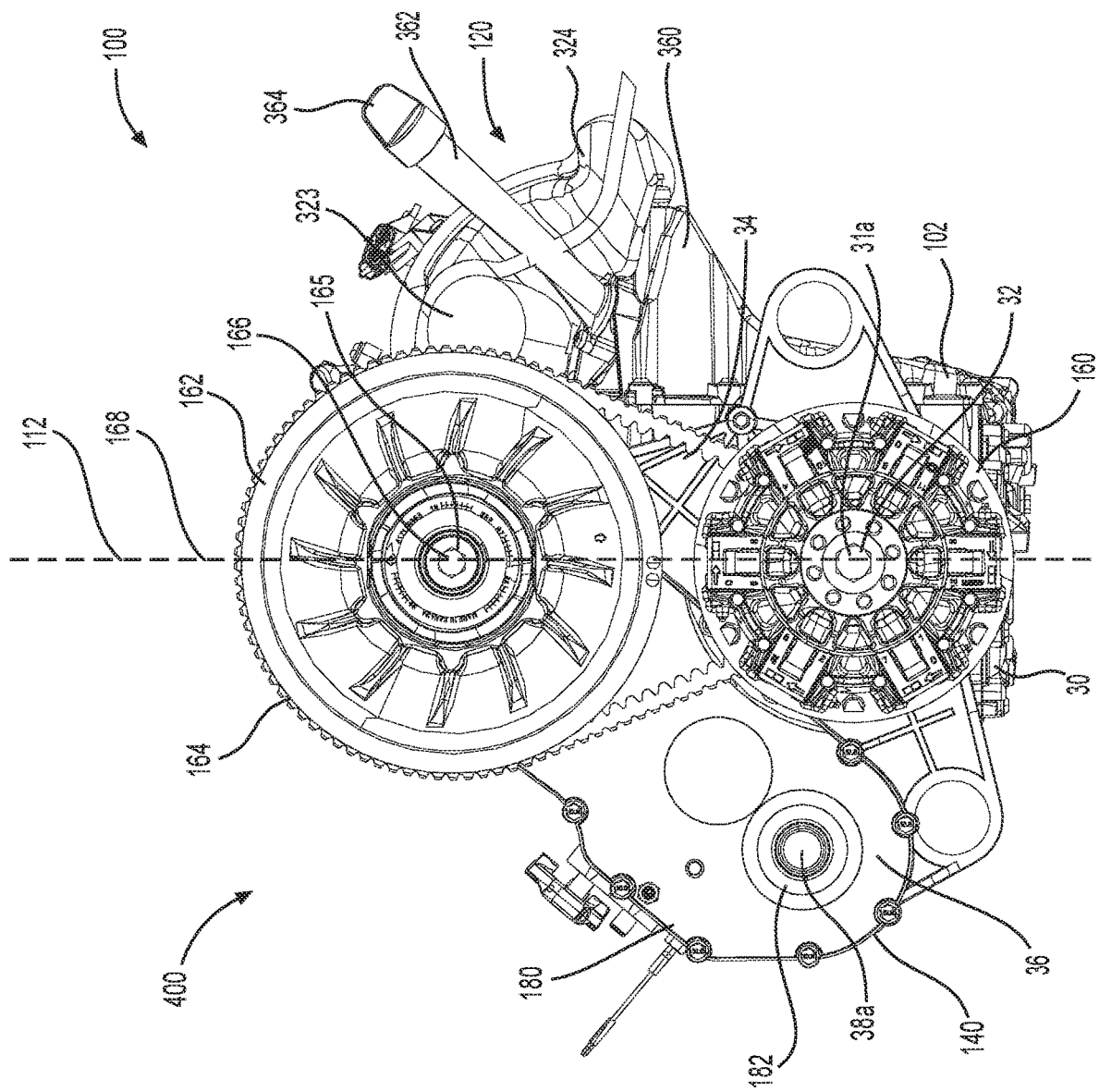
FIG. 5B is a rear elevation view of the powertrain portion of FIG. 5A.
Figure 5C:
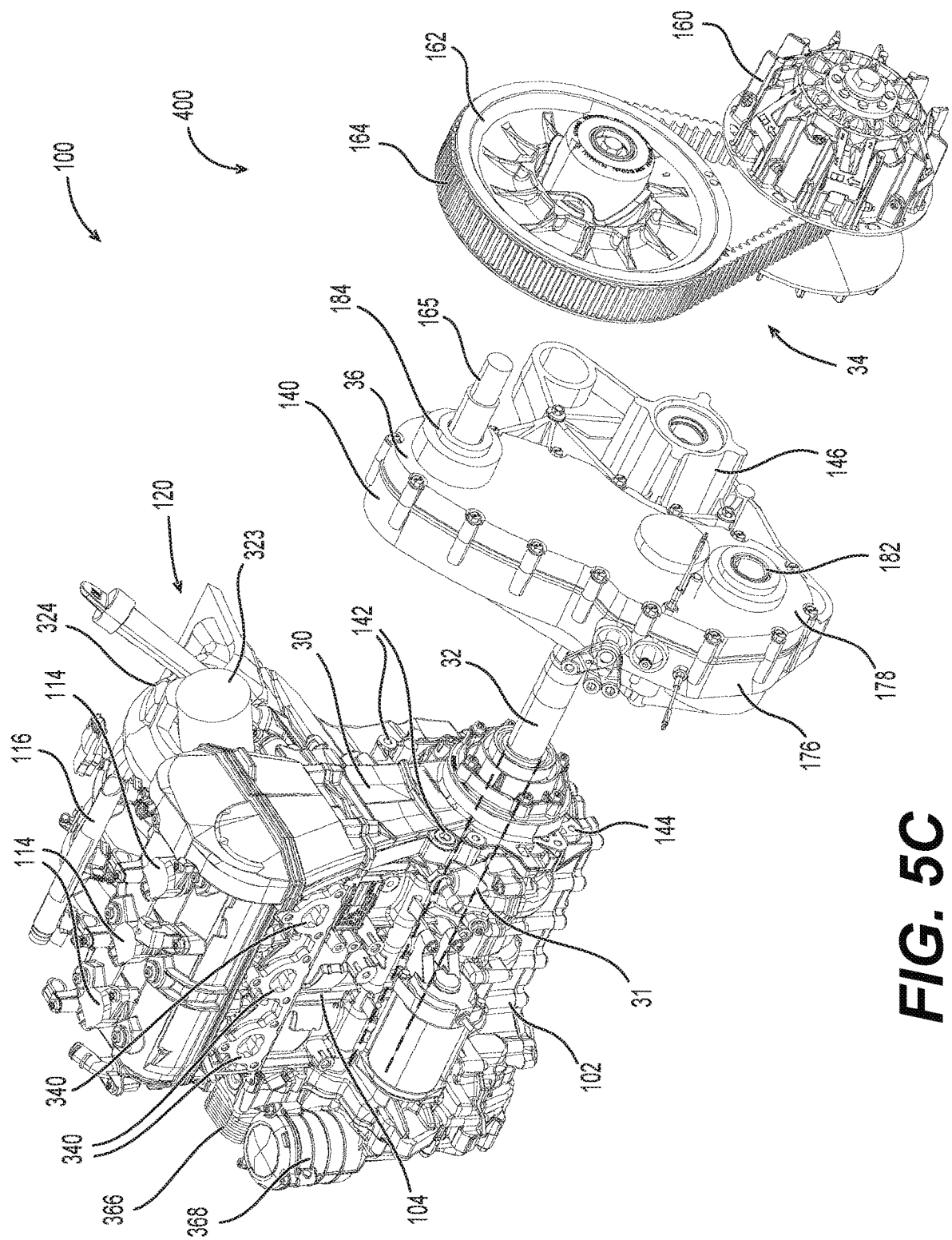
FIG. 5C is an exploded perspective view, taken from a rear, top and left side, of the powertrain portion of FIG. 5A.
Figure 5D:
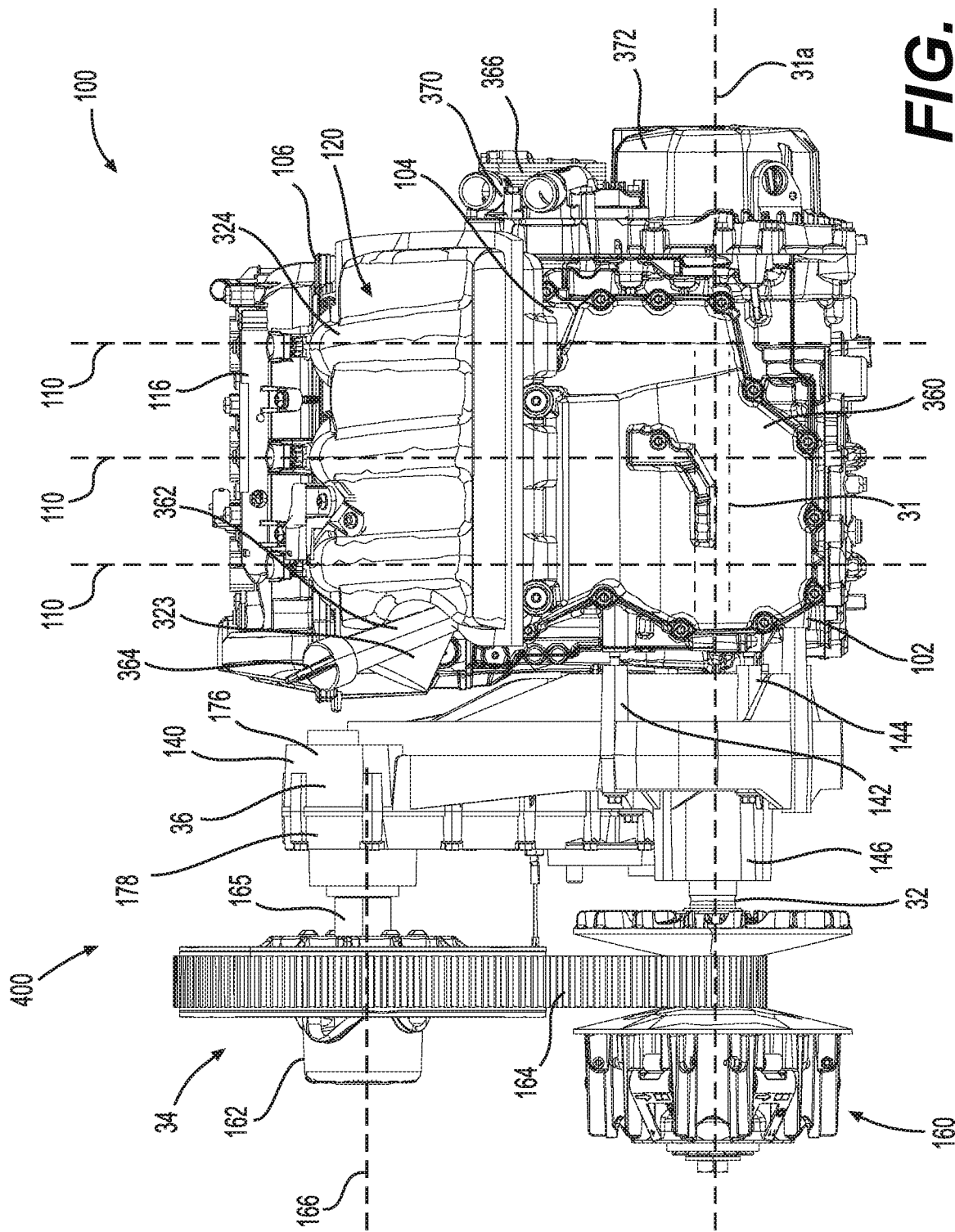
FIG. 5D is right side elevation view of the powertrain portion of FIG. 5A.

With reference to FIGS. 1H, 5C and 5D, the transfer case 36 is disposed longitudinally rearwardly of the engine 30. The transfer case 36 is disposed such that there is an overlap between the transfer case and the engine 30 in the lateral and vertical directions (i.e. when viewed from the rear or from a side). The transfer case 36 includes a transfer case housing 140 which is mounted to the rear end of the engine 30 via boltholes 142 of the cylinder block 104 and boltholes 144 of the crankcase 102 as can be seen in FIGS. 5C and 5D.

With reference to FIG. 5D, the engine output shaft 32 extends rearwardly from the rear end of the crankcase 102, through an engine output shaft housing 146 connected to the transfer case housing 140 to connect to the CVT 34. In the illustrated implementation, the engine output shaft 32 is connected directly to the crankshaft 31 and serves as an extension thereof, but it is contemplated that the engine output shaft 32 could be operatively connected to the crankshaft 31 via one or more gears. It is also contemplated that the engine output shaft 32 could be integrally formed with the crankshaft 31.

With reference to FIGS. 5D and 11D to 11F, the CVT 34 includes a CVT housing 150 disposed longitudinally rearwardly of the transfer case 36. The CVT 34 is disposed such that there is an overlap between the transfer case 36 and the CVT 34 in the lateral and vertical directions (i.e. when viewed from the rear or from a side). The CVT housing 150 includes a front cover 152 and a rear cover 156. The front cover 152 is mounted to the transfer case and the rear cover 156 is removably mounted to the front cover 152. The CVT housing 150 defines a CVT chamber 154 (FIGS. 11E and 11F) between the front and rear covers 152, 156. The front cover 152 includes a rearwardly extending rim that is bolted to a forwardly extending rim of the rear cover 156 by bolts. Two openings 158, 159 (FIG. 11D) are defined in the front cover 152. The engine output shaft 32 extends through the lower opening 158 of the front cover of the CVT housing 150.

With reference to FIGS. 5A to 5D and 11D to 11F, the CVT 34 includes a primary pulley 160 (which may be referred to as a "drive pulley"), a secondary pulley 162 (which may be referred to as a "driven pulley"), and a belt 164 wrapped around the primary pulley 160 and the secondary pulley 162 for rotating the secondary pulley 162. The primary pulley 160 is mounted to the rear end of the engine output shaft 32 extending rearwardly from the crankcase 102 so as to rotate therewith. The engine output shaft 32 and the primary pulley 160 are coaxial with the crankshaft 31 and rotate about the crankshaft rotation axis 31a. The primary pulley 160 is disposed in the lower portion of the chamber 154 enclosed by CVT housing 150. The secondary pulley 162 is mounted on the rear end of a shaft 165 (FIG. 5C) which extends through an upper opening 169 of the front cover 152. The secondary pulley 162 rotates about a rotation axis 166 extending parallel to the crankshaft rotation axis 31a. The secondary pulley 162 is disposed above the primary pulley 160 in the illustrated implementation of the vehicle 10. It is however contemplated that the secondary pulley 162 could be disposed in a different position with respect to the primary pulley 160. It is contemplated that the secondary pulley 162 could be disposed lower than the primary pulley 160, for example, if the primary pulley 160 was connected to the engine output shaft 32 indirectly instead of directly as shown herein. A CVT plane 168 (FIG. 5B) containing the respective rotation axes 31a, 166 of the primary pulley 160 and the secondary pulley 162 is disposed parallel to the longitudinal centerplane 3 and on a right side thereof. It is contemplated that the CVT plane 168 could coincide with the longitudinal centerplane 3 and not be laterally offset therefrom. It is contemplated that the CVT 34 could be configured such that the CVT plane 168 extends generally longitudinally and vertically but at a non-zero angle with respect to the longitudinal centerplane 3. In the illustrated implementation of the vehicle 10, the CVT plane 168 coincides with the cylinder plane 112. It is however contemplated that the CVT plane 168 could not coincide with the cylinder plane 112. For example, the CVT plane 168 could be disposed at an angle with respect to the cylinder plane 112. It is also contemplated that other types of continuously variable transmission be used.

As is known, each of the pulleys 160, 162 includes a movable sheave that can move axially relative to a fixed sheave to modify an effective diameter of the corresponding pulley 160, 162. The moveable sheave of the primary pulley 160 has centrifugal weights such that the effective diameter of the primary pulley 160 increases with the rotational speed of the primary pulley. The effective diameters of the pulleys 160, 162 are in inverse relationship. In the illustrated implementation, the CVT 34 is a purely mechanical CVT 34, in which the effective diameter of the primary pulley 160 depends on the rotational speed of the engine output shaft 32 and the crankshaft 31. The belt 164 is made of a fiber-reinforced rubber but it is contemplated that the belt 164 could be made of metal or other suitable material. The rear cover 156 is disposed spaced from the fuel tank 60 so that the rear cover 156 can be easily removed to access the components inside for maintenance and repair.

Figure 11A:
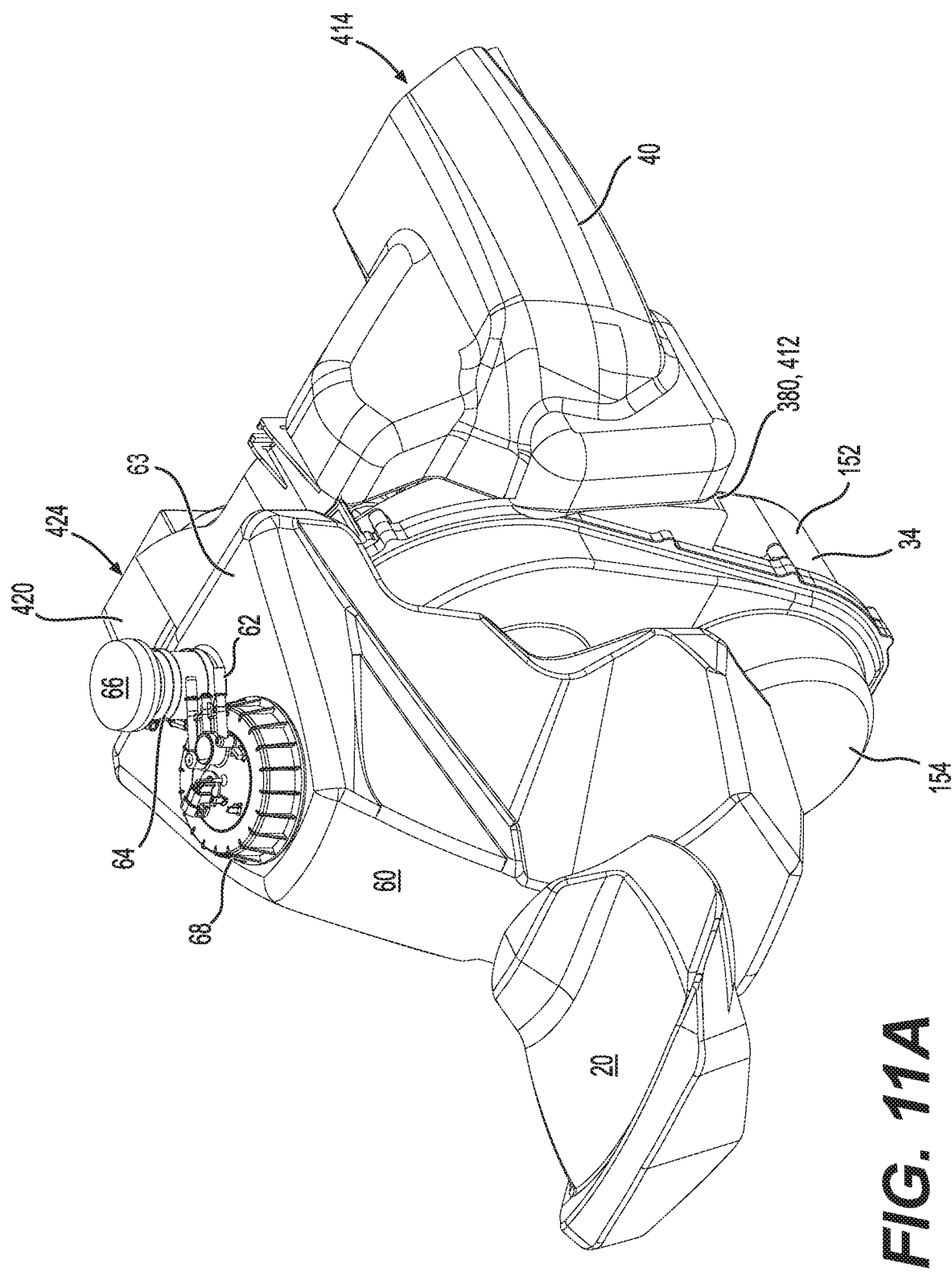
FIG. 11A is a perspective view, taken from a rear, top and right side, of the seat, fuel tank, CVT, a CVT air conduit and an engine air conduit of the vehicle of FIG. 1A.
Figure 11B:
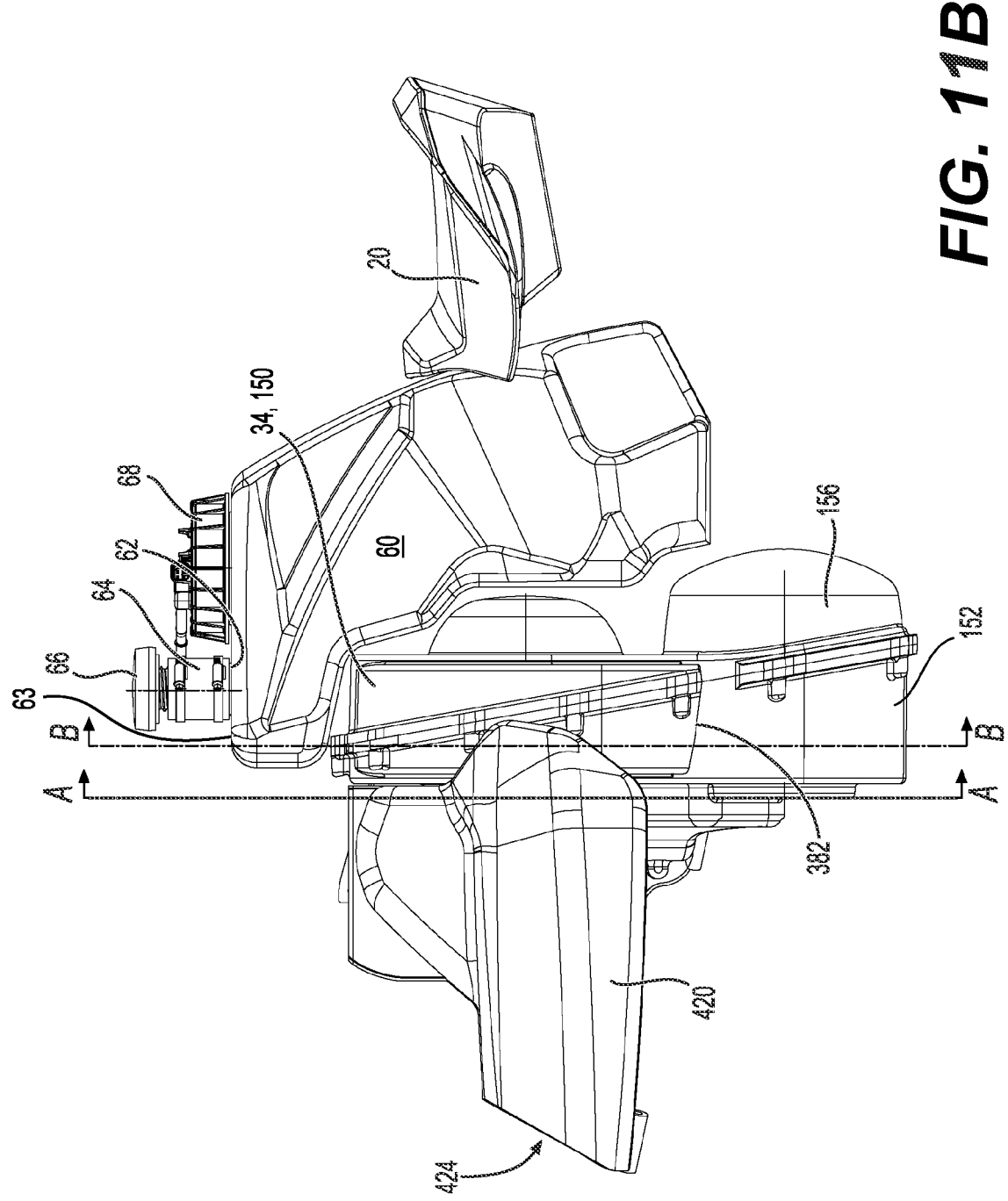
FIG. 11B is a left side elevation view of the seat, fuel tank, CVT, CVT air conduit and engine air conduit of FIG. 11A.
Figure 11D:
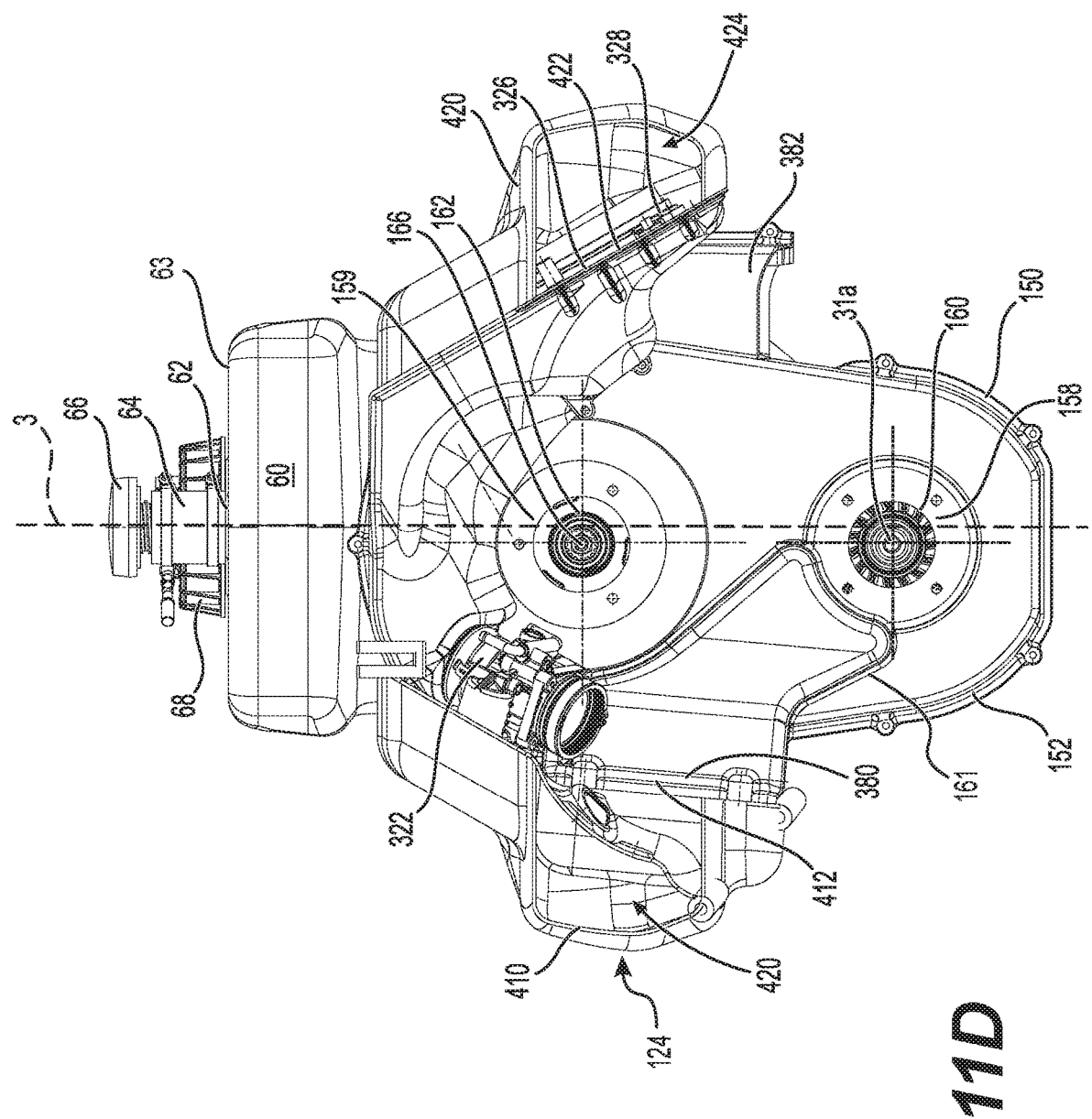
FIG. 11D is a front elevation view of the seat, fuel tank, CVT, CVT air conduit and engine air conduit of FIG. 11A.
Figure 11F:
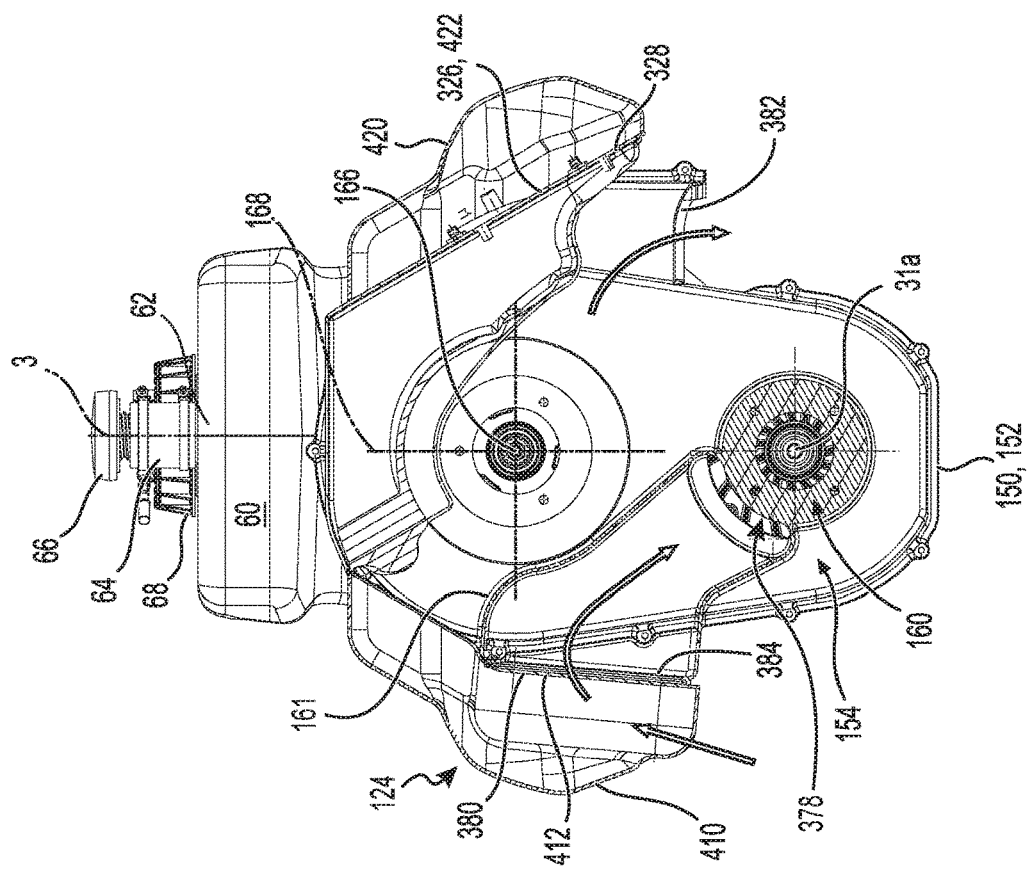
FIG. 11F is a cross-sectional view of the seat, fuel tank, CVT, CVT air conduit and engine air conduit of FIG. 11A, taken along the line B-B of FIG. 11B.
Figure 11E:
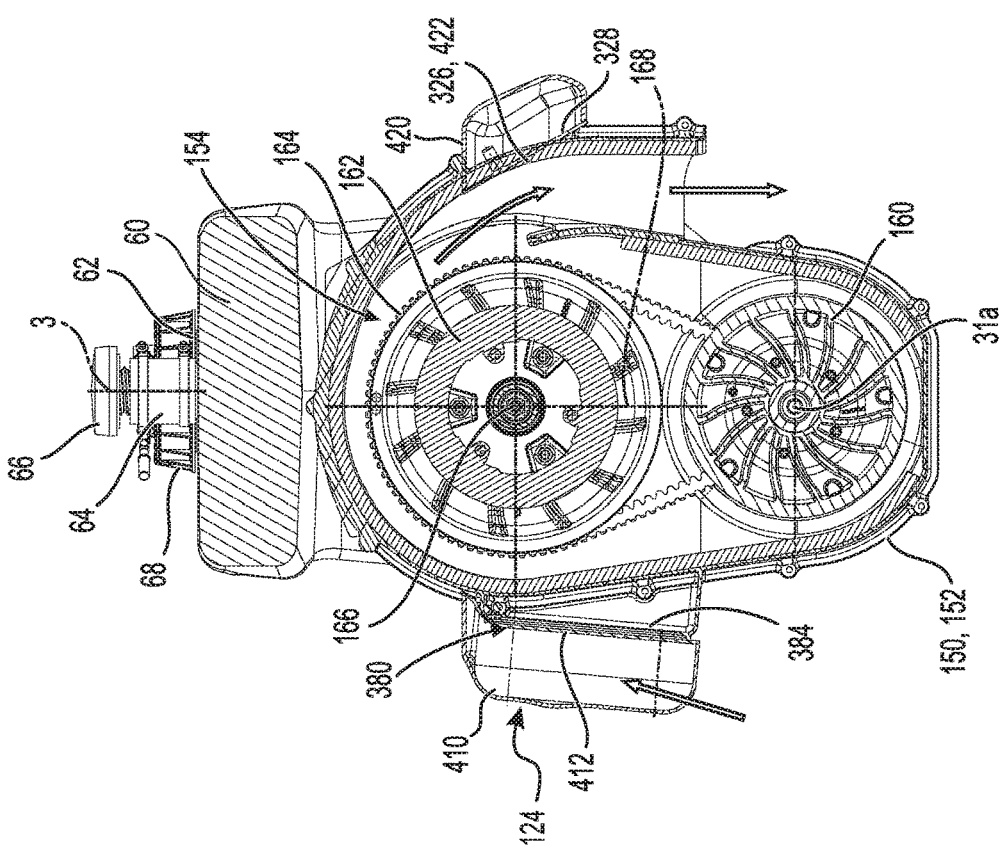
FIG. 11E is a cross-sectional view of the seat, fuel tank, CVT, CVT air conduit and engine air conduit of FIG. 11A, taken along the line A-A of FIG. 11B.

As can be seen in FIGS. 1A to 1D, 4A, 4B and 11D to 11F, the CVT housing 150 defines a rightwardly facing air inlet 380 disposed on a right side of the CVT housing 150 and a CVT air outlet 382 disposed on a left side of the CVT housing 150. An inner conduit 161 extends inside the CVT housing 150 from the air inlet 380 laterally towards the longitudinal centerplane 3. The inner conduit 161 defines a CVT air inlet 378 (which may be referred to as a "cooling air inlet"). As can be see in FIG. 11F, the CVT air inlet 378 is disposed on a right side of the longitudinal centerplane 3. The CVT air inlet and outlet 378, 382 are thus located on opposite lateral sides of the longitudinal centerplane 3. Air flows from the air inlet 380, through the inner conduit 161 and out of the CVT air inlet 378 into the CVT chamber 154. As shown in FIG. 11F, the CVT air inlet 378 is located adjacent to the primary pulley 160 such that, in use, air flowing through the inner conduit 161 and out of the CVT air inlet 378 is directed to the primary pulley 160. Air flows out of the CVT chamber 154 via the CVT air outlet 382 which is configured to direct air out of the CVT chamber 154 in a downward direction. The air inlet 380 of the inner conduit 161 is covered with an air filter 384 to prevent dust and debris from entering the CVT chamber 154.

Figure 11G:
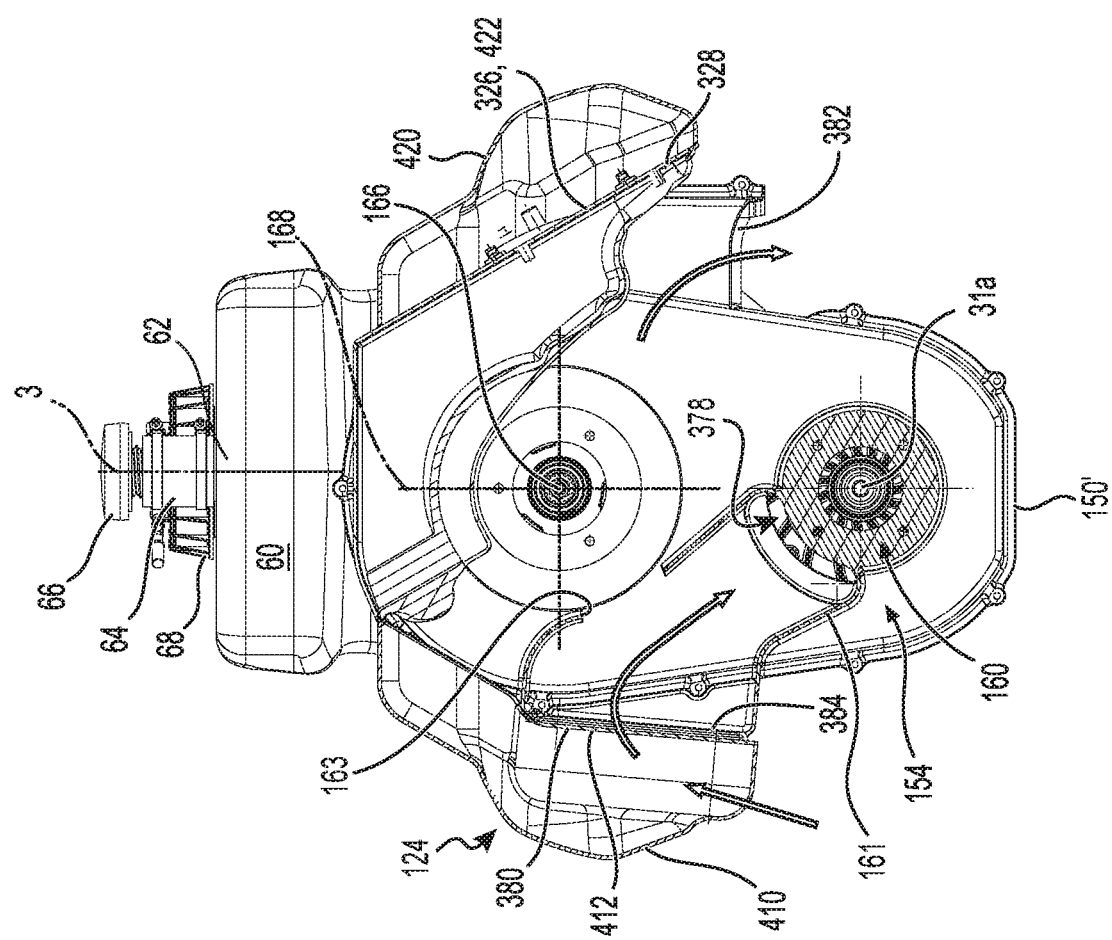
FIG. 11G is a cross-sectional view of the seat, fuel tank, CVT, CVT air conduit and engine air conduit of FIG. 11A, taken along the line B-B of FIG. 11B with another implementation of the CVT housing.
Figure 12:
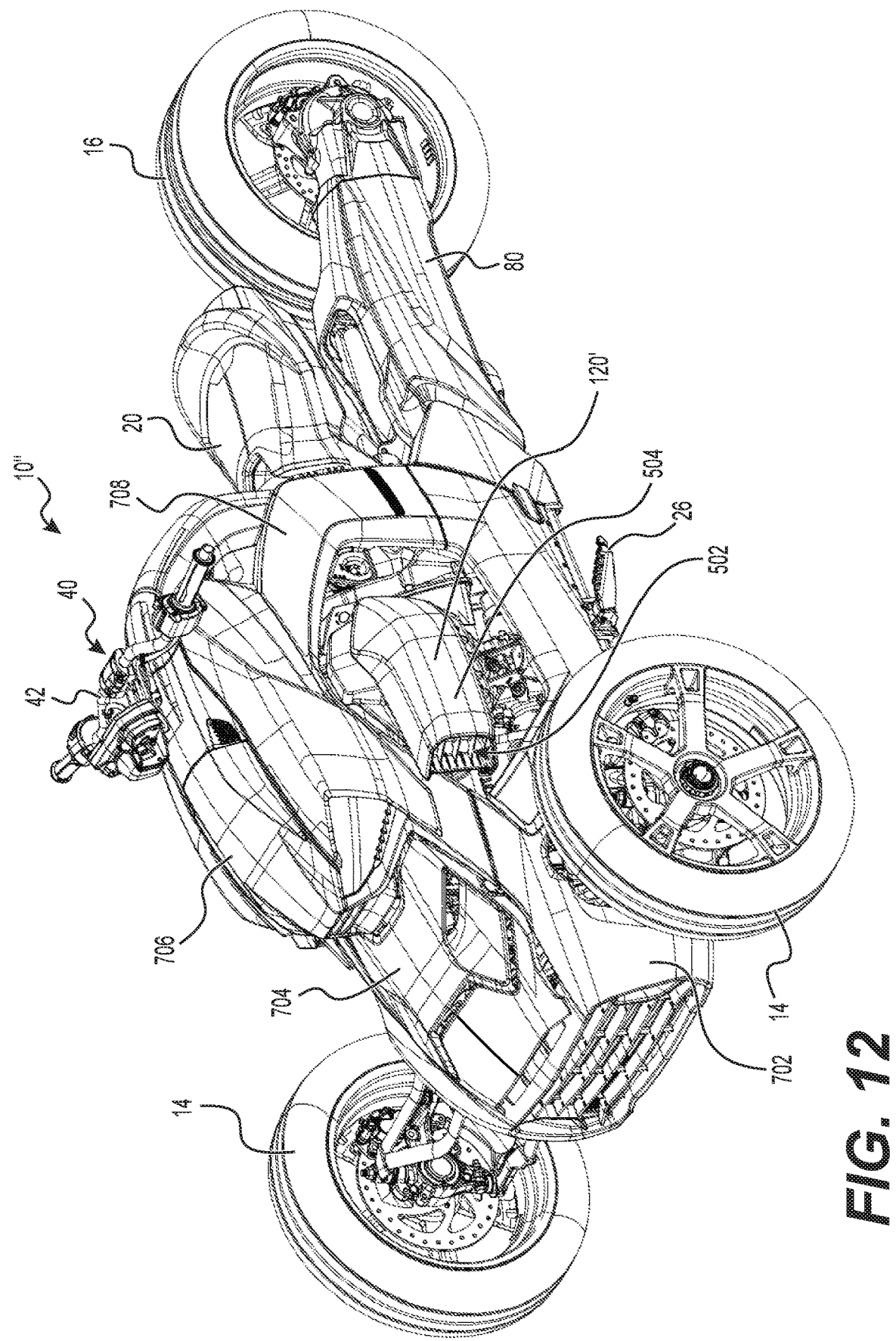
FIG. 12 is a perspective view, taken from a front, top and left side of an alternative implementation of the vehicle of FIG. 1 equipped with a CVT air intake system and an engine air intake system.
Figure 13:
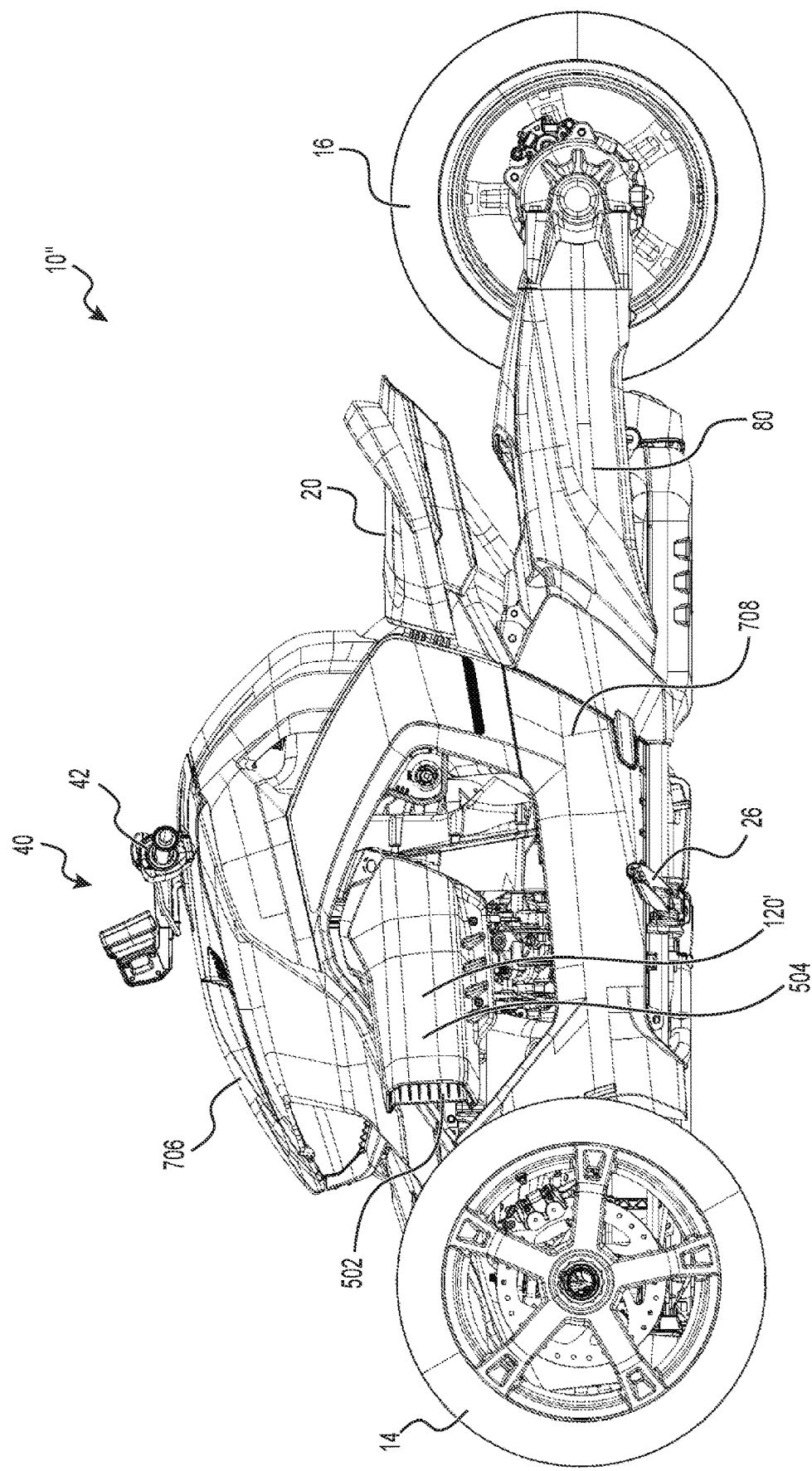
FIG. 13 is a left side elevation view of the vehicle of FIG. 12.

The CVT housing 150 may be configured differently in other implementations. For instance, FIG. 11G shows a CVT housing 150' that is configured to direct air towards both the primary pulley 160 and the secondary pulley 162. Notably, in such implementations, the inner conduit 161, which extends generally laterally inwardly and downwardly from the air inlet 380 towards the primary pulley 160, defines an aperture 163 to direct air flow upwardly towards the secondary pulley 162 (as illustrated by the arrows showing air flow within the CVT housing 150'). As such the inner conduit 161 defines the CVT air inlet 378 (which can be referred to as a "primary CVT air inlet" in this implementation) for directing air to the primary pulley 160 and a secondary CVT air inlet (defined by the aperture 163) for directing air to the secondary pulley 162.

The vehicle 10 includes a CVT air intake system 124 fluidly communicating with the CVT air inlet 378 for providing air to the CVT 34. More particularly, as shown in FIGS. 11A and 11C to 11G, the CVT air intake system 124 includes an air conduit 410 that is fluidly connected to the CVT air inlet 378 to direct air from a front of the vehicle 10 into the CVT air inlet 378. More particularly, the CVT air conduit 410 is connected to the CVT housing 150 such that an air outlet 412 of the CVT air conduit 410 connects to the air inlet 380 of the inner conduit 161. The inner conduit 161 of the CVT housing 150 (or 150') is thus in fluid communication with the CVT air conduit 410. As shown in FIG. 11C, from the air inlet 380, the CVT air conduit 410 extends forwardly on a right side of the longitudinal centerplane 3 and the transfer case housing 140 to a generally forwardly facing air inlet 414 through which air enters the CVT air intake system 124. The air inlet 414 is said to face generally forwardly in that air from in front of the vehicle 10 can enter the air inlet 414 when the vehicle 10 is in motion and that a projection of the air inlet 414 onto a plane normal to a longitudinal axis of the vehicle 10 defines a surface area. The forwardly facing configuration of the air inlet 414 functions as a ram-air intake causing a static air pressure increase within the CVT air intake system 124 as a result of the dynamic pressure created by forward motion of the vehicle. This results in higher volumetric flow and pressure to the CVT 34. In the illustrated implementation, the CVT air conduit 410 is formed integrally with an engine air conduit 420 which will be described below in further detail.

In this implementation, the inner conduit 161 is formed by the CVT housing 150. However, it is contemplated that, in alternative implementations, the inner conduit 161 could form part of the CVT air intake system 124. In such implementations, the inner conduit 161 is separate from the CVT housing 150 and extends, from the CVT air conduit 410, inside the CVT housing 150 laterally towards the longitudinal centerplane 3. Moreover, the inner conduit 161 is connected to the CVT housing 150 such that the CVT air inlet 378 of the inner conduit 161 opens into the CVT housing 150 adjacent to the primary pulley 160.

With reference to FIGS. 12 to 15, another member 10" of the family of vehicles is shown. The vehicle 10" has many features that correspond to features of the vehicle 10 above. Corresponding and similar features of the vehicles 10 and 10" have been labeled with the same reference numbers. Features of the vehicle 10" that are different from corresponding features of the vehicle 10 have been labeled with the same reference number followed by an apostrophe. The vehicle 10" will only be discussed in detail with regard to the differences from the vehicle 10. Notably, the vehicle 10" includes a CVT air intake system 124' that is an alternative implementation of the CVT air intake system 124 described above and an engine air intake system 120' that is an alternative implementation of the engine air intake system 120 described above.

As shown in FIGS. 14 to 17, 27, 28 and 31 to 34, in this implementation, the CVT air intake system 124', which fluidly communicates with the CVT air inlet 378, includes a CVT air conduit 610 (in place of the CVT air conduit 410). The CVT air conduit 610 defines an air inlet 602 facing generally forwardly and through which air enters the CVT air conduit 610. As discussed above with regard to the CVT air conduit 410, the air inlet 602 is said to face generally forwardly in that air from in front of the vehicle 10 can enter the air inlet 602 when the vehicle 10 is in motion and that a projection of the air inlet 602 onto a plane normal to a longitudinal axis of the vehicle 10 defines a surface area. The forwardly facing configuration of the air inlet 602 functions as a ram-air intake causing a static air pressure increase within the CVT air intake system 124' as a result of the dynamic pressure created by forward motion of the vehicle. This results in higher volumetric flow and pressure to the CVT 34.

The CVT air conduit 610 includes a base member 606, an inner member 607 and an outer cover 608 connected to the inner member 607. The outer cover 608 defines the air inlet 602 while the base member 606 defines an air outlet 616 (FIG. 30) of the CVT air conduit 610 in fluid communication with the air inlet 380. The inner member 607 is disposed laterally between the outer cover 608 and the base member 606.

Figure 36:
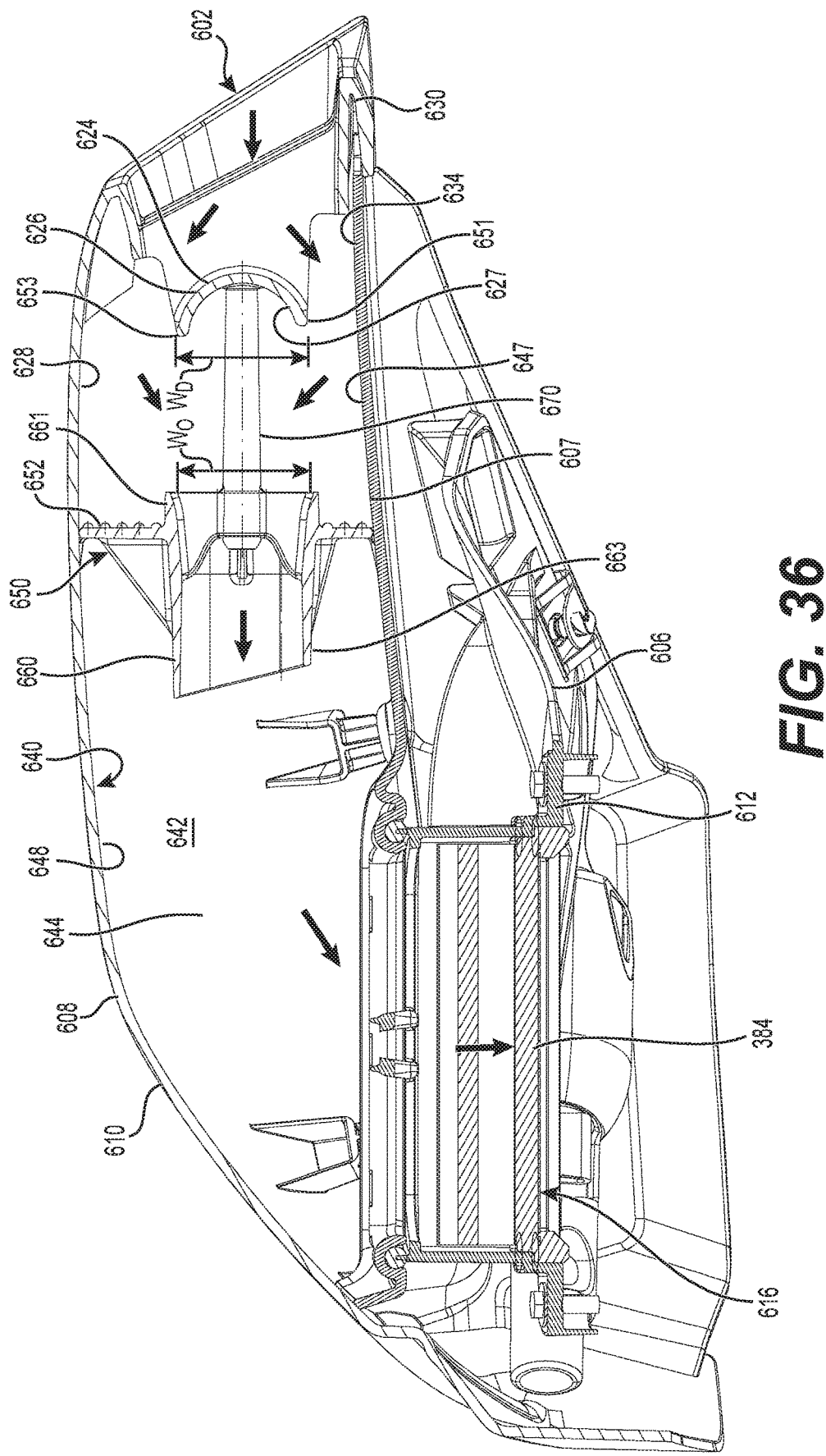
FIG. 36 is a cross-sectional view of the CVT air intake system taken along line 36-36 in FIG. 33.
Figure 37:
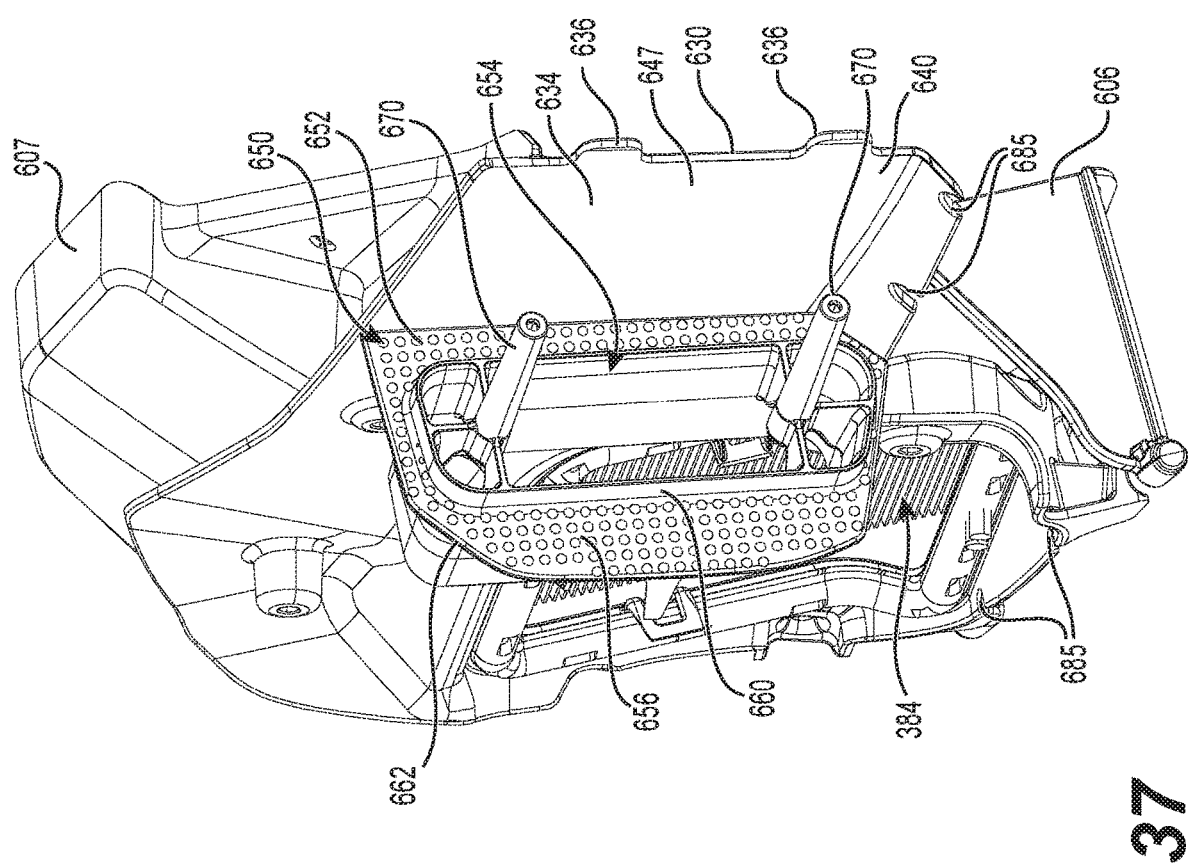
FIG. 37 is a perspective view, taken from a front, top and right side, of the CVT air intake system of FIG. 16 with an outer cover thereof removed to expose a restricting structure of the CVT air intake system.

The outer cover 608 extends from a front end 611 defining the air inlet 602 to a rear end 613 (FIG. 31). The outer cover 608 has a convex outer side and a concave inner side facing laterally inward towards the inner member 607. The inner side of the outer cover 608 has an inner surface 628. For its part, the inner member 607 extends from a front end 630 (FIG. 37) to a rear end 632 (FIG. 32). The inner member 607 has an outer side and an inner side facing laterally inward towards the longitudinal centerplane 3 of the vehicle 10. As shown in FIGS. 36 and 37, the outer side of the inner member 607 has an outer surface 634 generally facing towards the outer cover 608.

As best seen in FIG. 37, the front end 630 of the inner member 607 has tabs 636 for interlocking with the outer cover 608. More specifically, the front end 630 of the inner member 607 is configured to be received in a groove (not shown) formed at the front end 611 of the outer cover 608.

The base member 606 has a retaining bracket 612 (FIG. 36) for holding the air filter 384 in place across the air outlet 616 (and across the air inlet 380 that opens into the air outlet 616). A sealing member, more particularly an O-ring, is provided around the air inlet 380. The retaining bracket 612 and the conduit 161 are sized and shaped such that they compress the O-ring when assembled, thereby ensuring the seal around the air filter 384, although it will be appreciated that various alternative ways of ensuring a seal around the air filter 384 are available.

With reference to FIG. 36, the CVT air conduit 610 has an internal wall 640 forming an air passage 642 that guides air from the air inlet 602 to the air outlet 616. The internal wall 640 has a top 644, a bottom 646, a left side 647 and a right side 648. The internal wall 640 is formed by part of the inner surface 628 of the outer cover 608 and part of the outer surface 634 of the inner member 607. More specifically, in this implementation, the top 644, bottom 646 and right side 648 of the internal wall 640 are formed by the inner surface 628 of the outer cover 608 while the left side 647 of the internal wall 640 is formed by the outer surface 634 of the inner member 607.

Figure 33:
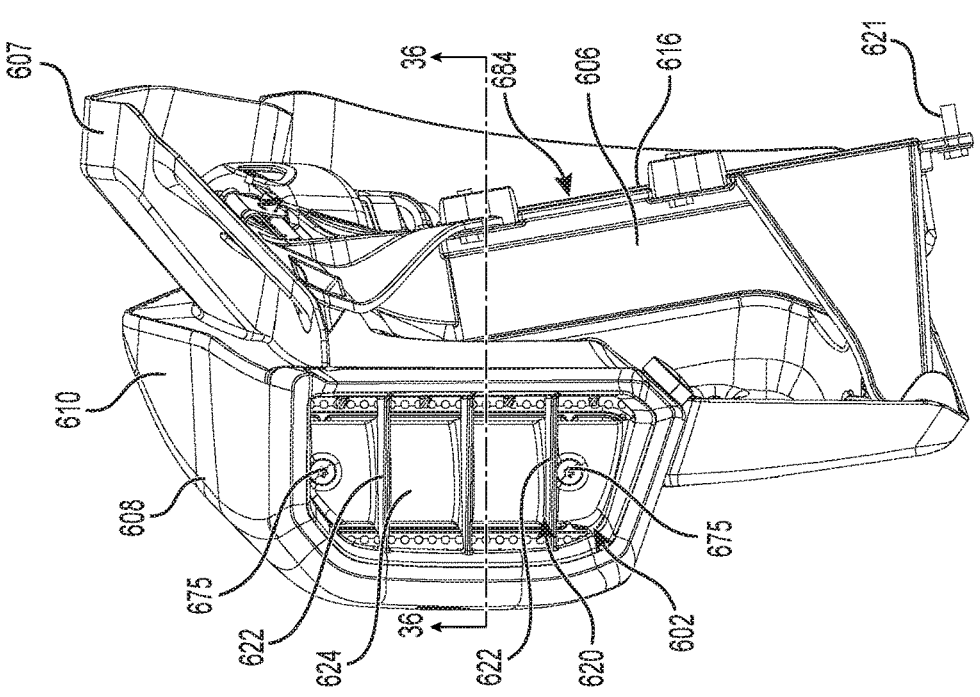
FIG. 33 is a front elevation view of the CVT air intake system of FIG. 16.

With reference to FIGS. 31 and 33, the outer cover 608 includes a grille 620 within the air passage 642 which can prevent oversized debris from entering the CVT air intake system 124'. The grille 620, which is located at the air inlet 602, includes a plurality of generally horizontal slats 622 and a deflector 624 for removing at least some of the water entrained with air entering the CVT air conduit 610. More specifically, while entering the air inlet 602, air deflects around the deflector 624 which causes at least some of the water entrained with the air to be separated from the air that will continue to flow toward the CVT 34. It is contemplated that, in alternative implementations, the grille 620 could be located downstream from the air inlet 602.

The deflector 624 extends generally vertically and is connected to the CVT air conduit 610. More specifically, in this implementation, the deflector 624 extends from the top 644 to the bottom 646 of the internal wall 640 and is made integrally with the outer cover 608 of the CVT air conduit 610. The deflector 624 has a rounded convex front surface 626 facing frontwardly toward the air inlet 602 for promoting the smooth deflection of air, and a rounded concave rear surface 627 opposite the convex surface 626. The radii of curvature of the convex surface 626 and the concave surface 627 are concentric such that a thickness of the deflector 624, measured between the convex surface 626 and the concave surface 627, is constant.

In this implementation, the deflector 624 is spaced apart from the left and right sides 647, 648 of the internal wall 640 to allow air to deflect around both sides of the deflector 624. More specifically, a left end 651 of the deflector 624 (which corresponds to the left end of the convex surface 626) is spaced apart from the left side 647 of the internal wall 640 while a right end 653 of the deflector 624 (which corresponds to the right end of the convex surface 626) is spaced apart from the right side 648 of the internal wall 640. Moreover, in this example, the deflector 624 is generally laterally centered relative to the left and right sides 647, 648 of the internal wall 640 such that the left end 651 of the deflector 624 is closer to the left side 647 than the right side 648 of the internal wall 640.

It is contemplated that the deflector 624 may not be laterally centered relative to the left and right sides 647, 648 of the internal wall 640. For instance, it is contemplated that, in some implementations, the deflector 624 may abut one abut one of the left and right sides 647, 648 of the internal wall 640.

As shown in FIGS. 35 and 36, the CVT air intake system 124' has a restricting structure 650 disposed within the air passage 642, between the deflector 624 and the air outlet 616. As will be described in greater detail below, the restricting structure 650 is configured to restrict passage of air and, by so doing, retain some moisture content from air flowing through the air passage 642. This can be helpful to protect the components of the CVT 34 in the CVT housing 150 from being exposed to excessive moisture which can negatively affect performance of the CVT 34. It can also be helpful to protect the motor 30, as will be discussed in further detail below.

With particular reference to FIGS. 37 to 43, the restricting structure 650 has a lateral wall 652 and a peripheral wall 660 extending longitudinally from the lateral wall 652. The lateral wall 652 is disposed downstream of the deflector 624 and extends laterally from the left side 647 to the right side 648 of the internal wall 640 of the CVT air conduit 610 such that the lateral wall 652 extends substantially perpendicular to the direction of air flow entering the air inlet 602. In this implementation, the lateral wall 652 is straight (i.e., planar) and has a front surface 656 and a rear surface 658 opposite thereto. The front surface 656 generally faces the air inlet 602 while the rear surface 658 generally faces away from the air inlet 602. The lateral wall 652 extends to the internal wall 640 of the CVT air conduit 610 in all directions such that an entire periphery 662 of the lateral wall 652 is in contact with the internal wall 640 of the CVT air conduit 610. The periphery 662 of the lateral wall 652 thus has a shape similar to a cross-section of the internal wall 640 taken along a vertical plane parallel to the lateral wall 652. Nevertheless, it is contemplated that, in some implementations, only part of the periphery 662 (e.g., a majority thereof) may be in contact with the internal wall 640 of the CVT air conduit 610.

While the lateral wall 652 impedes air flow within the air passage 642, the peripheral wall 660 defines an opening 654 for allowing air to flow through the restricting structure 650. In this implementation, the peripheral wall 660 extends generally normal to the lateral wall 652. Notably, a front portion 661 of the peripheral wall 660 extends forwardly of the front surface 656 while a rear portion 663 of the peripheral wall 660 extends rearwardly of the rear surface 658. As will be discussed in more detail below, the front portion 661 of the peripheral wall 660 may prevent water droplets that collect on the lateral wall 652 from entering the opening 654. Moreover, in this implementation, the peripheral wall 660 is positioned such that the opening 654 is surrounded by the lateral wall 652 (i.e., the opening 654 is spaced from the internal wall 640 of the CVT conduit 610 by the lateral wall 652).

It is contemplated that, in some implementations, at least one of the top 644, the bottom 644, the left side 647 and the right side 648 of the internal wall 640 could define part of the opening 654.

The deflector 624 is substantially laterally aligned with the opening 654. For instance, as best seen in FIG. 36, the deflector 624 is substantially laterally centered with respect to the opening 654 (i.e., a lateral center of the opening 654 is substantially laterally aligned with a lateral center of the opening 654). Moreover, a width $W_O$ of the opening 654 (measured at a frontmost point thereof—i.e., closest to the air inlet 602) is slightly smaller than a width $W_D$ of the deflector 624. For example, in this implementation, a ratio of the width $W_O$ of the opening 654 over the width $W_D$ of the deflector 624 is between 0.8 and 1.5 inclusively. The deflector 624 therefore covers, laterally, the opening 654 which forces air to turn toward the opening 654 after having been deflected by the deflector 624.

In order to provide rigidity to the restricting structure 650, a plurality of ribs 665 extend between the rear surface 658 of the lateral wall 652 and the outer surface of the rear portion 663 of the peripheral wall 660.

The restricting structure 650 has two cylindrical mounting posts 670 for connecting the restricting structure 650 to the deflector 624. The mounting posts 670 are laterally aligned with one another and vertically spaced apart from one another. The mounting posts 670 are positioned laterally between the opposite lateral sides of an inner surface of the peripheral wall 660. More specifically, the mounting posts 670 are laterally centered with respect to the opening 654. The mounting posts 670 are connected to the peripheral wall 660 by connecting links 672 extending from the inner surface of the peripheral 660 to the mounting posts 670. The mounting posts 670 extend forwardly, past the front surface 656 of the lateral wall 652 and the front of the peripheral wall 660, to the rear concave surface 627 of the deflector 624. Each of the mounting posts 670 defines a fastener-receiving opening 674 (e.g., a threaded opening) at its frontmost extremity for securely receiving a fastener therein. The restricting structure 650 is affixed to the deflector 624 by inserting a fastener 675 in an opening defined in the deflector 624 and in a corresponding one of the openings 674 of the mounting posts 670.

As shown in FIG. 36, the deflector 624 is longitudinally spaced from the lateral wall 652 by the mounting posts 670.

Figure 43:
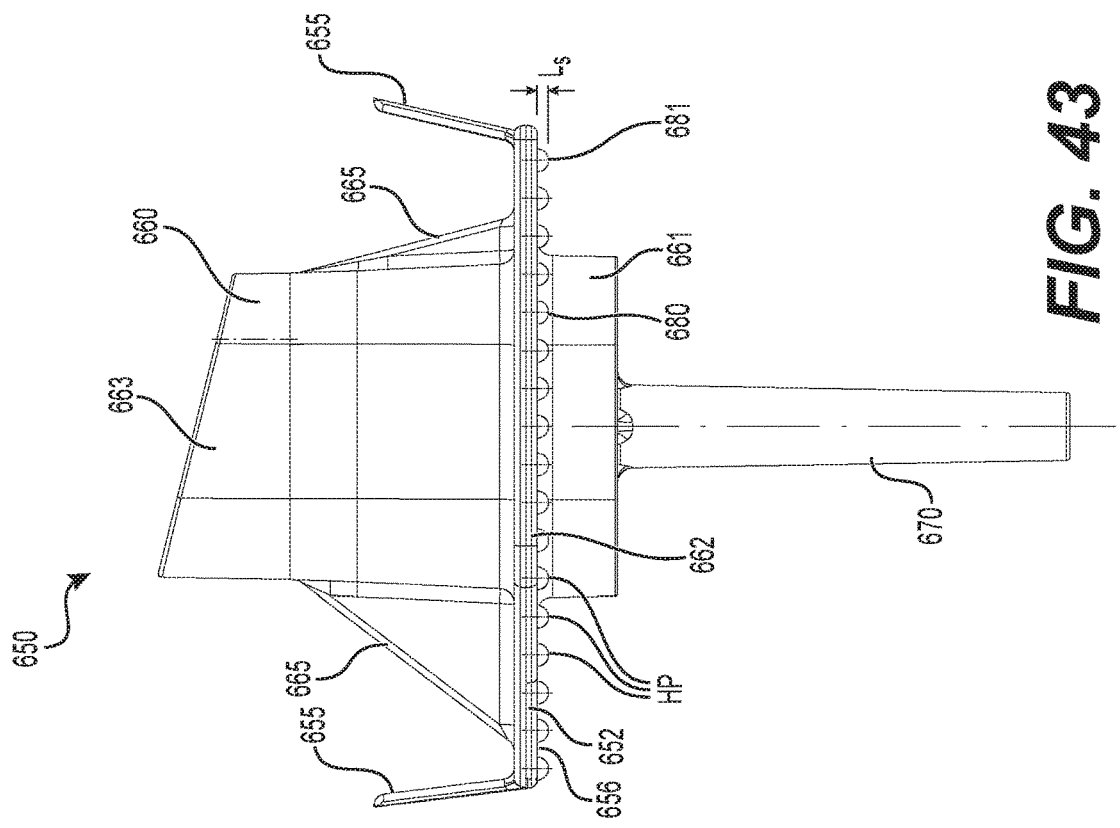
FIG. 43 is a top plan view of the restricting structure of FIG. 37.
Figure 42:
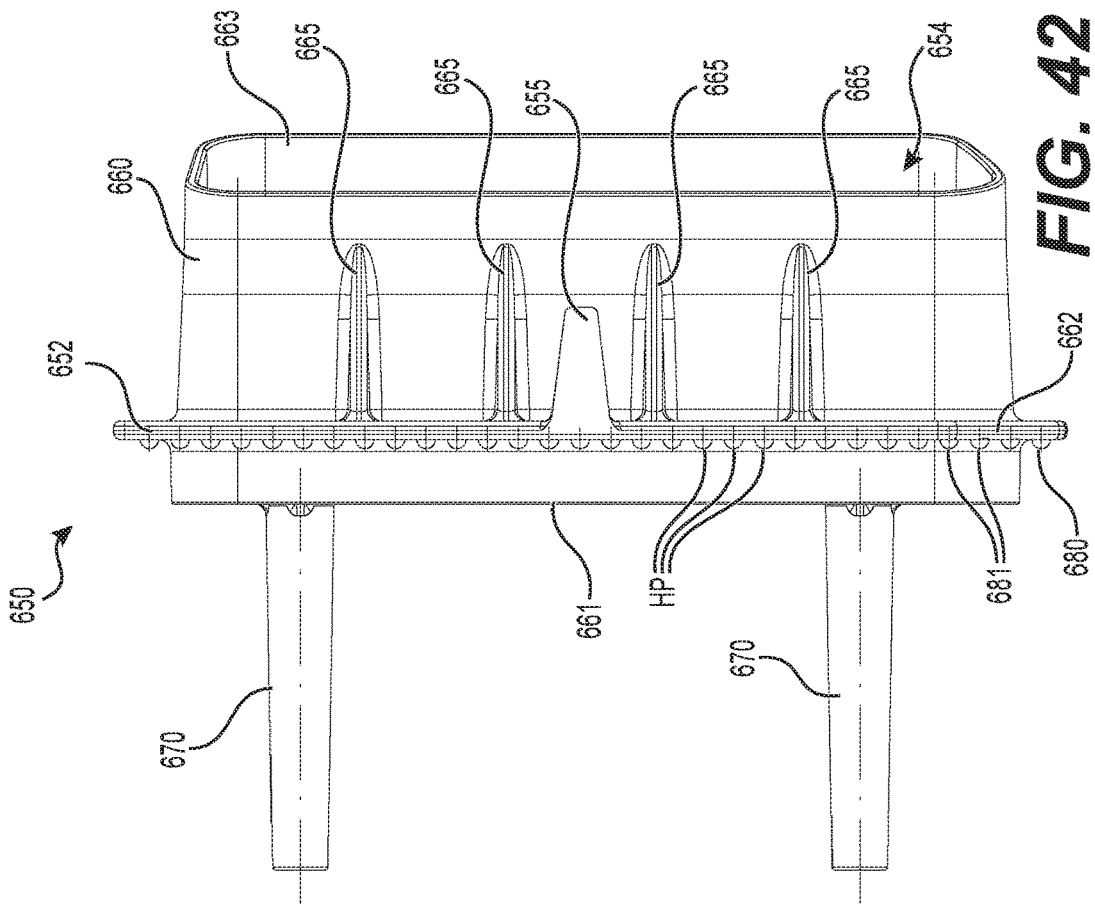
FIG. 42 is a left side elevation view of the restricting structure of FIG. 37.

As shown in FIGS. 38 to 43, two retaining members 655 project rearwardly from opposite sides of the periphery 662 of the lateral wall 652. As best seen in FIG. 43, the retaining members 655 are slightly angled laterally outwardly from perpendicular to the lateral wall 652. That is, the left retaining member 655 is angled to the left while the right retaining member 655 is angled to the right. The retaining members 655 thus act as springs, applying pressure on the internal wall 640 of the CVT air conduit 610 to retain the restricting structure 650 onto the internal wall 640.

The restricting structure 650 has a plurality of surface-increasing features 680 provided on the front surface 656 of the lateral wall 652. The surface-increasing features 680 increase a surface area of the lateral wall 652 on a side thereof facing the air inlet 602. As will be described in greater detail below, this may be helpful to remove some moisture entrained with air flowing into the air passage 642.

In this implementation, the surface-increasing features 680 are projections that project forwardly from the front surface 656 of the lateral wall 652. The projections provide surfaces that would otherwise be unavailable if no such surface-increasing features were provided on the lateral wall 652. To that end, each of the surface-increasing features 680 has a length $L_S$ of at least 1 mm measured from the front surface 656 in a direction normal to the front surface 656 (i.e., longitudinally in this implementation). In other words, an extremity 681 of each of the surface-increasing features 680 is offset from the plane on which the front surface 656 extends. For instance, in this implementation, the length $L_S$ of each of the surface-increasing features is 1.5 mm. In some implementations, the length $L_S$ of each of the surface-increasing features 680 may be between 1 mm and 20 mm inclusively. In some implementations, the length $L_S$ of each of the surface-increasing features 680 may be between 2 mm and 10 mm inclusively.

The surface-increasing features 680 may cover a substantial portion of the front surface 656 of the lateral wall 652. For instance, the surface-increasing features 680 may cover at least 30% of the front surface 656. In this implementation, the surface-increase features 680 cover approximately 50% of the front surface 656. In some implementations, the surface-increasing features 680 may cover between 30% and 80% of the front surface 656.

The surface-increasing features 680 can be implemented in various ways, as will be discussed below.

With particular reference to FIGS. 38 and 40, in this implementation, the surface-increasing features 680 are hemispherical projections HP that project forwardly from the front surface 656 towards the air inlet 602. In this implementation, the hemispherical projections HP have a diameter greater than 1 mm More specifically, the diameter of the hemispherical projections HP is approximately 3 mm. In some cases, the diameter of the hemispherical projections HP may be between 2 mm and 5 mm inclusively, in some cases between 2 to 10 mm inclusively, and in some cases between 1 mm and 15 mm inclusively. The hemispherical projections HP are arranged in a uniform pattern across a majority of the front surface 656. That is, the hemispherical projections HP are uniformly distanced from one another along the majority of the front surface 656. For example, in this implementation, a center-to-center distance between adjacent ones of the hemispherical projections HP is approximately 5 mm.

It is contemplated that the hemispherical projections HP could have different sizes (e.g., varying diameters). Furthermore, it is contemplated that the hemispherical projections HP could be arranged in a non-uniform pattern across the front surface 656.

In another example of implementation shown in FIGS. 44 and 45, the surface-increasing features 680 are generally conical projections CP. Each of the conical projections CP is configured such that, along at least part of the length $L_S$ thereof, a cross-sectional area of the conical projection CP (taken along a plane parallel to the front surface 656) decreases in the forward direction (i.e., toward the air inlet 602). As best seen in FIG. 45, in this implementation, the extremity of each of the conical projections CP is generally rounded (e.g., hemispherical). In this implementation, the length $L_S$ of the conical projections CP is approximately 15 mm. Moreover, the conical projections CP are arranged in a uniform pattern across a majority of the front surface 656. That is, the conical projections CP are uniformly distanced from one another along the majority of the front surface 656. For example, in this implementation, a center-to-center distance between adjacent ones of the conical projections CP is approximately 5 mm.

Furthermore, as can be seen in FIG. 45, in this alternative implementation, the periphery 662 of the lateral wall 652 defines a channel 667 along an entire extent thereof. The channel 667 is configured to accommodate a sealing member such as a gasket to prevent the passage of air between the periphery 662 and the internal wall 640 of the CVT air conduit 610. Moreover, in this implementation, the retaining members 655 are omitted.

Figure 47:
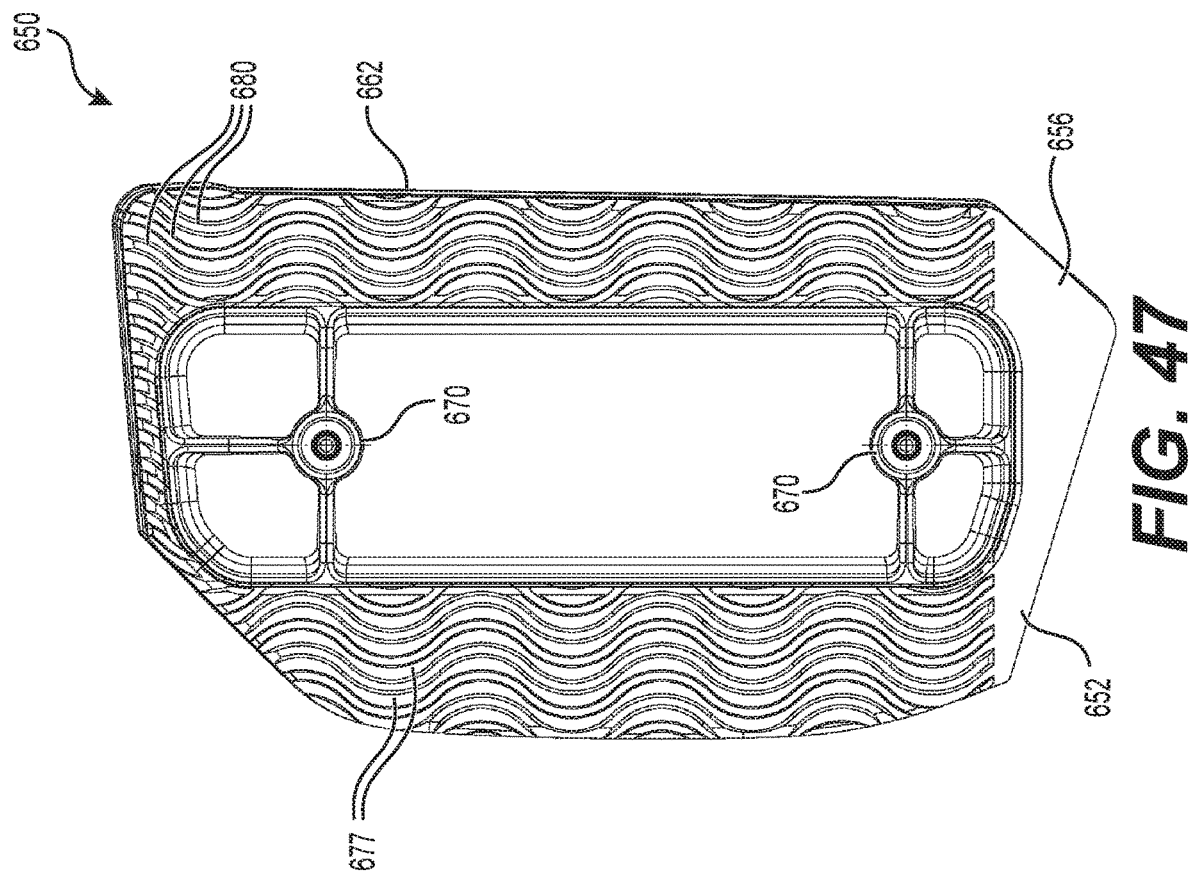
FIG. 47 is a front elevation view of the restricting structure of FIG. 46.
Figure 46:
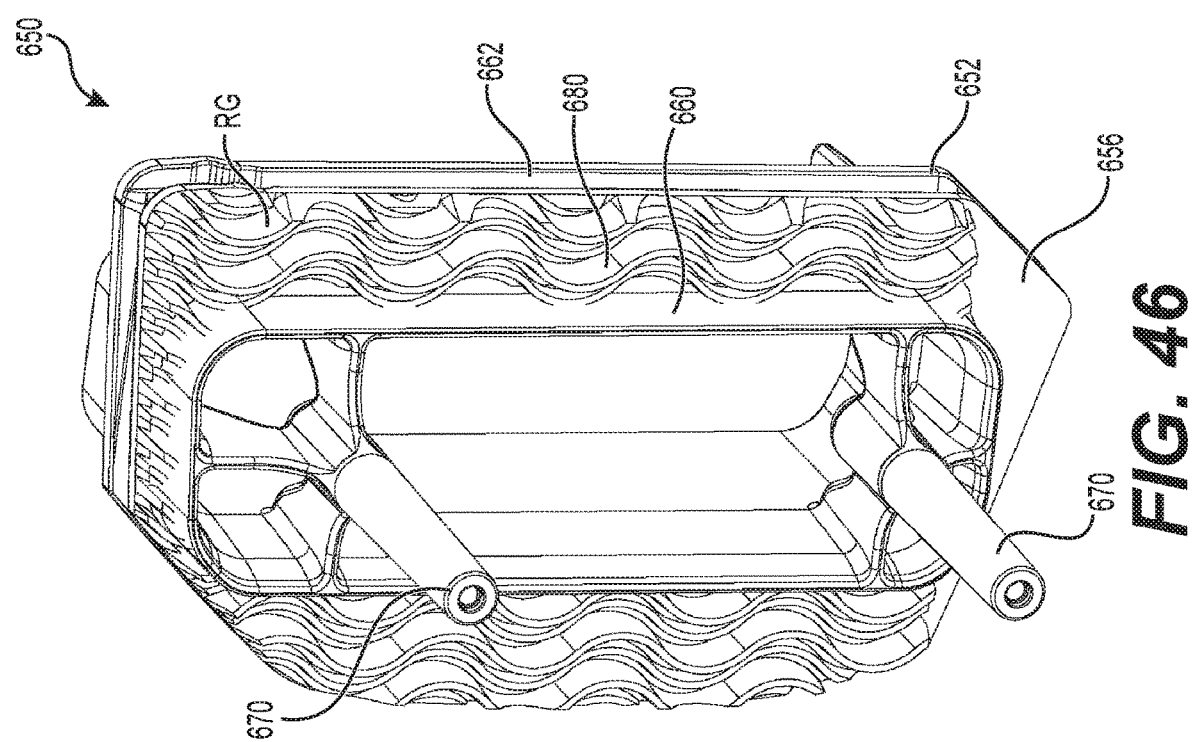
FIG. 46 is a perspective view, taken from a front, top and left side, of another alternative implementation of the restricting structure of FIG. 38.
Figure 48:
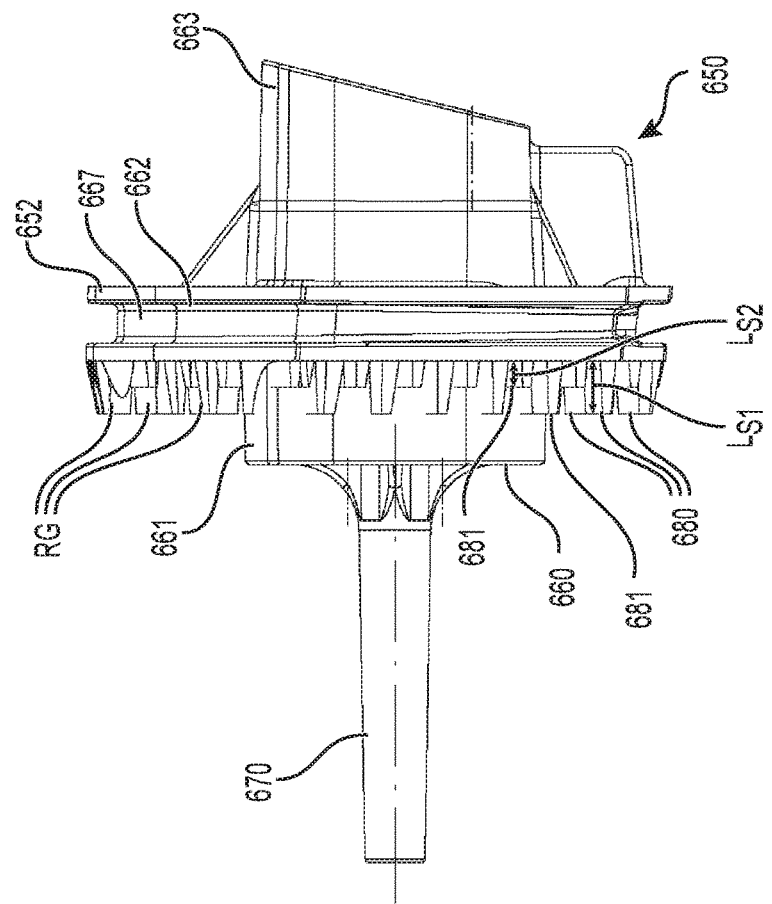
FIG. 48 is a top plan view of the restricting structure of FIG. 46.
Figure 55:
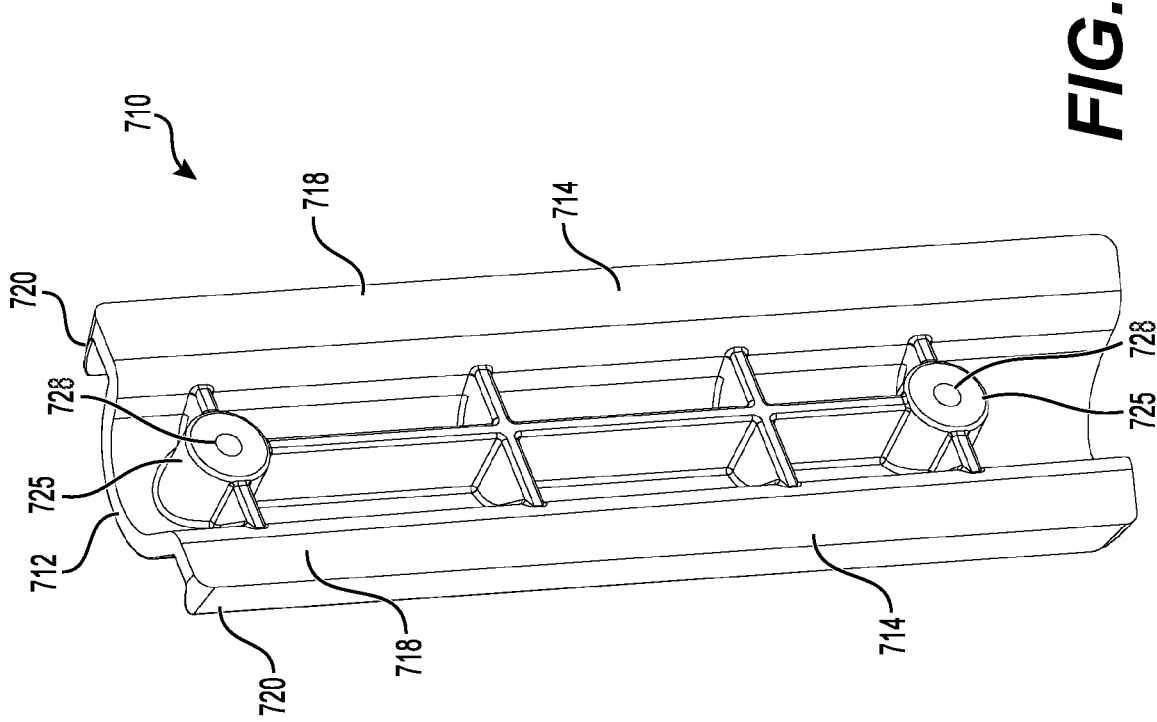
FIG. 55 is a perspective view, taken from a top, rear, left side, of the collector of FIG. 54.
Figure 54:
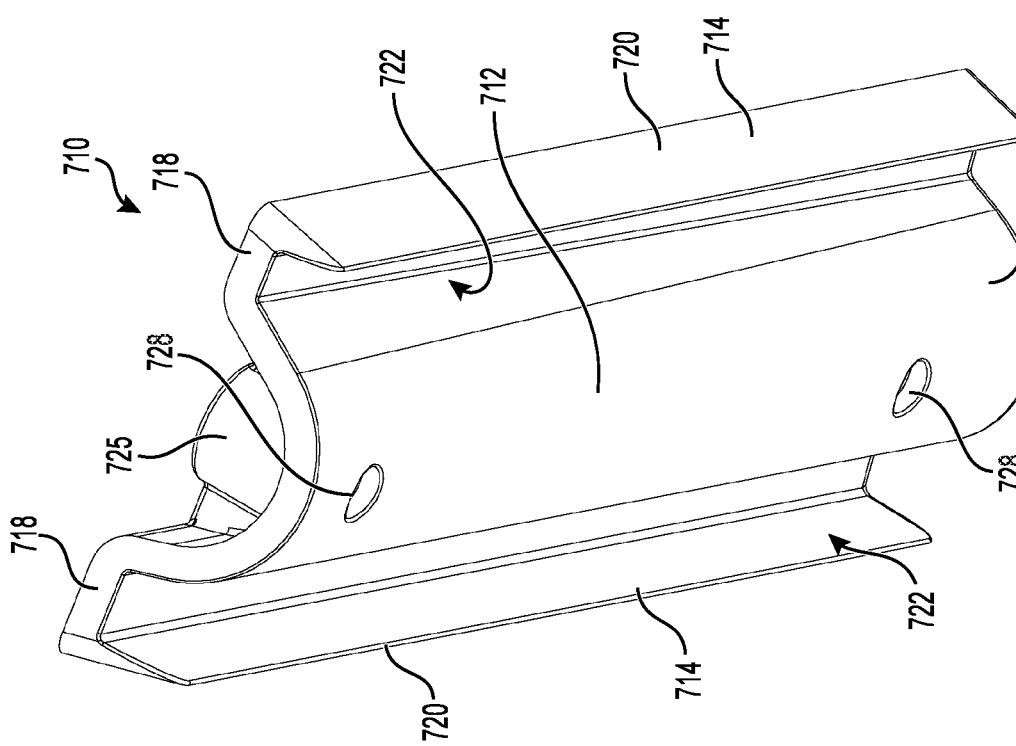
FIG. 54 is a perspective view, taken from a top, front and left side, of the collector of FIG. 53.

In another example of implementation shown in FIGS. 46 to 48, the surface-increasing features 680 are projections that form ridges RG extending generally vertically across the front surface 656 of the lateral wall 652. In this alternative implementation, the ridges RG have a generally sinusoidal shape (i.e., a wave-like shape). The ridges RG are laterally spaced apart from one another such that laterally-adjacent ones of the ridges RG define a channel 677 therebetween. Moreover, as best seen in FIG. 48, the length of the ridges RG is variable. More specifically, in this implementation, laterally-adjacent ones of the ridges RG have different lengths, with some of the ridges RG having a first length $L_{S1}$ and the other ridges having a second length $L_{S2}$. The first length $L_{S1}$ is greater than the second length $L_{S2}$. For instance, the length $L_{S1}$ may be between 5 mm and 20 mm inclusively while the length $L_{S2}$ may be between 1 mm and 15 mm inclusively.

It is contemplated that the ridges RG may have any suitable shape in other implementations. For example, the ridges RG could have a crenate shape, a crenellated shape or a scalloped shape amongst others.

Figure 49:
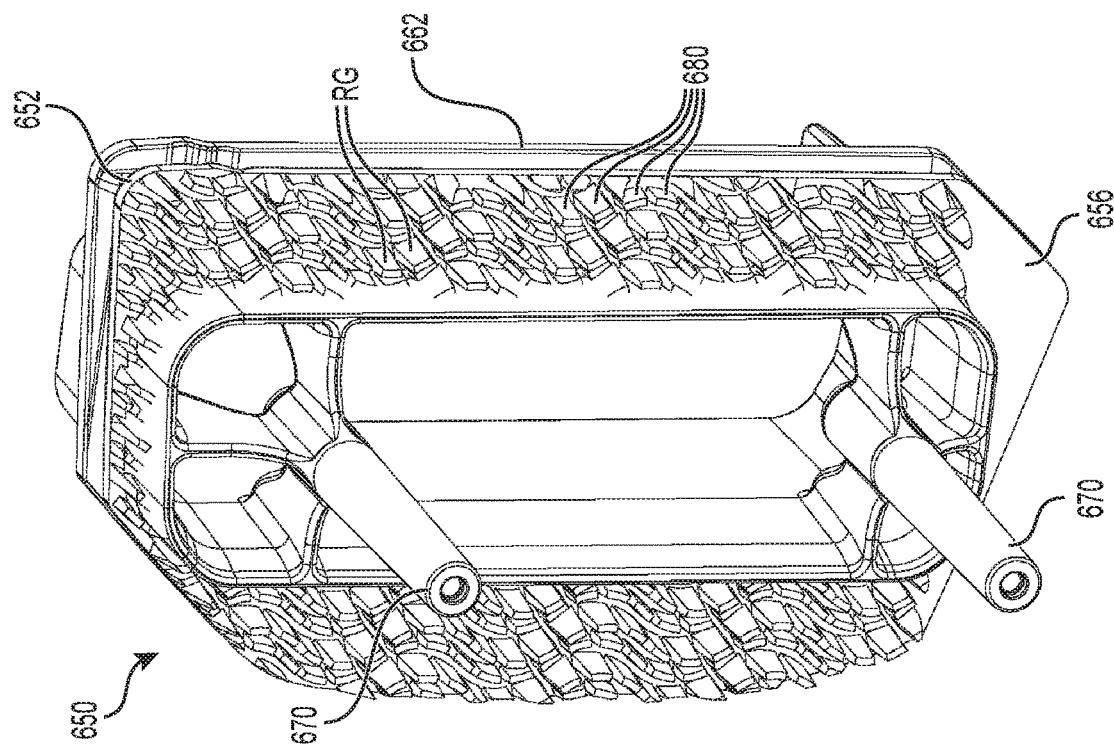
FIG. 49 is a perspective view, taken from a front, top and left side, of another alternative implementation of the restricting structure of FIG. 38.

In a variant of the implementation of FIGS. 46 to 48, as shown in FIGS. 49 to 51, the ridges RG may be discontinuous. More specifically, each of the ridges RG is formed by a plurality of the surface-increasing features 680 that are spaced apart from one another. The surface-increasing features 680 are aligned with one another to form the wave-like shape of the ridges RG.

It is contemplated that, in some implementations, the shapes of the surface-increasing features 680 could be varied. For example, the surface-increasing features 680 could include some hemispherical projections HP and some generally conical projections CP.

With reference to FIGS. 52A and 52B, in an alternative implementation, the surface-increasing features 680 are recesses RC extending from the front surface 656 into the lateral wall 652. In such an implementation, as shown in FIG. 52B, the length $L_S$ of each of the surface-increasing features 680 corresponds to a depth of the recesses RC measured from the front surface 656 in the direction normal to the front surface 656. The recesses RC provide surfaces that would be otherwise unavailable if no such surface-increasing features 680 were provided on the lateral wall 652.

As mentioned above, the presence of the restricting structure 650 within the air passage 642 can help reduce a quantity of moisture in the air that flows to the air outlet 616 and thus into the CVT housing 150. More particularly, with reference to FIG. 36, as indicated by the arrows depicted therein, during use of the CVT air intake system 124', air first flows into the air inlet 602 of the CVT air conduit 610 to enter the air passage 642. Air then flows past the deflector 624 which deflects the air laterally away from the opening 654 and on either lateral side of the deflector 624. Some content of moisture can be precipitated from the air flow at this stage and sticks to the deflector 624. Moreover, at this stage, the speed of the air flow increases since air flow is being confined to a smaller section between the lateral ends 651, 653 of the deflector 624 and the internal wall 640. Then, the air flows laterally inward toward the opening 654 (i.e., the air flow on opposite lateral sides of the deflector 624 converges) since the restricting structure 650 restricts the air flow to the opening 564. Since water droplets entrained in the air flow are heavier than the air carrying them, at least some water droplets are propelled toward the lateral wall 652 as the air flow changes direction to flow laterally inwardly toward the opening 654. The water molecules thus impact the lateral wall 652. Due to the additional surface area provided by the surface-increasing features 680 (e.g., surfaces of the projections or recesses), water is more easily retained on the lateral wall 652 via surface tension. Moreover, since the surface-increasing projections 680 have surfaces that are angled relative to the lateral wall 652, when the water droplets hit the surface-increasing features 680, the water droplets are deflected laterally rather than forwardly which reduces a risk of the droplets to be sucked into the opening 654 and thus make their way to the air outlet 616. The water droplets collected on the lateral wall 652 then drip down to the bottom 646 of the internal wall 640, where a plurality of drainage holes 685 (FIG. 37) are provided for draining the collected water from the air passage 642. In this implementation, two of the drainage holes 685 are defined by the inner member 607 between the air inlet 602 and the lateral wall 652. Two other drainage holes 685 are defined by the inner member 607 between the lateral wall 652 and the air outlet 616.

Air thus flows into the opening 654 after having shed some moisture therefrom on the lateral wall 652. Finally, air flows into the air outlet 616 to exit the CVT air conduit 610.

While the restricting structure 650 has been described above as being a part of the CVT air intake system 124', it is contemplated that, in some implementations, the engine air intake system 120' could also include a similar restricting structure and deflector. For instance, this may be helpful to reduce moisture reaching the combustion chambers of the engine 30 which can negatively affect the combustion process therein.

In some embodiments, as shown in FIG. 53, the CVT air intake system 124' also has a collector 710 connected to the deflector 624 and positioned to collect at least some moisture from air flowing past the deflector 624. In this implementation, the collector 710 is fastened to the deflector 624. However, as will be described in more detail below it is contemplated that the collector 710 could be made integrally with the deflector 624 in other implementations.

The collector 710 has an intermediate body portion 712 and two channel portions 714 extending laterally from the left and right sides of the intermediate body portion 712. The intermediate body portion 712 is fastened to the deflector 624. To that end, the intermediate body portion 712 includes two mounting posts 725 extending rearwardly from a rear surface of the intermediate body portion 712. An opening 728 extends from a front surface 716 of the intermediate body portion 716 through a respective one of the mounting posts 725. In order to fasten the collector 710 to the deflector 624, fasteners are inserted through respective openings in the deflector 624 and through respective ones of the openings 728 where the fasteners are securely received (e.g., via a thread).

In implementations where the CVT air intake system 124' includes both the collector 710 and the restricting structure 650, the fasteners pass through respective ones of the openings 728 (e.g., through-holes) and engage respective ones of the openings 674 of the mounting posts 670.

When the collector 710 is fastened to the deflector 624, the front surface 716 of the intermediate body portion 712 is in contact with the concave rear surface 627 of the deflector 624. To that end, the front surface 716 of the intermediate body portion 712 is a curved convex surface having a radius of curvature similar to that of the concave rear surface 627 of the deflector 624. Due to its positioning, in this implementation, at least part of the collector 710 is disposed longitudinally between the deflector 624 and the air outlet 616. The air filter 384 is disposed between the collector 710 and the air outlet 616.

Each channel portion 714 includes a lateral section 718 and a projecting section 720 projecting forwardly from the lateral section 718. Together, the lateral section 718 and the projecting section 720 of each channel portion 714 define a channel 722 extending generally vertically such that the intermediate body portion 712 extends laterally between the channels 722.

The channels 722 will now be described herein in greater detail. As both channels 722 are mirror images of each other in this implementation, only the right channel 722 will be described in detail herein. It is to be understood that the left channel 722 is configured similarly to the right channel 722.

The right channel 722 is defined by a collection surface 724 of the lateral section 718 and a limiting surface 726 of the projecting section 720. The collection surface 724 generally faces the air inlet 602 and is disposed such that part thereof extends laterally from the right end 653 of the deflector 624 towards the right side 648 of the internal wall 640. A width $W_C$ (FIG. 58) of the collection surface 724 is relatively small. For instance, a ratio $W_C/W_F$ of the width $W_C$ of the collection surface 724 over the width $W_F$ (FIG. 53) of the convex front surface 626 is between 0.1 and 0.5. In this example, the ratio $W_C/W_F$ is approximately 0.2. The ratio $W_C/W_F$ may have any other suitable value in other implementations.

For its part, the limiting surface 726 extends from the collection surface 724 towards the air inlet 602 and is disposed such that the collection surface 724 is at least partially laterally between the limiting surface 726 and the right end 653 of the deflector 624. Part of each of the projecting sections 720 is disposed forwardly from the left and right ends 651, 653 of the deflector 624.

In this implementation, the collection surface 724 and the limiting surface 726 are both planar. Moreover, the limiting surface 726 is substantially perpendicular (i.e., between 75° and 105°) to the collection surface 724. It is contemplated that any one, or both, of the collection surface 724 and the limiting surface 726 could be shaped differently (e.g., curved) in alternative implementations. Moreover, in this implementation, the collector 710, including the channel portions 714 thereof, extends along the entire height of the deflector 624. As such, the collecting surface 724 extends from the top 644 to the bottom 646 of the deflector 624 which may enable the channel 722 to collect moisture along the entire height of the deflector 624.

As previously mentioned, in use, as air flows into the CVT air conduit 610 via the air inlet 602 and flows past the deflector 624, at least some water entrained with the air flow sticks to the convex surface 626 of the deflector 624. The water droplets on the convex surface 626 are forced towards the left and right ends 651, 653 of the deflector 624 by the air flow. Due to their position adjacent the ends 651, 653 of the deflector 624, the channels 722 of the collector 710 catch at least some of the water droplets therein, thus preventing the water droplets from being entrained further into the air passage 642 (e.g., to reach the air outlet 616). The collected water droplets then trickle down the collecting surface 724 and/or the limiting surface 726 of the channels 722 to reach the bottom 646 of the internal wall 640. The water droplets are then evacuated from the air passage 642 via the drainage holes 685 (FIG. 37).

As such, it will be understood that the channels 722 of the collector 710 act like gutters for water flowing from the left and right ends 651, 653 of the deflector 624.

As mentioned above, in some implementations, the collector 710 could be made integrally with the deflector 624. For instance, as shown in FIG. 59, in such an implementation, the channel portions 714 of the collector 710 are linked to one another by the deflector 624 and extend laterally outwardly from either lateral end 651, 653 of the deflector 624. As such, the deflector 624 may function as the intermediate body portion 712 in such implementations.

While the collector 710 has been described above as part of the CVT air intake system 124', it is contemplated that, in some implementations, the engine air intake system 120' could also include a similar collector. For instance, as discussed above with respect to the restricting structure, this may be helpful to reduce moisture reaching the combustion chambers of the engine 30 which can negatively affect the combustion process therein.

Figure 29:
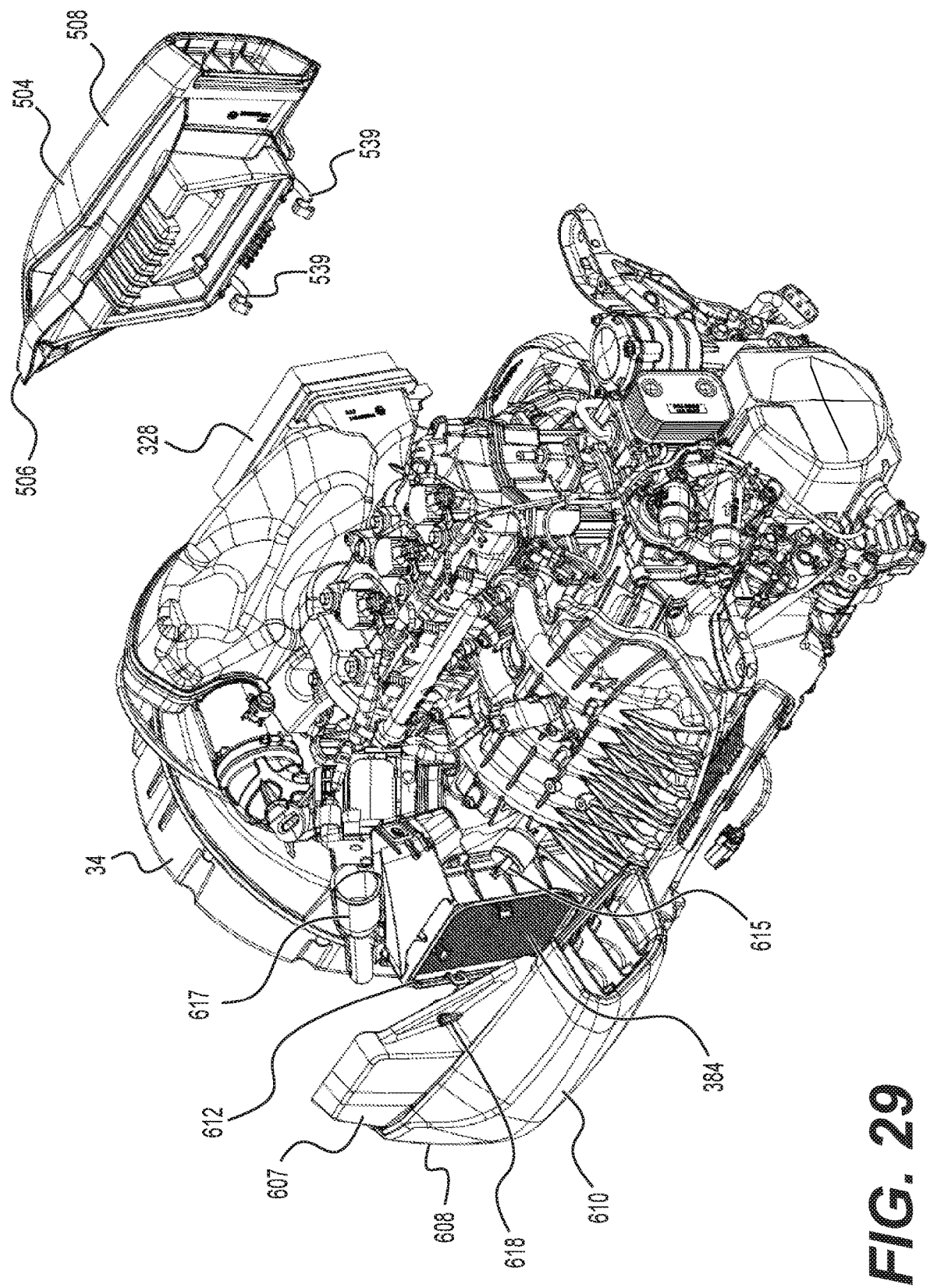
FIG. 29 is a perspective view, taken from a front, top and right side, of the engine, the CVT air intake system and the engine air intake system, in which air conduits of the CVT and engine air intake systems are in an open position and disconnected respectively.
Figure 30:
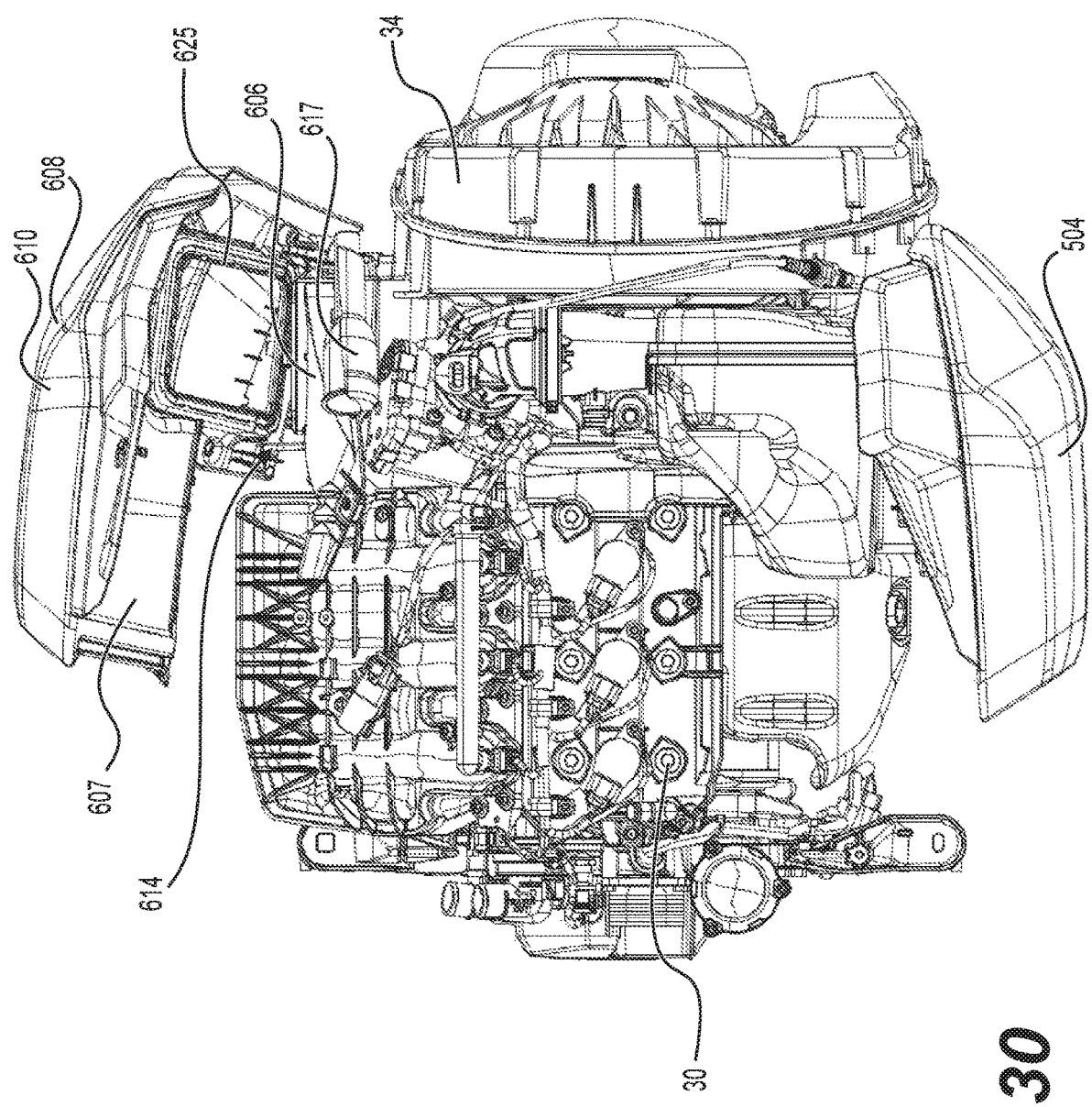
FIG. 30 is a top plan view of the engine and CVT air intake system in which the CVT air conduit is in an open position.
Figure 34:
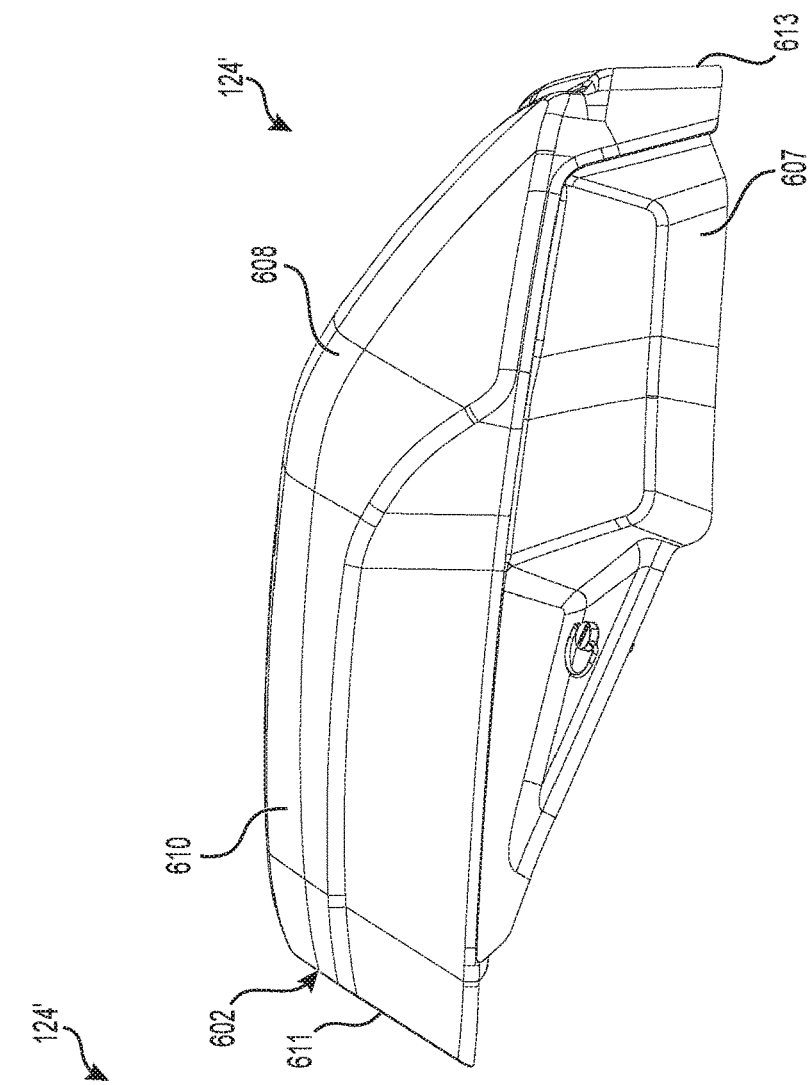
FIG. 34 is a top plan view of the CVT air intake system of FIG. 16.

As shown in FIGS. 29 and 30, the CVT air conduit 610 is openable to access one or more engine components. More particularly, in this implementation, part of the CVT air conduit 610 is pivotable between a closed position and an open position to provide access to an oil dipstick 615 and a funnel 617. More specifically, the outer cover 608 and the inner member 607 are pivotable relative to the base member 606. The oil dipstick 615 is used for determining the level of oil in an oil tank 360 of a lubrication system of the engine 30 as will be described in more detail below. The funnel 617 is used for filling the fuel tank 60 with fuel (e.g., from a fuel can) and, when stored, is held by a clip to an outer side of the CVT housing 150. The funnel 617 is selectively removable from the clip. In addition, in the open position of the CVT air conduit 610, the air filter 384 can be visually inspected. The retaining bracket 612 holds the air filter 384 in place across the air inlet 380 and, in the open position of the CVT air conduit 610, can be removed (e.g., by unscrewing the retaining bracket 612) in order to replace the air filter 384. As discussed above, an O-ring is provided around the air inlet 380. The retaining bracket 612 and the inner conduit 161 are sized and shaped such that they compress the O-ring when assembled, thereby ensuring the seal around the air filter 384, although it will be appreciated that various alternative ways of ensuring a seal around the air filter 384 are available.

The outer cover 608 and the inner member 607 of the CVT air conduit 610 are pivotable about a hinge 614 (FIG. 30) relative to the base member 606. As such, part of the CVT air conduit 610 can pivot relative to the air inlet 380 of the CVT housing 150 (or 150'). In this implementation, the hinge 614 is established between the base member 606 and the inner member 607. As the outer cover 608 and the inner member 607 are pivoted about the hinge 614, from the closed position to the open position, an air outlet 625 (FIG. 30) of the inner member 607 pivots away from the air outlet 616 and the air inlet 380. In this implementation, in order to move the CVT air conduit 610 from its closed position to its open position, a quarter-turn fastener 618 (FIG. 29) provided on an outer side of the CVT air conduit 610 is disengaged from the base member 606 to unlock the inner member 607 from the base member 606. The CVT air conduit 610 can then be pivoted back to its closed position and the quarter-turn fastener 618 engaged with the base member 606 in order to lock the inner member 607 to the base member 606. The CVT air conduit 610 is thus pivoted between its open and closed positions toollessly (i.e., without using any tools).

The outer cover 608 and inner member 607 may be entirely removable from the base member 606 in other implementations. Moreover, in other implementations, other engine components (i.e., components associated with the engine 30 and the vehicle 10") may be accessible when the CVT air conduit 610 is in the open position. For example, any of a battery, a coolant reservoir, an oil filter, spark plugs, injectors, fuses and a diagnostic connector may be accessible in other implementations by moving the CVT air conduit 610 to the open position.

In this implementation, the CVT air conduit 610 is formed separately from the engine air conduit 420.

Figure 5E:
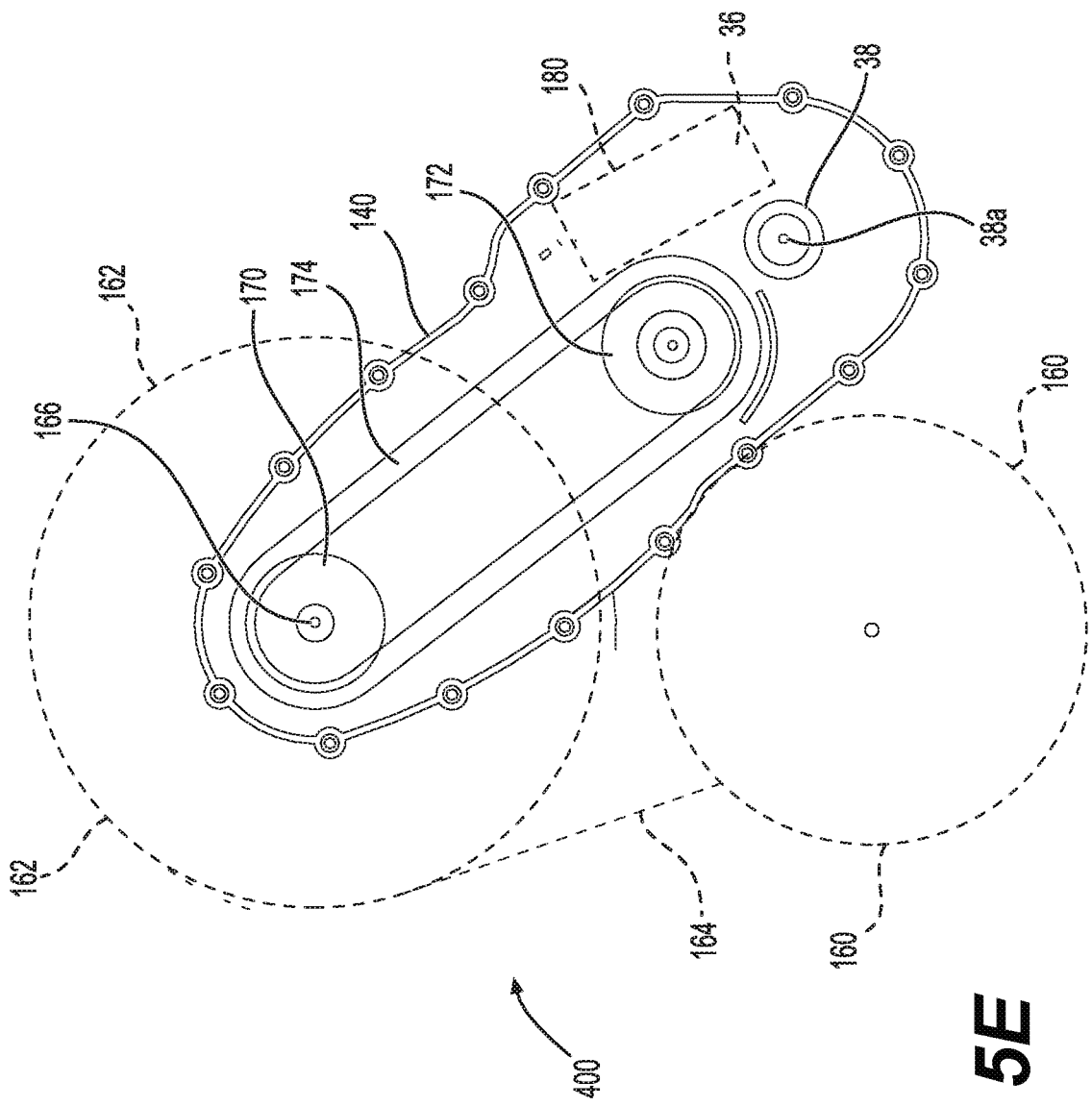
FIG. 5E is a schematic front elevation view of the transfer case, CVT, gear selection assembly and driveshaft of the powertrain of FIG. 4A.
Figure 6A:
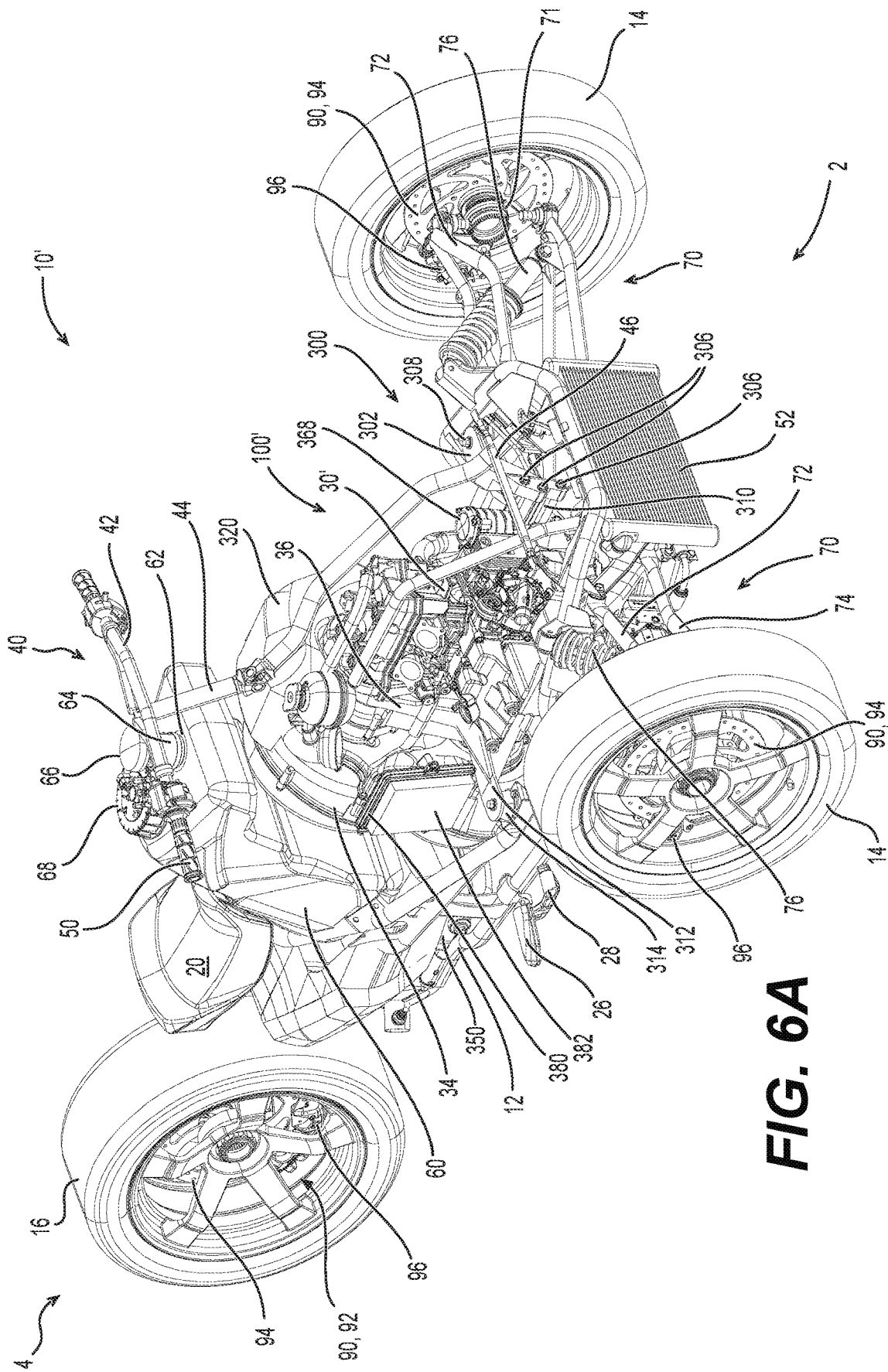
FIG. 6A is a is a perspective view, taken from a front, top and right side, of another three-wheeled straddle-seat vehicle in accordance with an implementation of the present technology with the fairings thereof being removed for clarity.
Figure 6B:
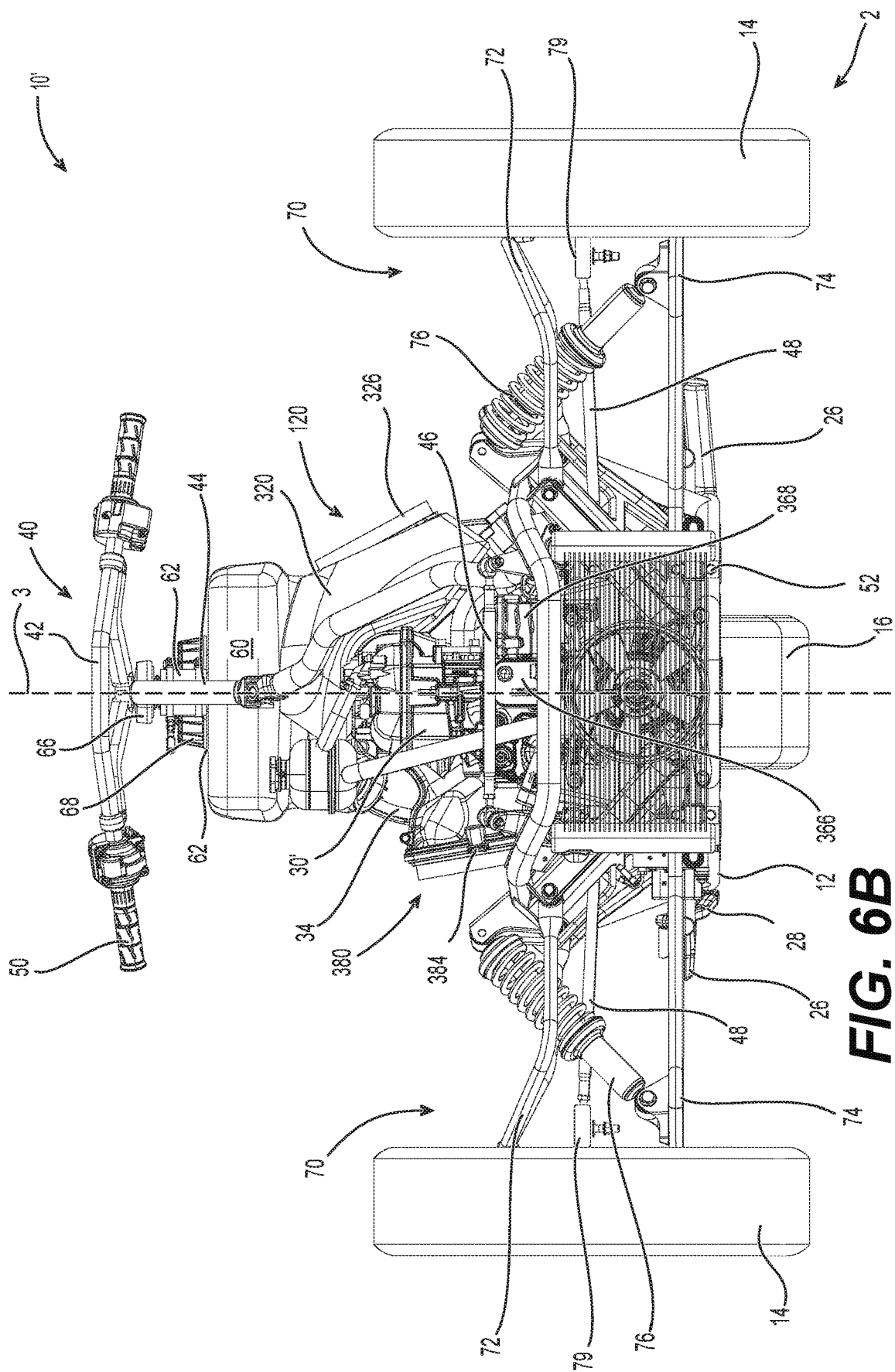
FIG. 6B is a front elevation view of the vehicle of FIG. 6A.

With reference now to FIG. 5E, the transfer case 36 includes an input sprocket 170, an output sprocket 172, and a chain 174 enclosed by the transfer case housing 140. The output sprocket 172 is operatively connected to the input sprocket 170 by the chain 174. It is also contemplated that the output sprocket 172 could be driven by the input sprocket 170 via a belt or a gear train. The input sprocket 170 is disposed coaxially with the secondary pulley 162 and forwardly thereof. The input sprocket 170 is mounted to the front end of the shaft 165 (FIG. 5C) so as to be driven by the secondary pulley 162. The output sprocket 172 is disposed vertically below the input sprocket 170 and laterally offset toward the left side thereof. As can be seen in FIGS. 5A and 5C, the transfer case housing 140 includes a front cover 176 that is bolted to the engine 30 and a rear cover 178 that is bolted to the front cover 152 of the CVT housing 150. The rear cover 178 has a forwardly extending rim that is bolted to a rearwardly extending rim of the front cover 176. The rear cover 178 defines an upper opening 184 (FIG. 5C) for receiving the shaft 165 and a lower opening 182 (FIGS. 5B and 5C) for receiving a front end of the driveshaft 38.

The output sprocket 172 selectively engages the driveshaft 38 via the gear selection assembly 180 (shown schematically in FIG. 5E) for rotating the driveshaft 38 and thereby the rear wheel 16. The gear selection assembly 180 is disposed inside the transfer case housing 140 in the illustrated implementation of the vehicle 10. It is however contemplated that the gear selection assembly 180 could be disposed outside the transfer case housing 140.

The front end of the driveshaft 38 is enclosed by the transfer case housing 140 and is splined to enable the gear selection assembly 180 to engage the driveshaft 38 for rotating the driveshaft 38. The driveshaft 38 extends longitudinally and rearwardly out of the opening 182 (FIGS. 5B and 5C) in the transfer case housing 140 towards the rear wheel 16.

Still referring to FIG. 5E, the gear selection assembly 180 causes selective engagement of the driveshaft 38 with the output sprocket 172 based on a gear selection operator (not shown). In the illustrated implementation of the vehicle 10, the gear selection operator is in the form of a paddle disposed near the left hand grip of the handlebar 42. The gear selection operator allows selection of one a forward gear, reverse gear and a neutral gear. It is contemplated that the gear selection operator could be in the form of a knob, a switch, one or more buttons, and the like. When the forward gear is selected, the output sprocket 172 engages the driveshaft 38 so as to rotate the driveshaft 38 in the same rotational direction as the output sprocket 172. When the reverse gear is selected, the output sprocket 172 engages the driveshaft 38 via an idler gear (not shown) so as to rotate the driveshaft 38 in the opposite direction as the output sprocket 172. When the neutral gear is selected, the output sprocket 172 is disengaged from the driveshaft 38. The gear selection assembly 180 therefore comprises a combination of gears, slidable sleeves, and the like for causing selective engagement of the driveshaft 38 by the output sprocket 172.

Figure 4A:
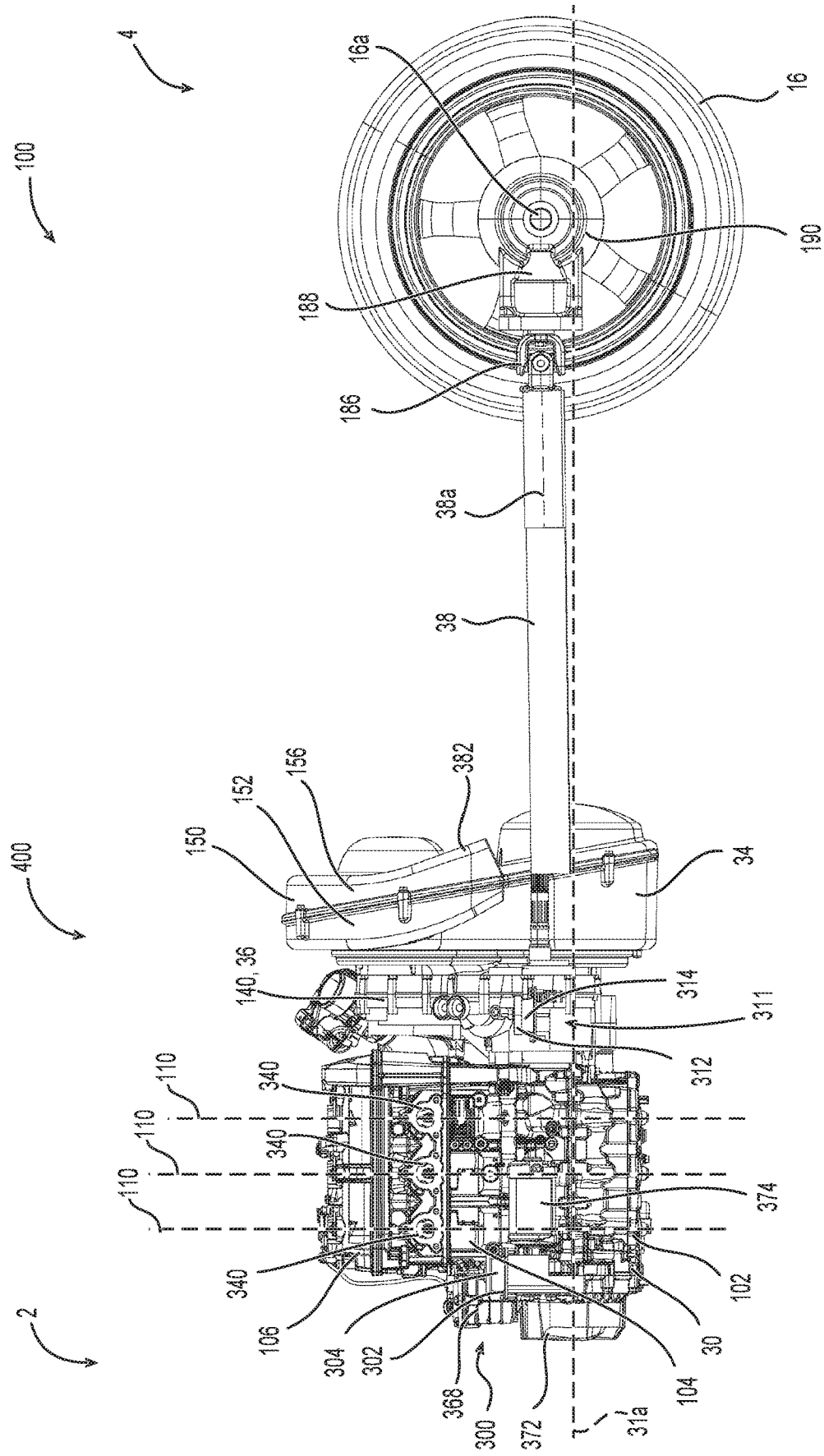
FIG. 4A is a left side elevation view of the powertrain, engine mounting assemblies, and rear wheel of the vehicle of FIG. 1A.
Figure 4B:
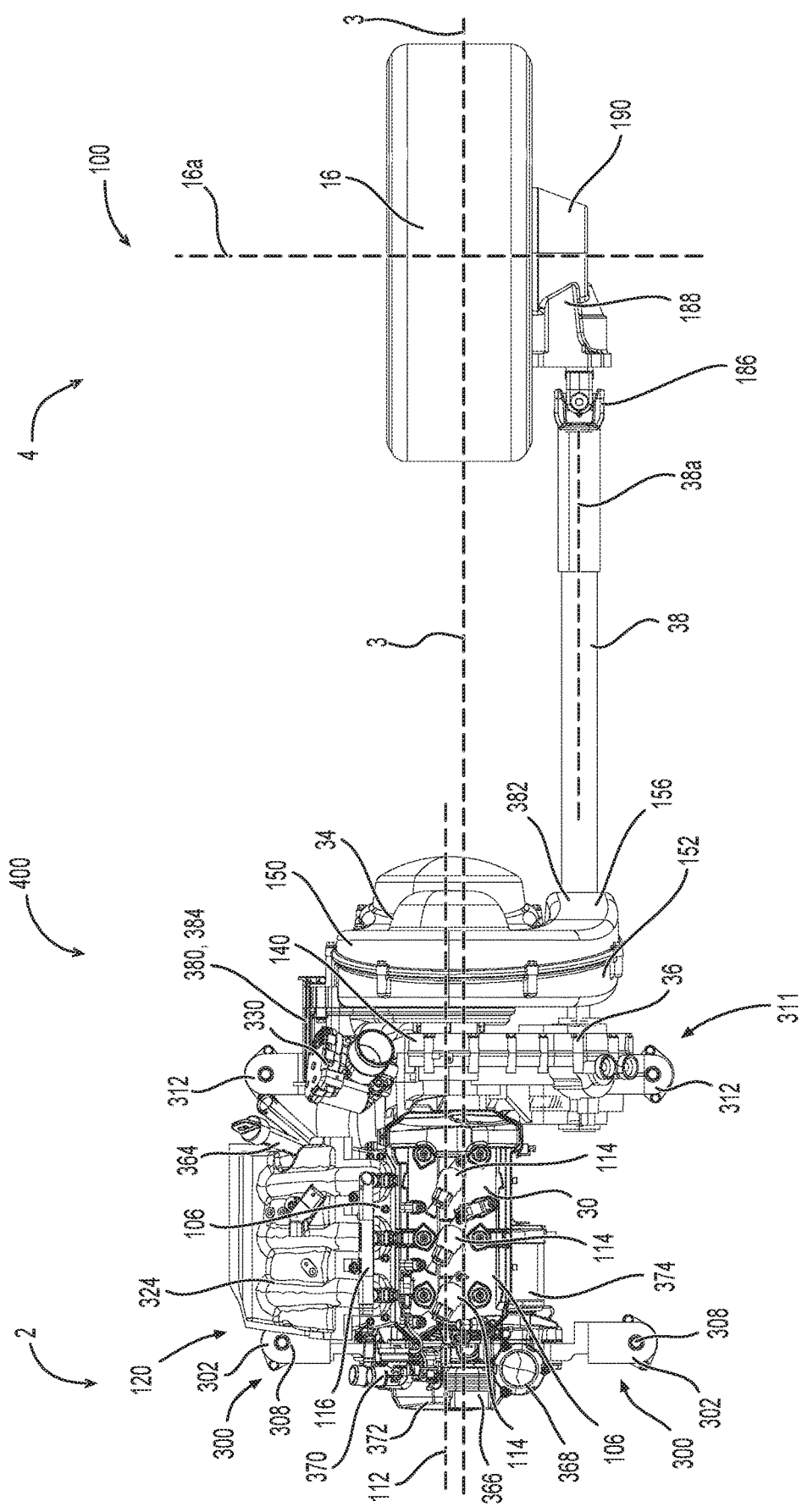
FIG. 4B is a top plan view of the powertrain, engine mounting assemblies, and rear wheel of FIG. 4A.

Referring now to FIGS. 4A and 4B, the driveshaft 38 extends longitudinally on a left side of the longitudinal centerplane 3. The rear end of the driveshaft 38 is connected via a universal joint 186 to a pinion 188. The pinion 188 engages a bevel gear 190 fixed to the hub of the rear wheel 16. It is contemplated that the universal joint 186 could be enclosed inside a flexible boot to prevent entry of dirt and debris into the joint. The universal joint 186 allows the rear end of the driveshaft 38 to drive the rear wheel 16 without inhibiting motion of the rear wheel 16 about the rear suspension assembly 80 as the vehicle 10 moves over uneven terrain. It is contemplated that the universal joint 186 could be connected to the front end of the driveshaft 38 instead of the rear end thereof. The pinion 188 transmits rotation of the driveshaft 38 about a generally longitudinal axis 38a to the rear wheel 16 which rotates about a generally lateral axis 16a.

With reference to FIG. 1B, the driveshaft 38 is disposed vertically higher than the footrests 26 when the vehicle 10 is placed on level ground with no driver, passengers, or cargo. With reference to FIG. 4A, a central rotational axis 38a of the driveshaft 38 is disposed vertically higher than a central rotational axis 31a of the engine output shaft 32 when the vehicle 10 is placed on level ground with no driver, passengers, and/or cargo.

It is contemplated that the driveshaft 38 could be omitted and the output sprocket 172 of the transfer case 36 could be connected to the rear wheel 16 via a chain or belt instead of the driveshaft 38.

In the illustrated implementation, the CVT 34, the transfer case 36 and the gear selection assembly 180 form a transmission assembly 400 of the vehicle 10. It is contemplated that the gear selection assembly 180 could be omitted from the vehicle 10. It is also contemplated that the vehicle 10 could have a transmission assembly 400 in which the CVT 34, the transfer case 36 and the gear selection assembly 180 are replaced by a discrete gear transmission.

Mounting of the Powertrain to the Vehicle Frame

The mounting of the powertrain 100 to the vehicle frame 12 will now be described with reference to FIGS. 1H, 4A, 4B and 10A.

As can be seen in FIG. 1H, a front portion of the engine 30 is mounted to the front left and right engine mounting brackets 250 of the vehicle frame 12 by a front left mounting assembly 300 and a front right mounting assembly 300 respectively.

Figure 4C:
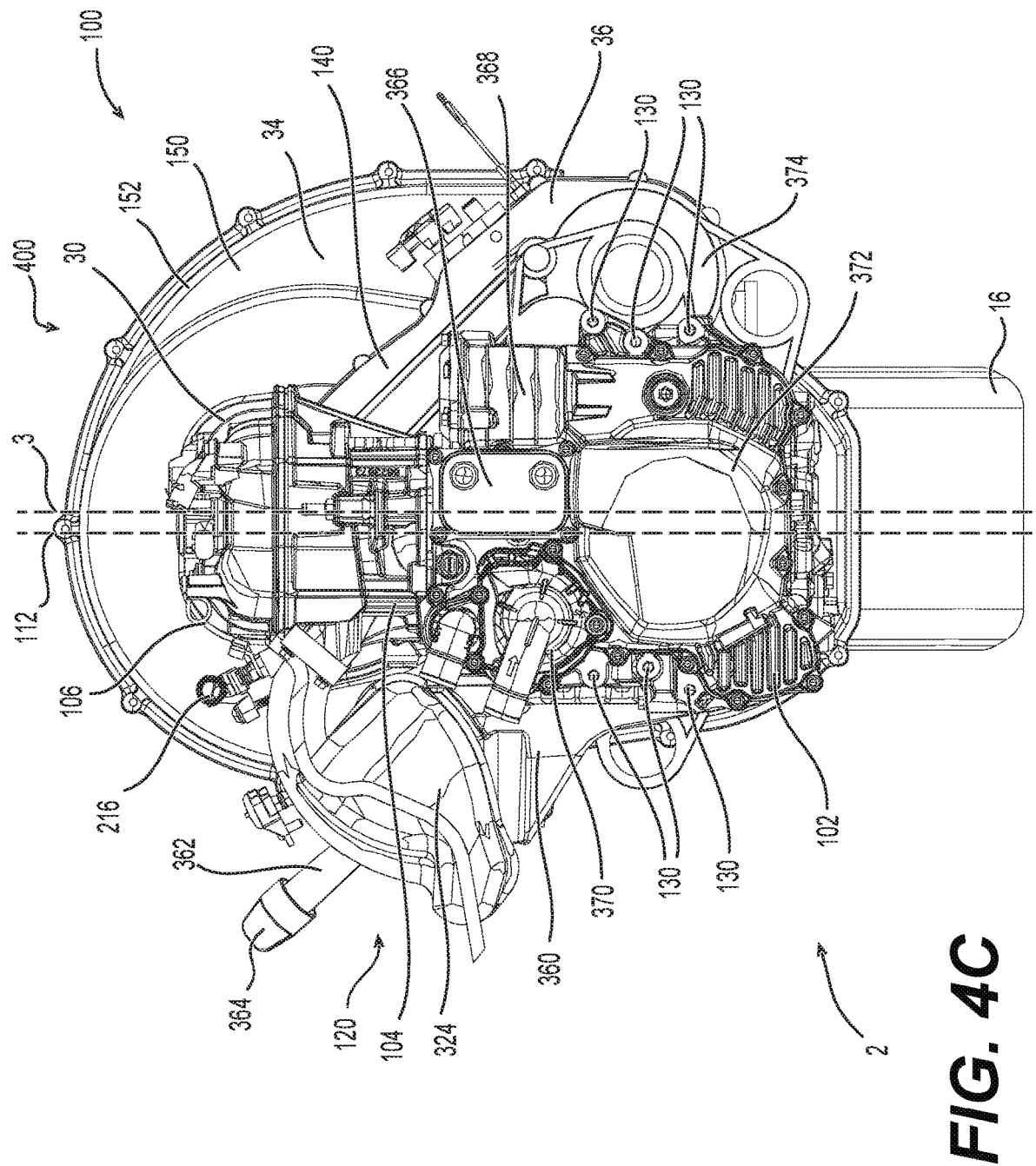
FIG. 4C is a front elevation view of the powertrain and rear wheel of FIG. 4A.

As can be seen in FIG. 4C, three left boltholes 130 are defined in the engine 30 in a front left portion of the crankcase 102 for connection to the left bracket 250 and three right boltholes 130 are defined in a front right portion of the crankcase 102 for connection to the right bracket 250.

Figure 10A:
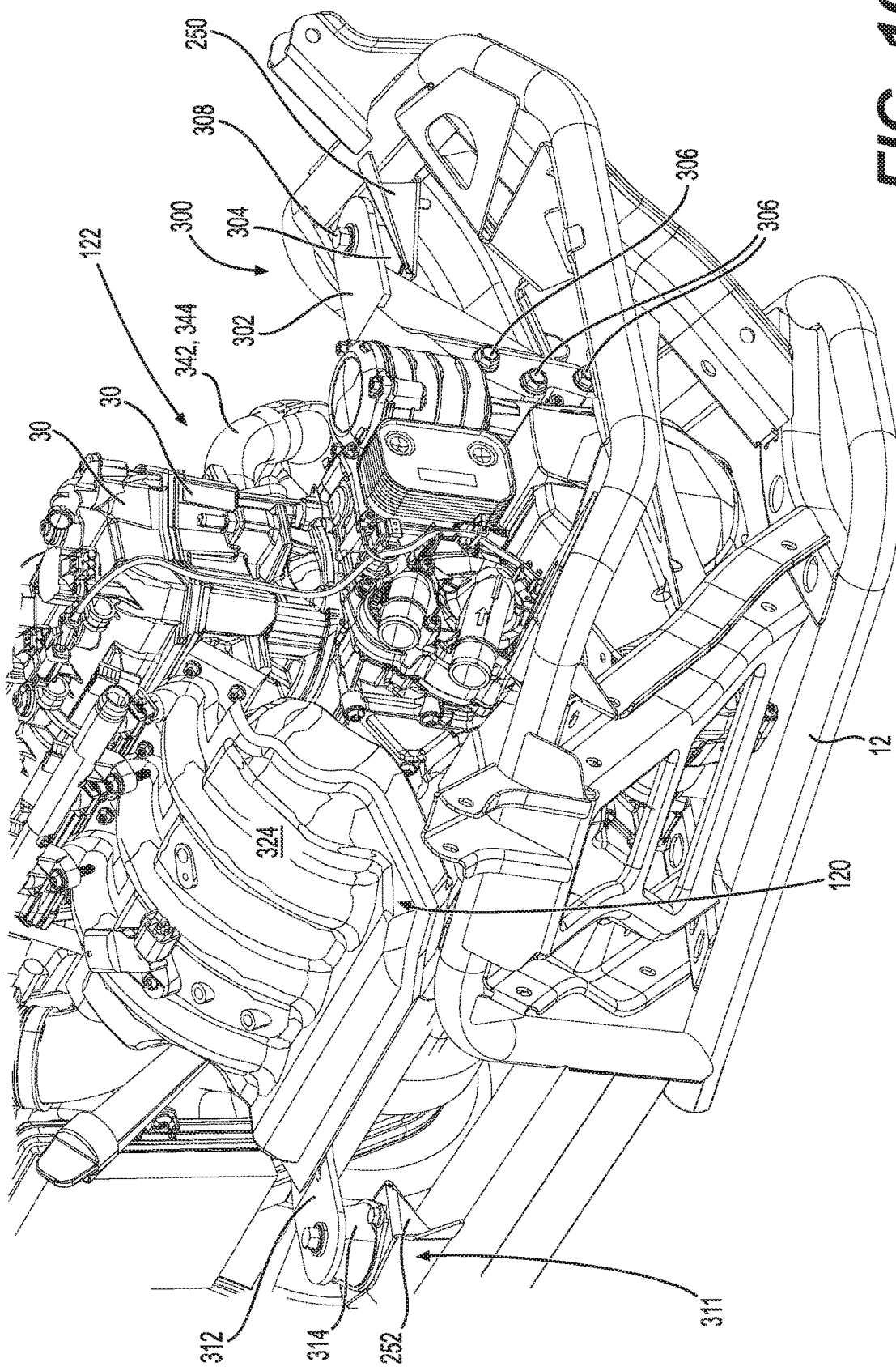
FIG. 10A is a close-up perspective view, taken from a front, top and right side, of a portion of the vehicle of FIG. 1A showing the mounting of the engine and transmission assembly to the vehicle frame.
Figure 10B:
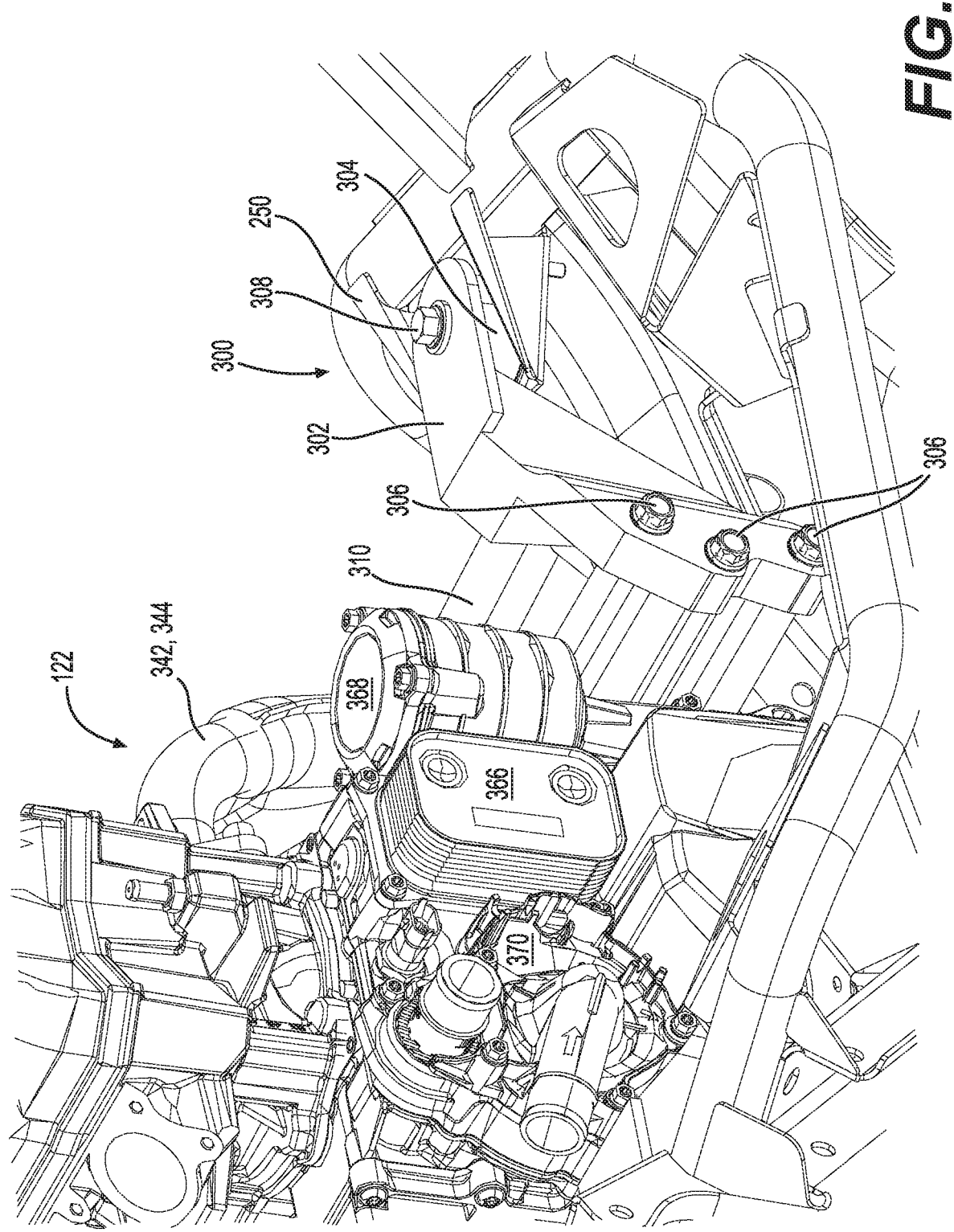
FIG. 10B is a close-up perspective view, taken from a front, top and right side, of a portion of the vehicle of FIG. 6A showing the mounting of the engine to the vehicle frame.

With reference to FIG. 10A, the front left mounting assembly 300 comprises a bracket 302, a vibration damping element 304, three engine bolts 306 and a frame bolt 308. The bracket 302 has a horizontally extending flange with a central bolthole and a vertical flange (not shown) having three boltholes corresponding to the left boltholes 130 of the engine 30. The bracket 302 is made of metal or other suitable material. The vibration damping element 304 is in the form of a ring made of rubber. It is however contemplated that the vibration damping element 304 could be made of other suitable material. The vibration damping element is commonly referred to as a "motor mount".

The vibration damping element 304 is sandwiched between the engine mounting bracket 250 and the bracket 302 in order to isolate the engine 30 from the vehicle frame 12. The frame bolt 308 connects the vibration damping element 304 to the bracket 302 and the vibration damping element 304 is connected to the front left bracket 250 of the vehicle frame 12 by other bolts (not shown).

The engine 30 is disposed in the engine cradle 290 such that the left boltholes 130 are aligned with corresponding boltholes of the vertical flange of the bracket 302. The engine bolts 306 are inserted through the aligned boltholes of the bracket 302 and the left boltholes 130 of the engine 30 to secure the engine 30 to the vehicle frame 12.

The front right mounting assembly 300 comprises a bracket 302, a vibration damping element 304, three engine bolts 306 and a frame bolt 308 similar to the corresponding components of the front left mounting assembly 300. The front right mounting assembly 300 secures the engine 30 to the front right bracket 250 of the vehicle frame 12 in the same manner as described above for the front left assembly 300. As such, the front right mounting assembly 300 will not be described herein in detail.

It is contemplated that configuration of the left boltholes 130 on the left side of the crankcase 102 and/or the right boltholes 130 on the right side of the crankcase 102 could be different from that shown herein. It is also contemplated that the front portion of the engine 30 could be mounted to the vehicle frame 12 by a single bracket 250 disposed laterally centrally and a single mounting assembly 300 including a single vibration damping element 304 rather than the pair of left and right brackets 250 and the corresponding pair of left and right mounting assemblies 300 as shown herein.

With reference to FIGS. 1H, 4A and 4B, the left side of the transfer case housing 140 is connected to the rear left bracket 252 of the vehicle frame 12 using a bracket 312 and a vibration damping element 314 similar to the vibration damping element 304 described above. The vibration damping element 314 is disposed on the rear left bracket 252. The bracket 312 and the vibration damping element 314 form a rear left mounting assembly 311 which are secured to the rear left bracket 252 in the same manner as described above for the front left and right assemblies 300.

The right side of the transfer case housing 140 is connected to the rear right bracket 252 of the vehicle frame via a bracket 312 and a vibration damping element 314 of a rear right mounting assembly 311 similarly as described above for the left side of the transfer case housing 140, and as such will not be described again herein in detail.

In the illustrated implementation of the vehicle 10, the components of the powertrain 100, i.e., the engine 30, the CVT 34 and the transfer case 36, are all secured to the vehicle frame 12 via the four mounting points provided by the brackets 250, 252. It is contemplated that the CVT housing 150 and/or a rear portion of the engine 30 could be secured to the vehicle frame 12 instead of the transfer case housing 140. It is also contemplated that the rear portion of the engine 30 and/or the CVT housing 150 could be connected to the vehicle frame 12 in addition to the transfer case housing 140.

Air Intake System for Engine

The air intake system 120 connected to the engine 30 will now be described with reference to FIGS. 1A to 1C, and 11A to 11D.

As can be seen in FIG. 1C, the air intake system 120 includes an engine air intake conduit 320, a throttle body 322, and an airbox (also known as a plenum) 324. The engine air intake conduit 320 receives air from an air inlet 326 disposed on a left side of the cylinder block 104. An engine air filter 328 is disposed over the air inlet 326 to prevent dust and debris from entering the engine 30. The engine air intake conduit 320 extends upwardly and then rightwardly between the engine 30 and the CVT 34. On the right side of the engine 30, the engine air intake conduit 320 connects to a rear end of a cylindrical throttle body 322 located on the right side of the longitudinal centerplane 3. A throttle valve (not shown) disposed inside the throttle body 322 regulates the flow of air through the throttle body to the cylinders 108 of the engine 30. The throttle valve is operatively connected to a throttle actuator 330 in the form of an electric motor which is configured to control a position of the throttle valve based on a position of the throttle operator 112. The throttle actuator 330 controls the position of the throttle valve based in part on the position of the throttle operator 50. The front end of the throttle body 322 is connected via a conduit 323 to an inlet in the rear end of the airbox 324. As can be seen, the airbox 324 is disposed on the right side of the cylinder block 104. An air intake port (not shown) is defined in the right side of each cylinder 108. The airbox 324 has three outlets (not shown), each of which connects to the air intake ports of a corresponding cylinder 108. The air intake ports of the cylinders 108 define an engine air inlet 315 of the engine 30 (schematically illustrated at FIG. 17). When the engine 30 is operating, air flows consecutively through the air inlet 326, the engine air intake conduit 320, the throttle body 322, the conduit 323, and the airbox 324 to the cylinders 108 of the engine 30. Air thus flows from a left side of the longitudinal centerplane 3 to a right side of the longitudinal centerplane 3 as the engine air inlet 315 (defined by the air intake ports of the cylinders 108) is located on the right side of the longitudinal centerplane 3.

As can be seen, the air inlet 326 is facing leftwardly. In some implementations, as shown in FIGS. 11A to 11D, the air inlet 326 is connected to an engine air conduit 420 to direct air from a front of the vehicle 10 into the air inlet 326. The engine air conduit 420 is connected to the engine air intake conduit 320 such that an air outlet 422 of the engine air conduit 420 connects to the air inlet 326. From the air inlet 326, the engine air conduit 420 extends forwardly on a left side of the engine block 102 to a generally forwardly facing air inlet 424 through which air enters the air intake system 120.

As mentioned above, in the illustrated implementation, the engine air conduit 420 is formed integrally with the CVT air conduit 410. It is however contemplated that the engine air conduit 420 could be formed separately from the CVT air conduit 410.

Figure 14:
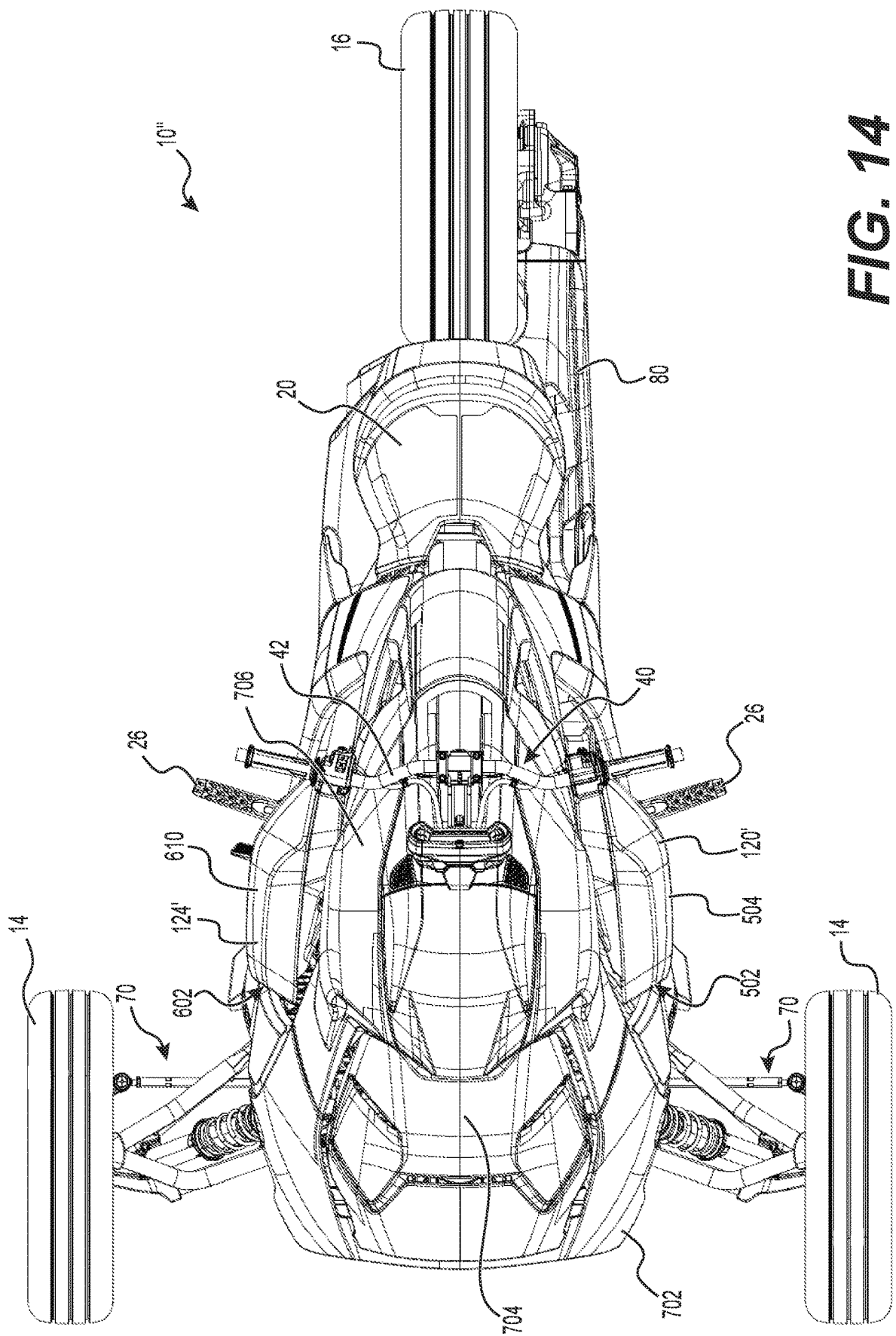
FIG. 14 is a top plan view of the vehicle of FIG. 12.
Figure 15:
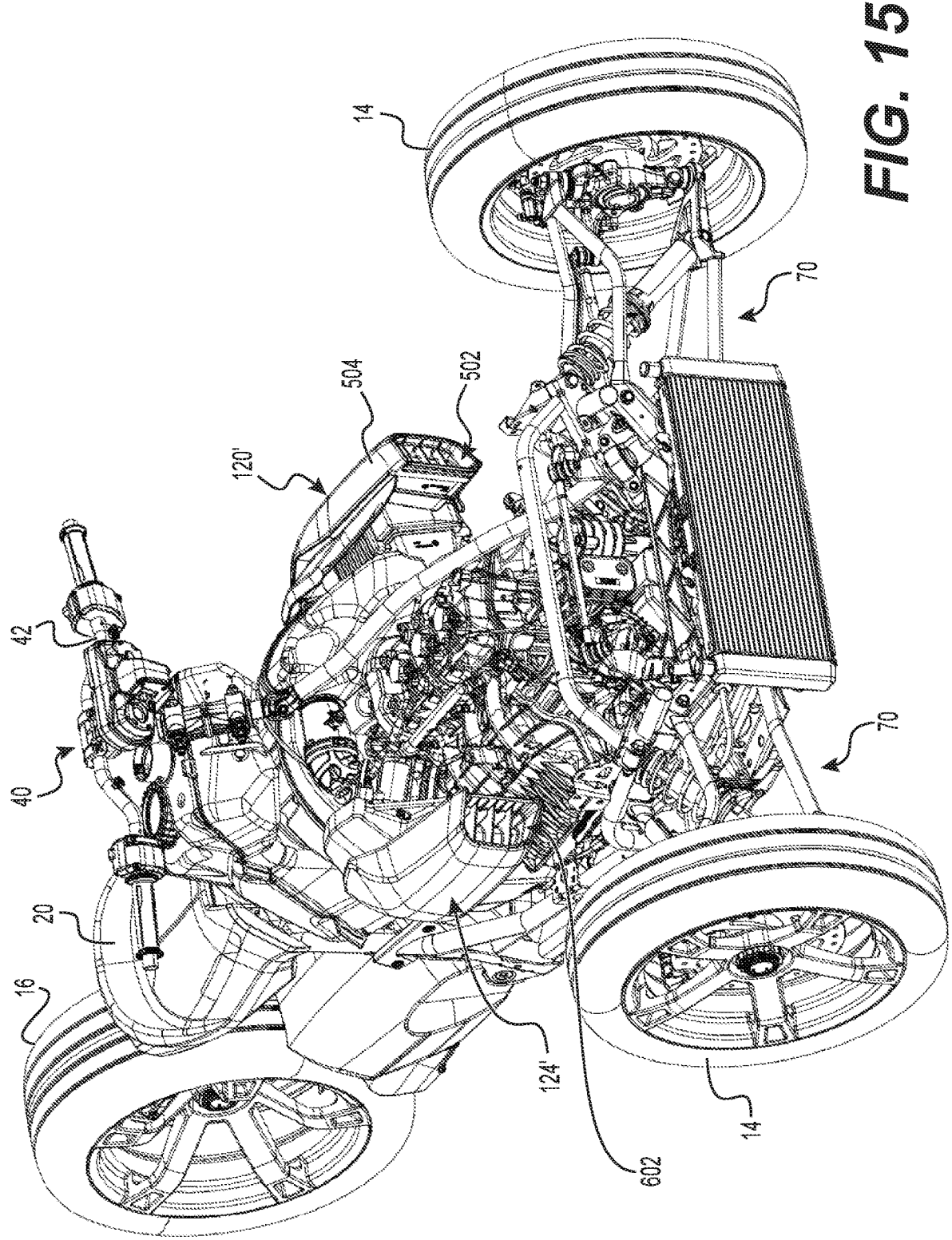
FIG. 15 is a perspective view, taken from a front, top and right side of the vehicle of FIG. 12 with certain panel members removed to expose the engine and other internal components of the vehicle.

Returning now to FIGS. 12 to 15, in the vehicle 10", air from a front of the vehicle 10" is directed into the engine air intake system 120'. In this implementation, the air intake system 120', which fluidly communicates with the engine air inlet 315, includes an engine air conduit 504 (which replaces the engine air conduit 420), a conduit 505 (which replaces the engine air intake conduit 320), as well as the throttle body 322, the conduit 323 and the airbox 324 discussed above. The air intake system 120' has an air inlet 502 defined by the engine air conduit 504. It is contemplated that a separate component connected to the engine air conduit 504 could define the air inlet 502 in other implementations. As shown in FIG. 14, the engine air conduit 504 extends rearwardly from the air inlet 502 (i.e., the air conduit 504 extends in a direction having a longitudinal rearward component).

As can be seen, the air inlet 502 faces generally forwardly. The air inlet 502 is said to face generally forwardly in that air from in front of the vehicle 10" can enter the air inlet 502 when the vehicle 10" is in motion and that a projection of the air inlet 502 onto a plane normal to a longitudinal axis of the vehicle 10" defines a surface area. The forwardly facing configuration of the air inlet 502 functions as a ram-air intake causing a static air pressure increase within the air intake system 120' as a result of the dynamic pressure created by forward motion of the vehicle. This results in higher volumetric flow and pressure to the engine 30.

Figure 17:
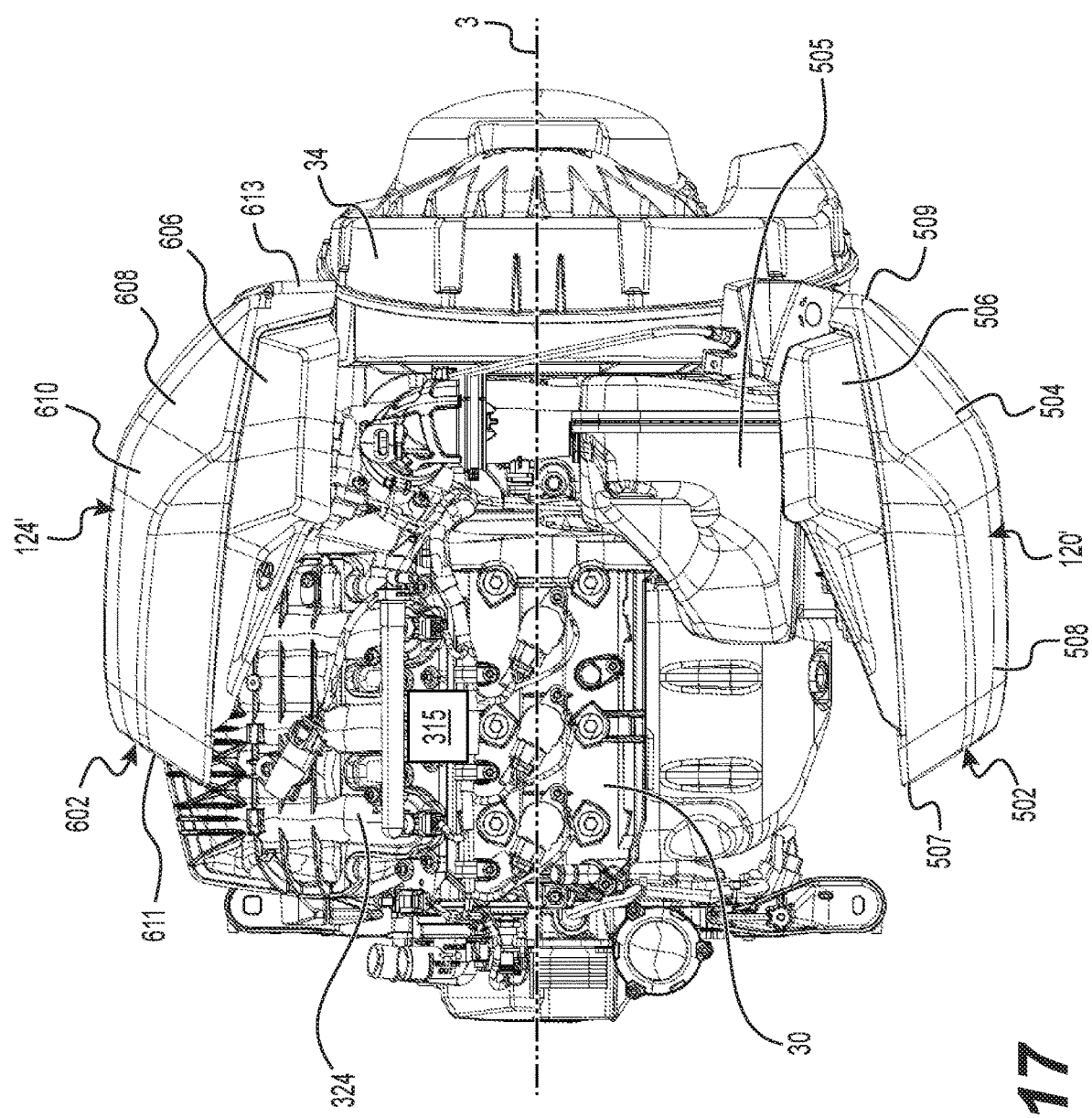
FIG. 17 is a top plan view of the engine and air intake systems of FIG. 16.
Figure 18:
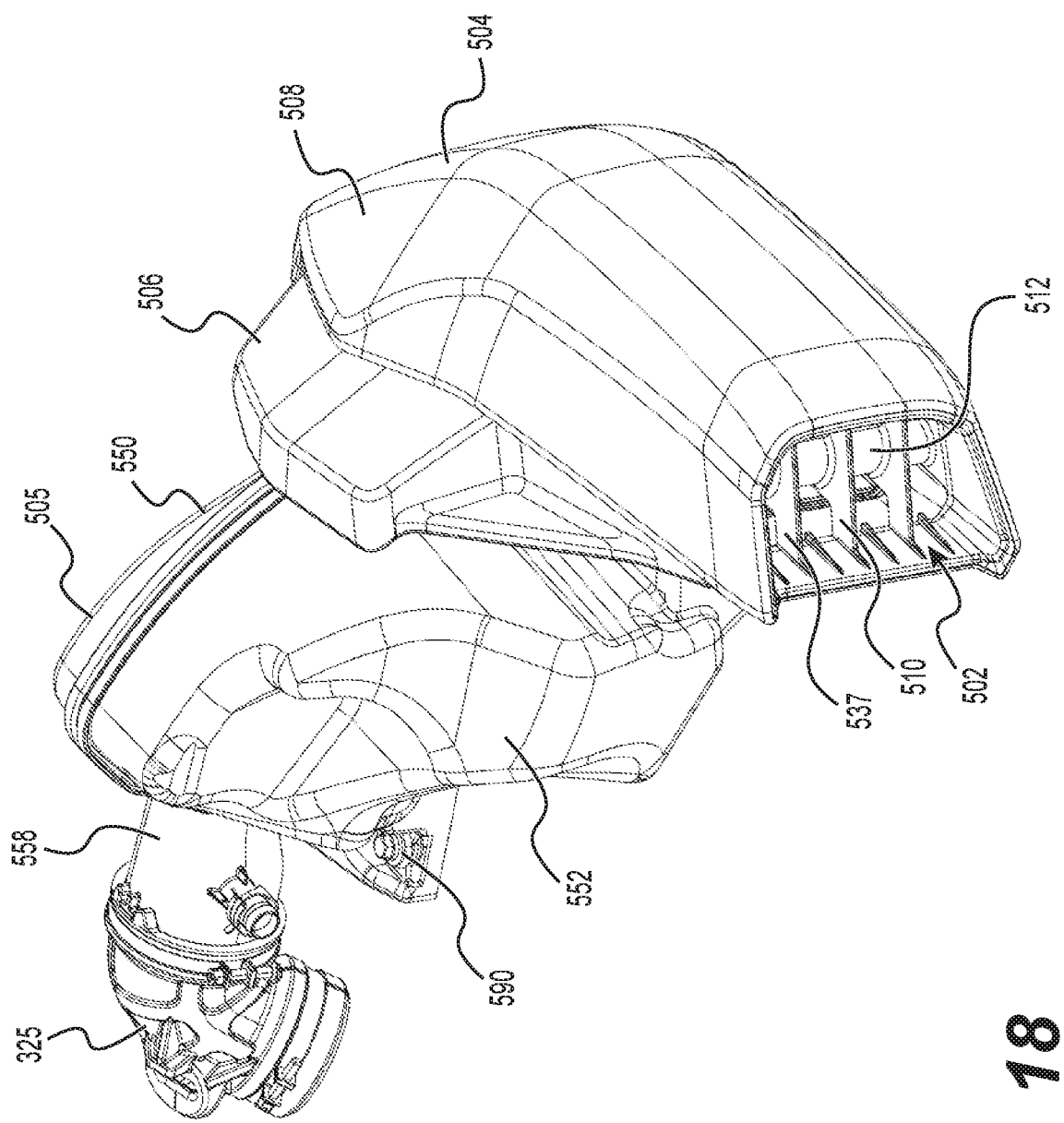
FIG. 18 is a perspective view, taken from a front, top and left side, of part of the engine air intake system of FIG. 16.
Figure 19:
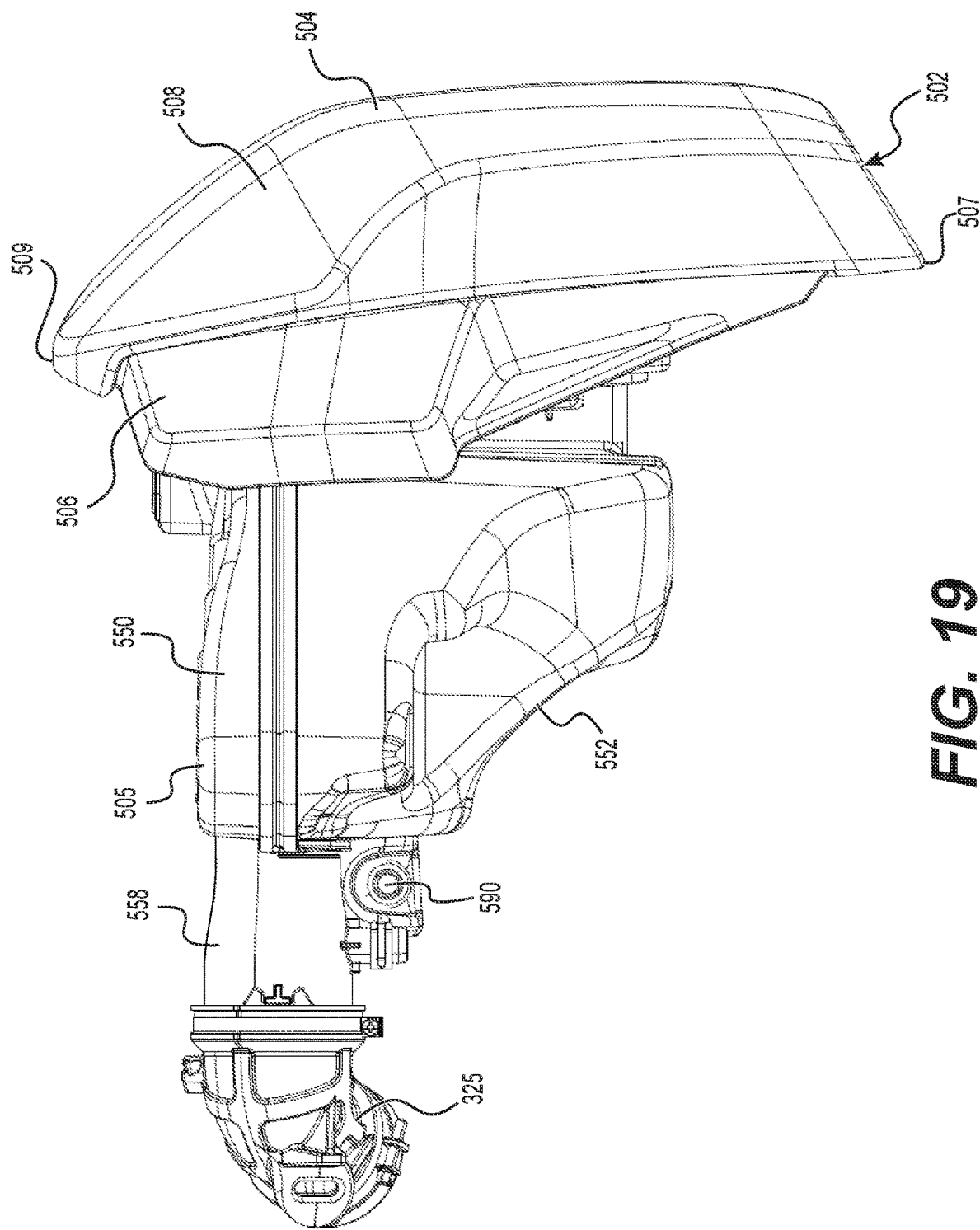
FIG. 19 is a top plan view of the engine air intake system of FIG. 18.

As shown in FIG. 17, the air inlet 502 is located on the left side of the longitudinal centerplane 3 and partly on the left side of the engine 30. The air inlet 502 of the engine air intake system 120' and the air inlet 602 of the CVT air intake system 124 are thus disposed on opposite lateral sides of the longitudinal centerplane 3 and partly on opposite lateral sides of the engine 30.

With reference to FIGS. 18 to 21, the engine air conduit 504 includes a base member 506 and an outer cover 508 that is connected to the base member 506. FIG. 22 shows the outer cover 508 with the base member 506 removed to expose the engine air filter 328. The outer cover 508 defines the air inlet 502 while the base member 506 defines an air outlet 511 of the engine air conduit 504.

Figure 22:
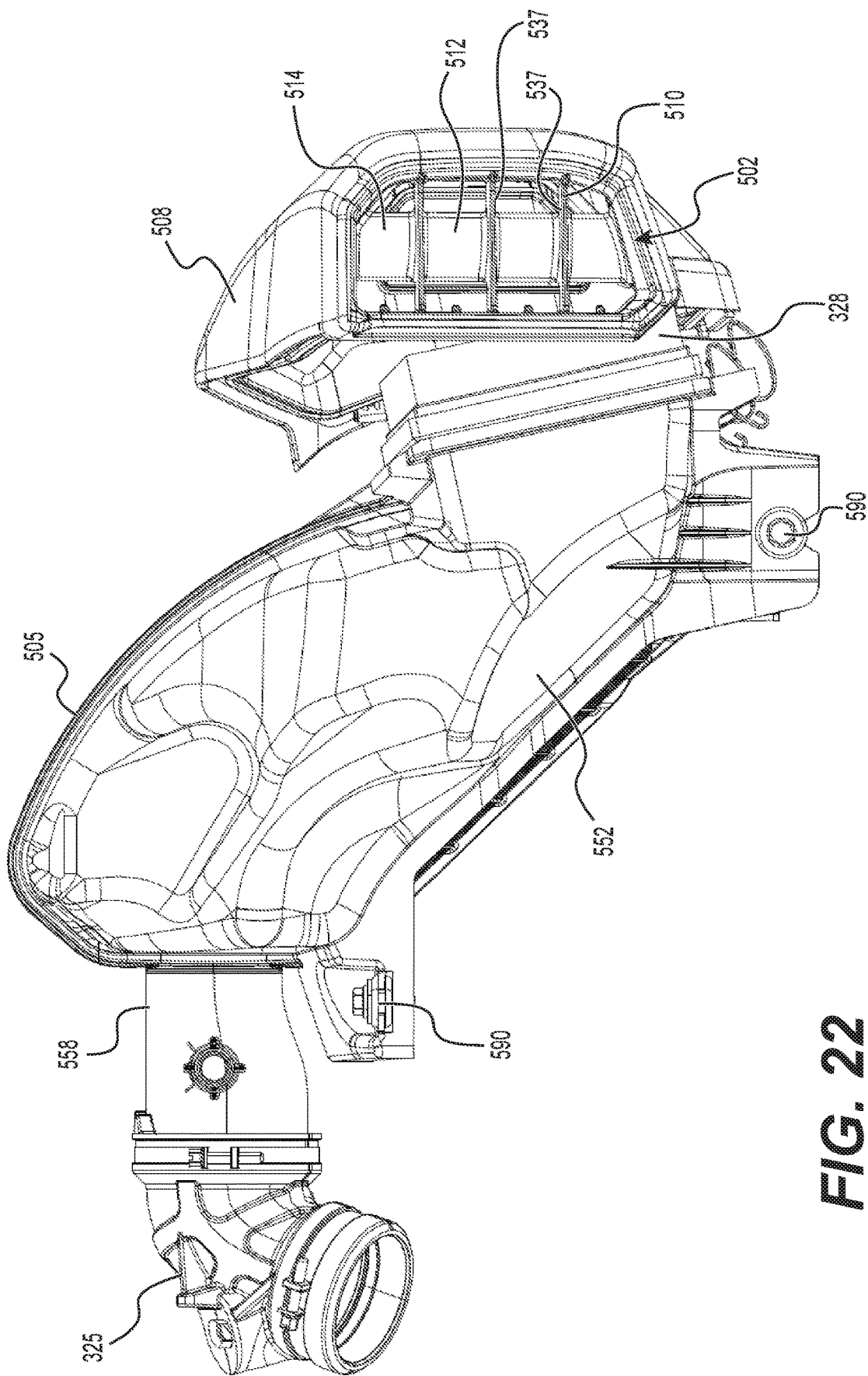
FIG. 22 is a front elevation view of the engine air intake system of FIG. 18 with a base member of an engine air conduit removed for clarity.
Figure 23:
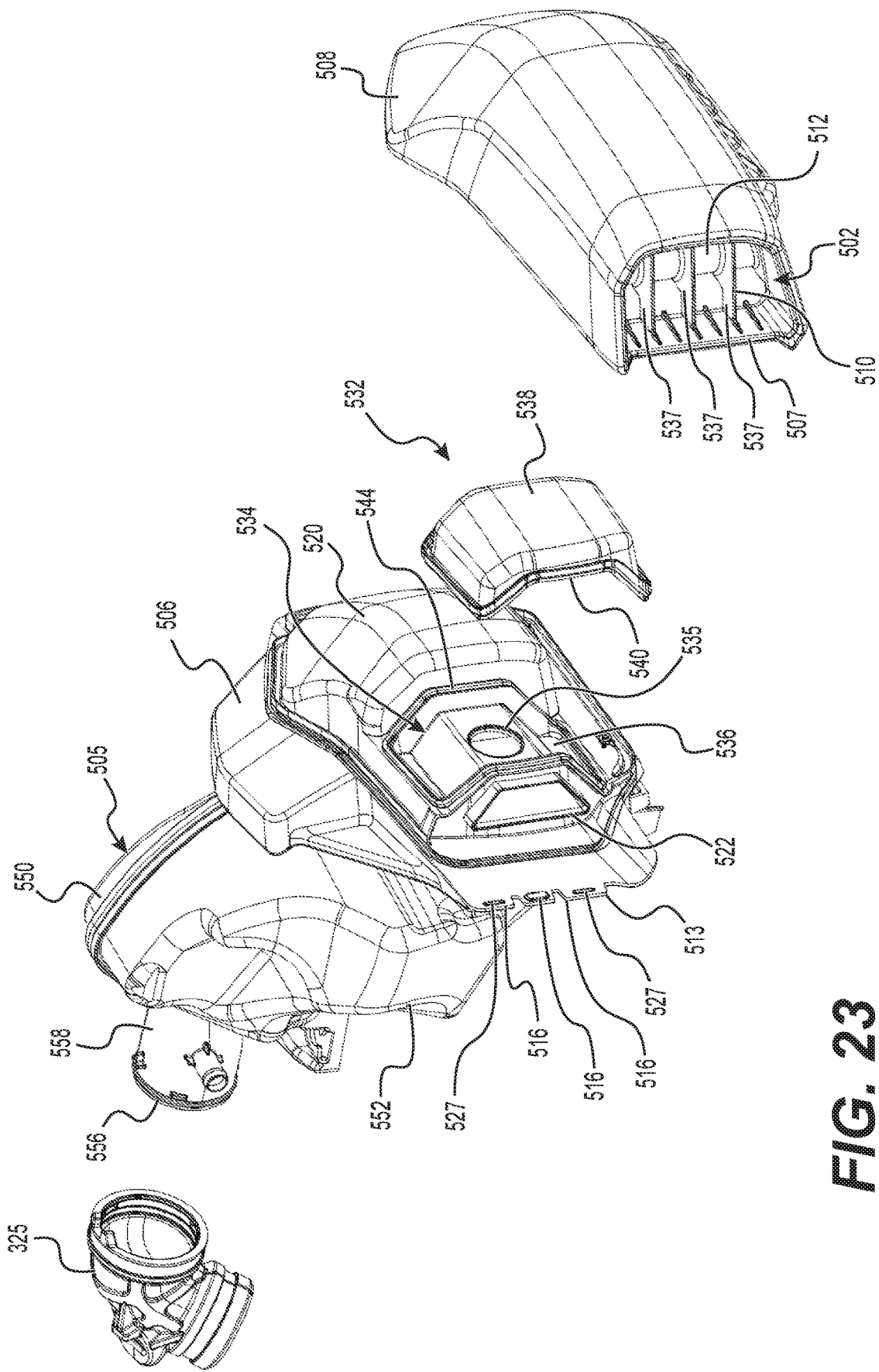
FIG. 23 is a partially exploded view, taken from a front, top and left side, of the engine air intake system of FIG. 18.

The outer cover 508 extends from a front end 507 defining the air inlet 502 to a rear end 509. The outer cover 508 has a convex outer side and a concave inner side facing laterally inward towards the base member 506. The outer cover 508 includes a grille 510 at the air inlet 502 to prevent oversized debris from entering the engine air intake system 120'. The grille 510 includes a plurality of generally horizontal slats 537 and a deflector 512 for removing at least some of the water entrained with air entering the engine air conduit 504. More specifically, while entering the air inlet 502, air deflects around the deflector 512. This deflecting causes at least some of the water entrained with the air to be separated from the air that will continue to flow toward the engine 30. As shown in FIGS. 22 and 23, in this implementation, the deflector 512 extends generally vertically and has a rounded surface 514 facing frontwardly for promoting the smooth deflection of air. The deflector 512 is spaced apart from the lateral walls defining the air inlet 502 to allow air to deflect around both sides of the deflector 512.

As mentioned above, in some implementations, the engine air intake system 120' could include a collector such as the collector 710 described above. For instance, such a collector could be connected to the deflector 512 or made integrally with the deflector 512.

Figure 24:
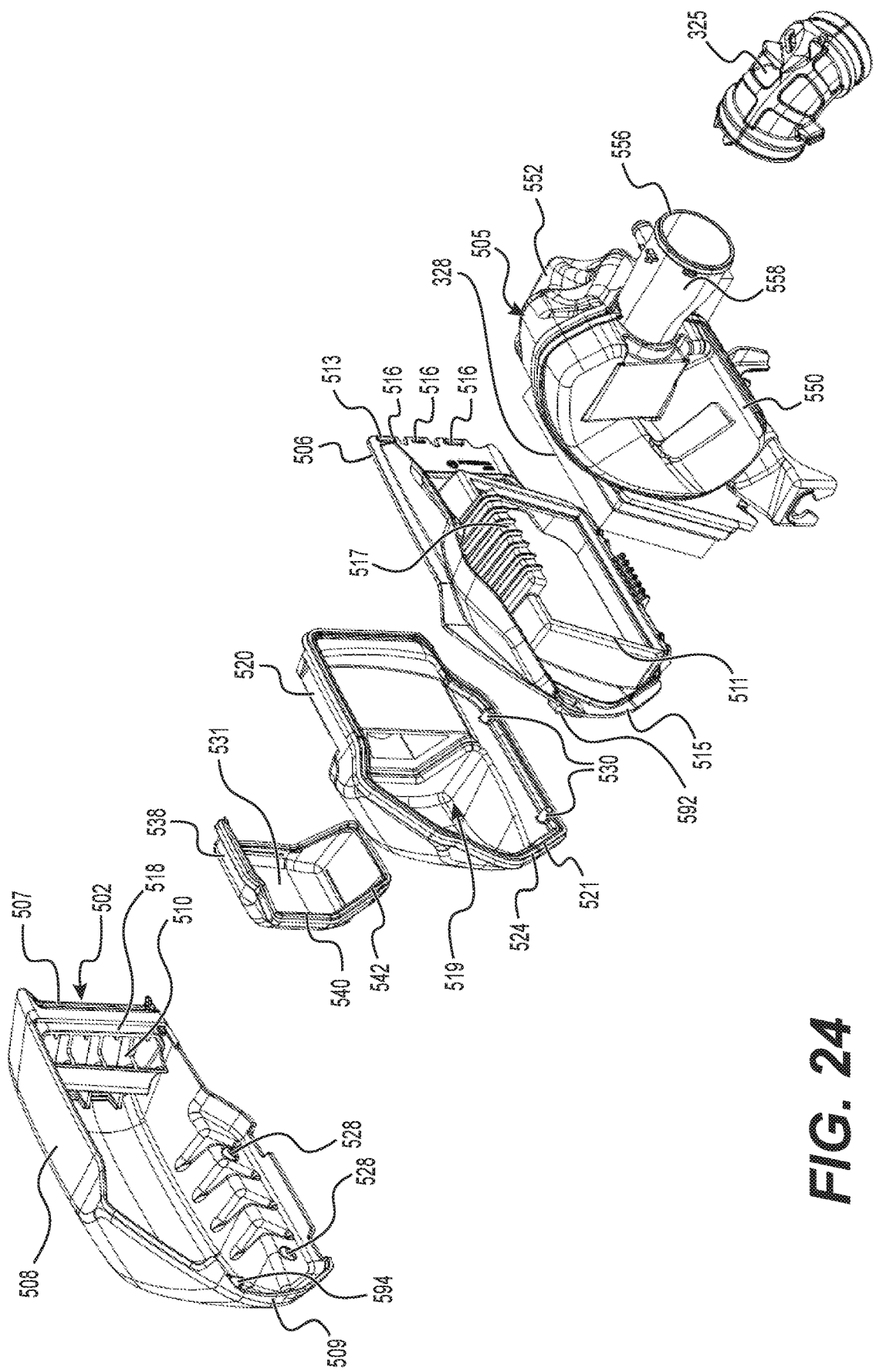
FIG. 24 is a partially exploded view, taken from a rear, top and right side, of the engine air intake system of FIG. 18.
Figure 25:
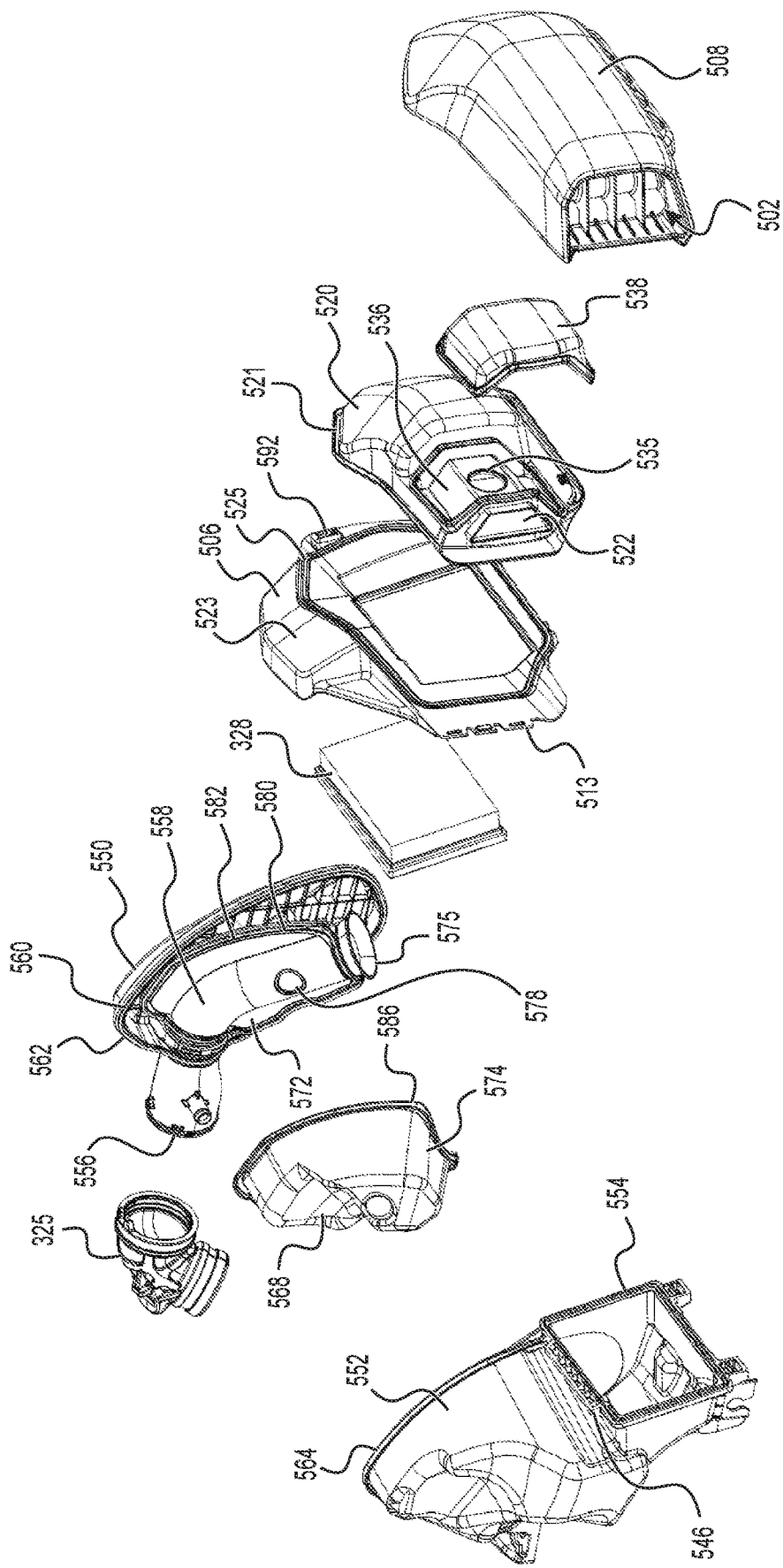
FIG. 25 is an exploded view, taken from a front, top and left side, of the engine air intake system of FIG. 18.

The base member 506 extends from a front end 513 to a rear end 515. The front end 513 of the base member 506 has tabs 516 for interlocking with the outer cover 508. More specifically, the front end 513 of the base member 506 is configured to be received in a groove 518 formed at the front end 507 of the outer cover 508 (FIG. 24). The tabs 516 are interlocked with projections (not shown) formed within the groove 518 via openings 527 provided on the tabs 516. In addition, as shown in FIGS. 24 and 25, the base member 506 has a clip base 592 adjacent the rear end 515 for receiving a clip 594 (partially shown in FIG. 24) protruding from an inner side of the outer cover 508. The clip 594 latches onto the clip base 592 for retaining a rear portion of the outer cover 508 to the base member 506. The air outlet 511 defined by the base member 506 is shaped to match a shape of the engine air filter 328. Notably, in this implementation, the air outlet 511 is generally rectangular. An engagement member 517 is provided at the air outlet 511 to engage the conduit 505 as will be described in more detail below.

Figure 21:
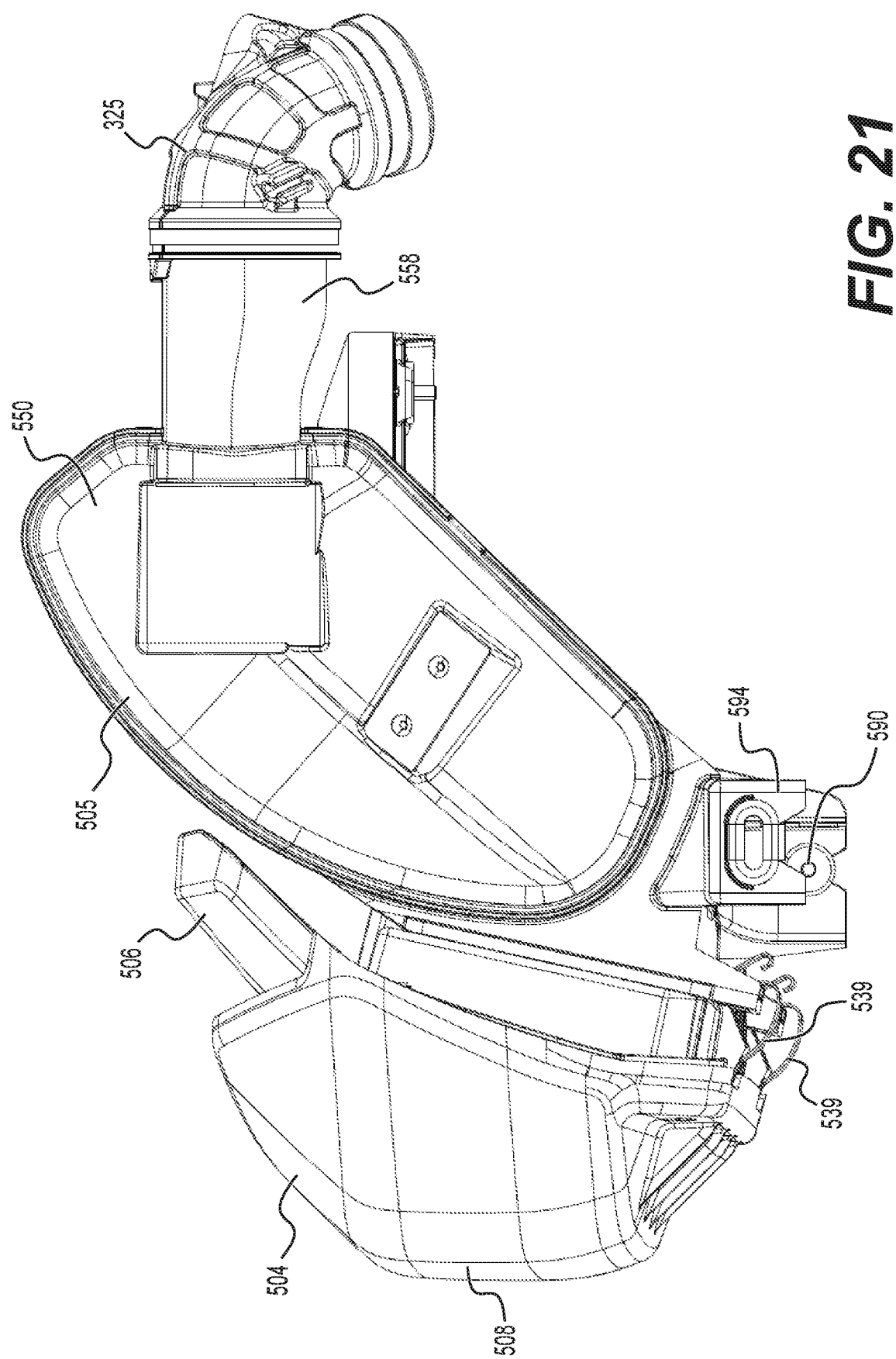
FIG. 21 is a rear elevation view of the engine air intake system of FIG. 18.

The base member 506 is removably connected to the conduit 505 via fasteners 539 (FIGS. 21, 29). In this implementation, the fasteners 539 are clips that are attached to a bottom edge of the base member 506. As will be discussed in more detail below, by detaching the clips 539 from the conduit 505, the base member 506 can be removed from engagement with the conduit 505.

As shown in FIGS. 23 and 24, the engine air conduit 504 also includes an inner conduit 520 enclosed between the base member 506 and the outer cover 508. The inner conduit 520 fluidly communicates the air inlet 502 to the air outlet 511. The inner conduit 520 defines an air inlet 522 for receiving air therein and an air outlet 519 adjacent the air outlet 511 of the base member 506. The inner conduit 520 has an inner peripheral edge 521 that is supported by the base member 506. More specifically, an outer surface 523 of the base member 506, facing the inner conduit 520, has a projecting edge 525 (FIG. 25). The projecting edge 525 is shaped and dimensioned to be received within a channel 524 at the inner peripheral edge 521 of the inner conduit 520 (FIG. 24). A sealing member (e.g. a gasket, such as an O-ring) may be provided at the inner peripheral edge 521 to ensure an air-tight seal between the inner conduit 520 and the base member 506.

Figure 20:
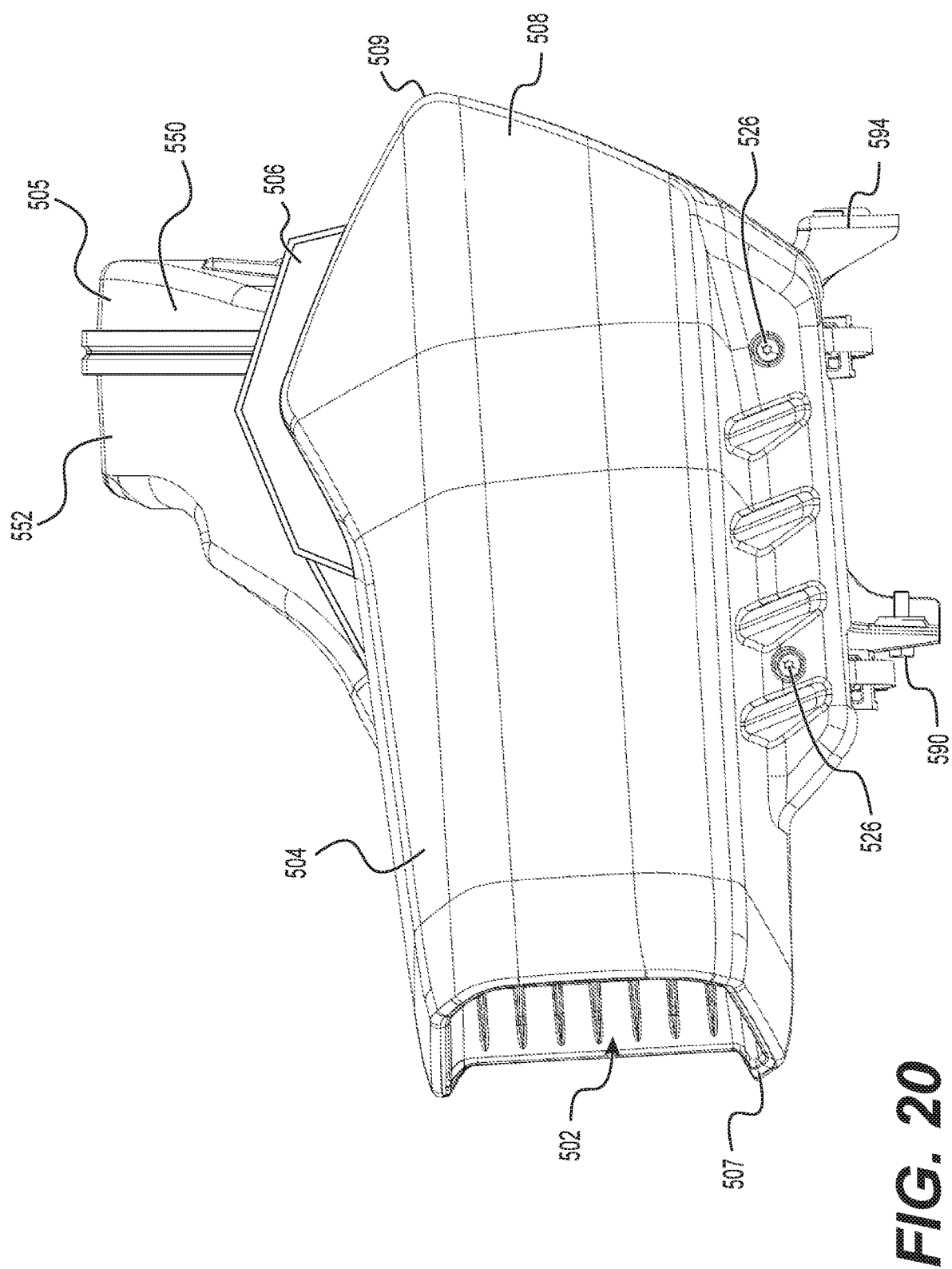
FIG. 20 is a left side elevation view of the engine air intake system of FIG. 18.

In use, the outer cover 508 is secured to the inner conduit 520 via fasteners 526 (FIG. 20). Notably, with particular reference to FIG. 24, in this implementation, the fasteners 526 are bolts that traverse openings 528 at a lower portion of the outer cover 508 to engage threaded apertures 530 at a lower portion of the base member 506.

Furthermore, in this implementation, the engine air conduit 504 includes a Helmholtz resonator 532 for attenuating sounds of a given band of frequencies. The Helmholtz resonator 532 is located on an outer side of the inner conduit 520. Notably, in this implementation, the resonator 532 includes a chamber 534 defined in part by a pocket 536 provided on the outer side of the inner conduit 520. The resonator 532 also includes a resonator cover 538 that is attached to the inner conduit 520 to cover the pocket 536 and thus defines the chamber 534 between the pocket 536 and an inner surface 531 of the resonator cover 538. The resonator cover 538 is disposed between the inner conduit 520 and the outer cover 508. An opening 535 defined in the pocket 536 of the inner conduit 520 fluidly communicates the air inlet 502 with the chamber 534. The chamber 534 has a specified volume that determines the band of frequencies that is attenuated by the Helmholtz resonator 532. In this implementation, a periphery 540 of the resonator cover 538 includes a projecting edge 542 (FIG. 24) that is received within a channel 544 (FIG. 23) surrounding the pocket 536. The resonator cover 538 is secured in place by an interlocking fit between the projecting edge 542 and the channel 544. In some cases, the resonator cover 538 may be secured in place merely by being abutted by the outer cover 508. In yet other cases, an adhesive may also secure the resonator cover 538 to the inner conduit 520.

Figure 16:
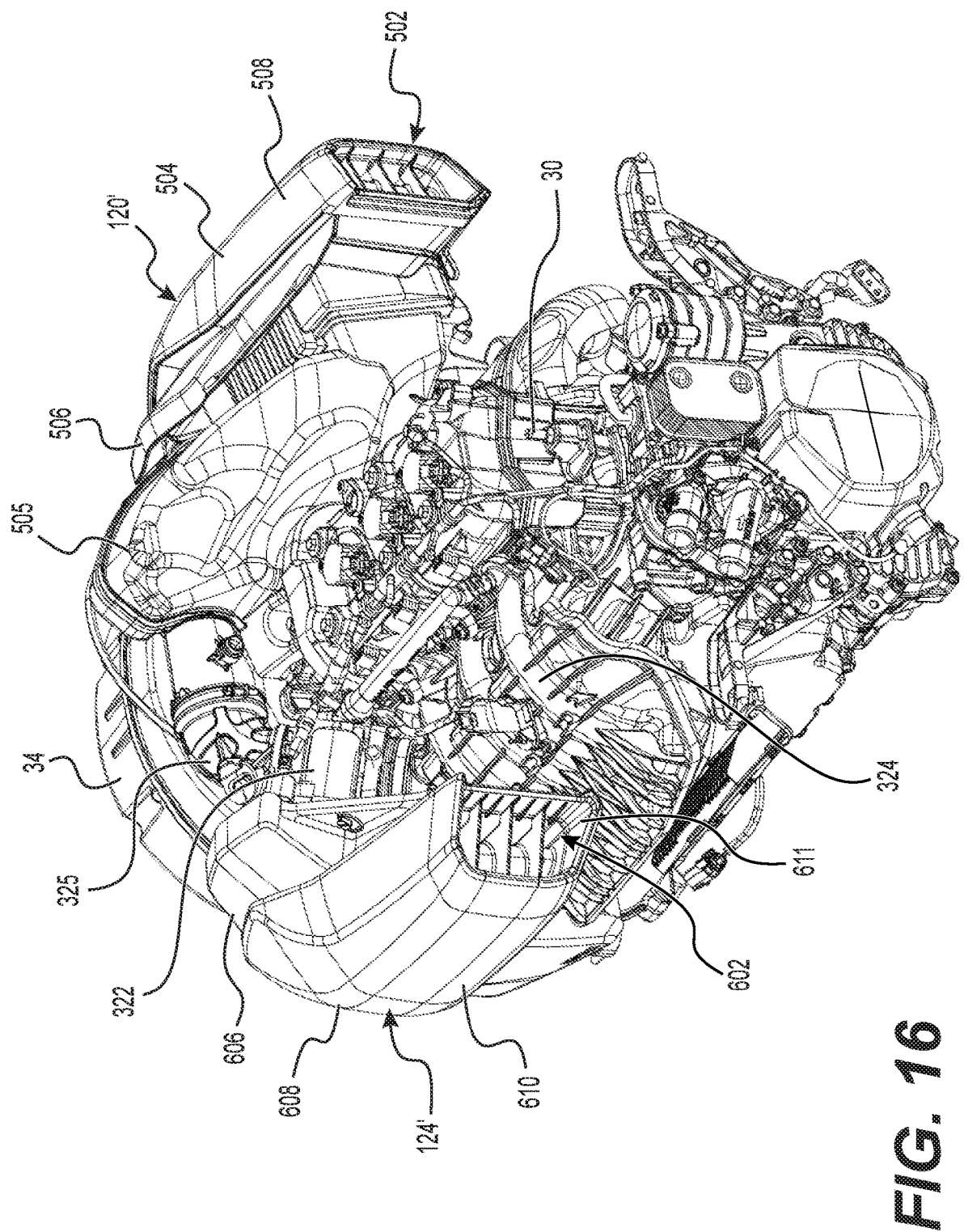
FIG. 16 is a perspective view, taken from a front, top, and right side of the engine, the CVT air intake system and the engine air intake system of the vehicle of FIG. 12.

The conduit 505 extends generally transversely and fluidly communicates the engine air conduit 504 to the engine air inlet 315. As shown in FIGS. 16 and 17, the conduit 505 is located in front of the CVT 34, above the transfer case 36 and extends laterally across the longitudinal centerplane 3 from the left side to the right side of the longitudinal centerplane 3.

Figure 26:
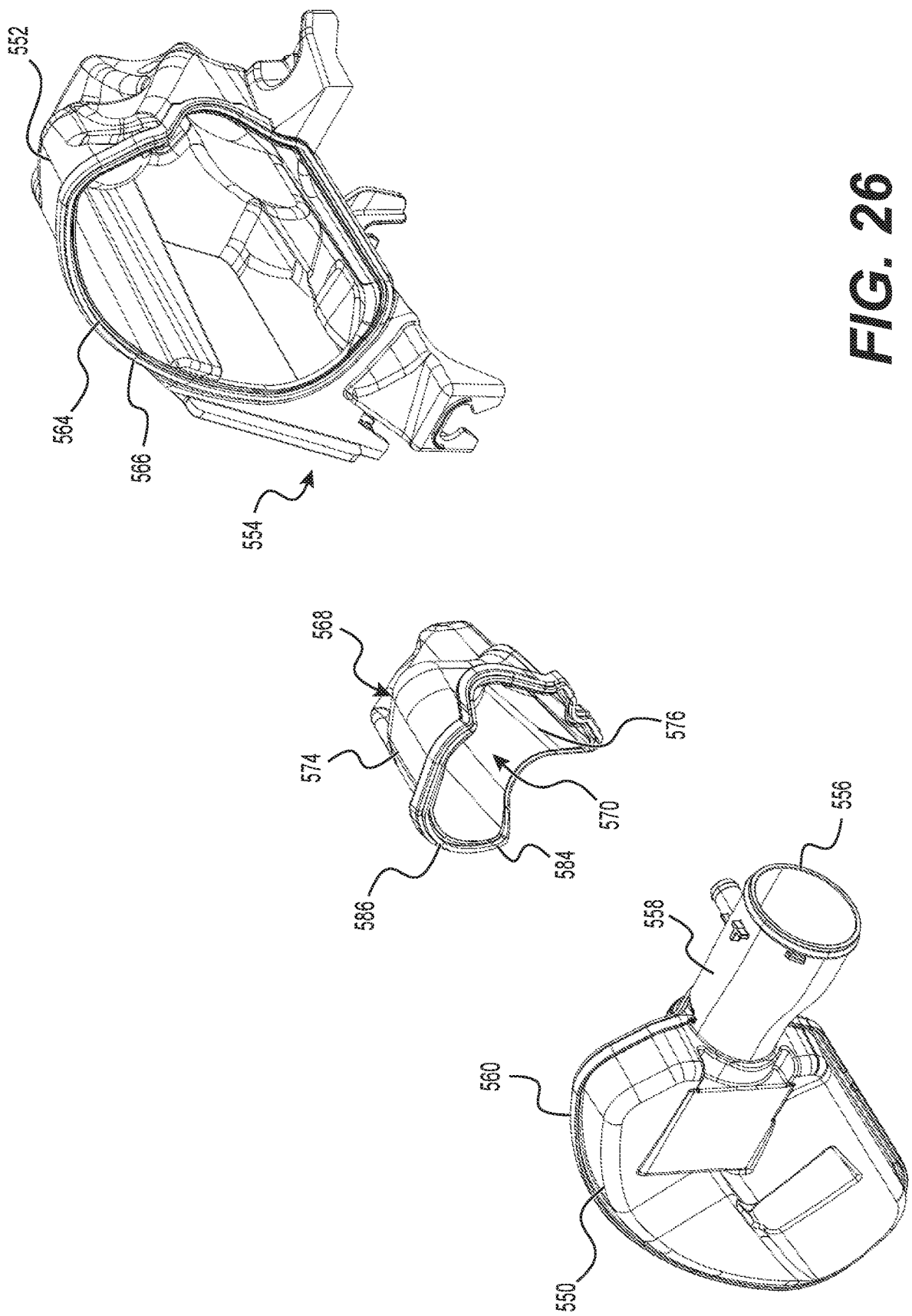
FIG. 26 is an exploded view, taken from a rear, top and right side, of a transversely-extending conduit of the engine air intake system of FIG. 18.
Figure 27:
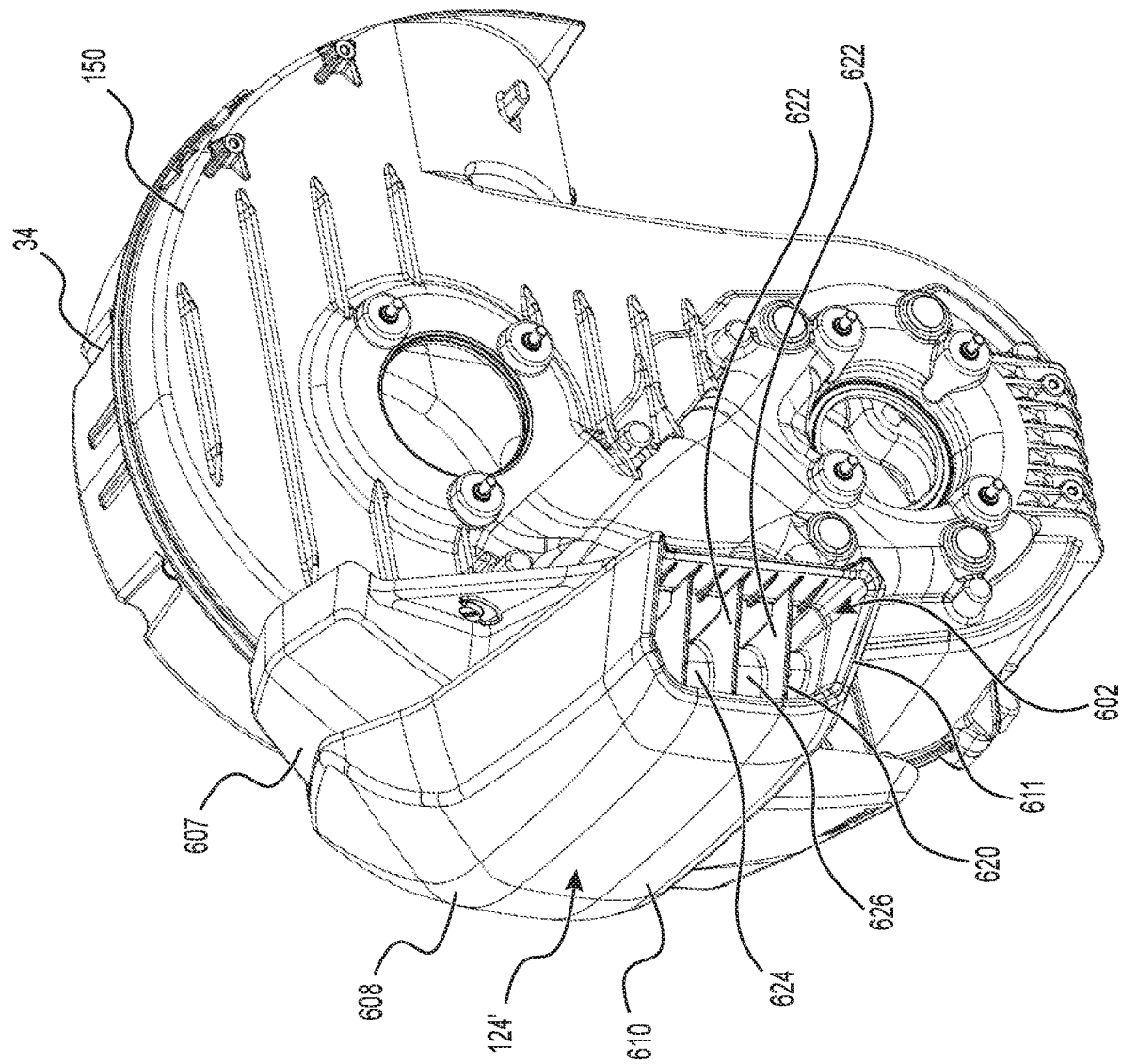
FIG. 27 is a perspective view, taken from a front, top and right side, of the CVT and the CVT air intake system of the vehicle of FIG. 12.
Figure 28:
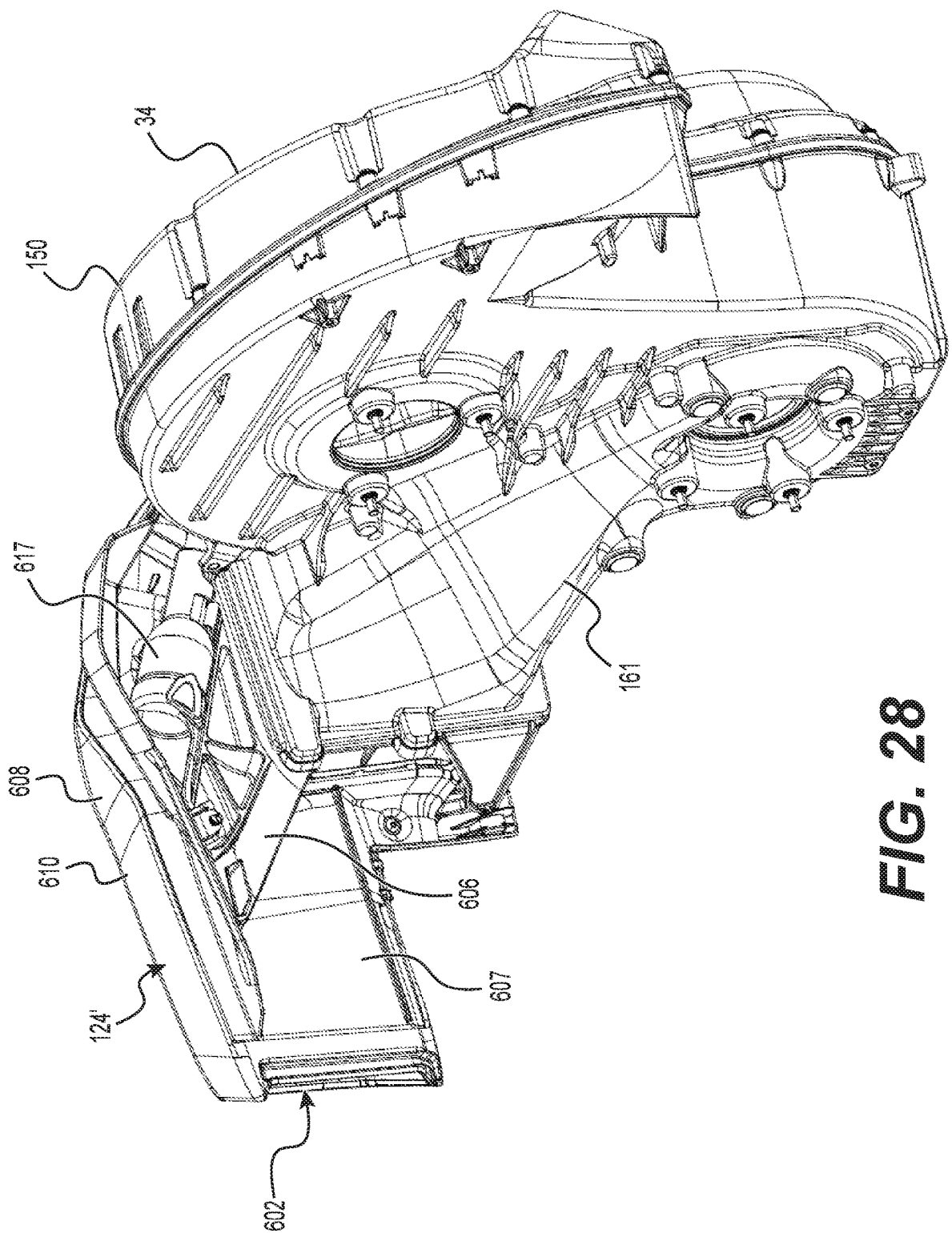
FIG. 28 is a perspective view, taken from a front, top, and left side, of the CVT and the CVT air intake system.

As shown in FIGS. 25 and 26, the conduit 505 includes a base member 550 and an outer cover 552 that is connectable to the base member 550. The outer cover 552 is fastened to the transfer case 36 via fasteners 590 (FIG. 22). Moreover, the outer cover 552 is fastened to the front cover 152 of the CVT housing 150 via a clip 594 (FIGS. 20, 21). The front cover 152 of the CVT housing 150 has a clip-receiving member (not shown) for receiving and latching onto the clip 594 and thus the outer cover 552. The outer cover 552 defines the air inlet 554 while a tubular passageway 558 (described in more detail below) defines an air outlet 556 of the conduit 505. The air inlet 554 and the base member 506 combine to support the engine air filter 328 such that the engine air filter 328 covers the air inlet 554 when installed. In particular, in this implementation, the air inlet 554 is generally rectangular to match a rectangular shape of the engine air filter 328. Moreover, a periphery of the air inlet 554 is smaller than a periphery of the engine air filter 328 to prevent the engine air filter 328 from entering the air inlet 554. A retaining protrusion 546 located at the top of the air inlet 554 is configured for engaging the engagement member 517 of the base member 506 when the base member 506 is attached to the conduit 505. More specifically, an underside of the engagement member 517 has a recess for receiving the retaining protrusion 546 therein. A sealing member (not shown), more particularly an O-ring, is provided around the air inlet 554. The outer cover 552 and the base member 506 are sized and shaped such that they compress the O-ring when assembled, thereby ensuring the seal around the engine air filter 328, although it will be appreciated that various alternative ways of ensuring a seal around the filter 328 are available.

In use, the engine air conduit 504 covers the engine air filter 328. However, as shown in FIGS. 29 and 30, the engine air conduit 504 is openable to access the engine air filter 328. More specifically, the engine air conduit 504 is selectively removable for providing access to the engine air filter 328. Notably, as shown in FIG. 21, the engine air conduit 504 can be detached by unfastening the clips 539 from a bottom edge of the outer cover 552 adjacent the air inlet 554. This permits access to the engine air filter 328 in order to visually inspect its condition and, if necessary, clean or replace it. The engine air conduit 504 is thus toollessly removable. In other implementations, the engine air conduit 504 may be pivotable between closed and open positions similarly to the CVT air conduit 610 discussed above. In addition, in some implementations, removing the engine air conduit 504 (or moving the engine air conduit 504 to its open position) may provide access to other engine components (e.g., a battery, a coolant reservoir, an oil filter, spark plugs, injectors, fuses or a diagnostic connector may be accessible).

As will be described in more detail below, the conduit 505 also includes a Helmholtz resonator 568 for attenuating sounds of a given band of frequencies, different from those attenuated by the Helmholtz resonator 532 described above. The Helmholtz resonator 568 includes a chamber 570 formed between a resonator cover 574 and the base member 550 and the tubular passageway 558 (FIG. 25). The resonator cover 574 is enclosed between the base member 550 and the outer cover 552. A volume is defined between the base member 550 and the outer cover 552 outside of the resonator cover 574. This volume can decrease the amount of noise emitted by the engine 30.

Returning to FIGS. 25 and 26, a tubular passageway 558 is connected to the base member 550 such that, when the conduit 505 is assembled, part of the tubular passageway 558 is enclosed between the base member 550 and the outer cover 552. The tubular passageway 558 is connected to an outer side of the base member 550 (e.g., via fasteners) and is fluidly connected to the air inlet 554. That is, air flows from the air inlet 554 into the volume defined between the base member 550 and the outer cover 552 outside of the resonator cover 574, into an inlet 575 of the tubular passageway 558, through the tubular passageway 558 and out through the air outlet 556 (which is the outlet of the tubular passageway 558). In this implementation, the tubular passageway 558 extends laterally and upwardly from the inlet 575 to the outlet 556. A peripheral edge 560 of the base member 550 includes a protrusion 562 extending continuously along a length of the peripheral edge 560. A channel 566 of an inwardly-facing peripheral edge 564 of the outer cover 552 is configured to receive the protrusion 562 therein. More specifically, an interlocking fit between the protrusion 562 and the channel 566 connects the outer cover 552 to the base member 550. Fasteners (e.g., bolts) may also be provided to additionally retain the outer cover 552 with the base member 550. Moreover, a sealing member (e.g., a gasket, such as an O-ring) may be provided at the inwardly-facing peripheral edge 564 to ensure an air-tight seal between the base member 550 and the outer cover 552.

The chamber 570 is defined in part by an outer surface 572 of the base member 550 and an inner surface 576 of the resonator cover 574. An opening 578 defined in the tubular passageway 558, fluidly communicates the air inlet 554 with the chamber 570. The chamber 570 has a specified volume that determines the band of frequencies that is attenuated by the Helmholtz resonator 568. Thus, in this implementation, the engine air intake system 120' includes a Helmholtz resonator upstream (the resonator 532) and downstream (the resonator 568) of the engine air filter 328.

The resonator cover 574 is secured to the base member 550 in a similar manner to the outer cover 552. Notably, the base member 550 includes an interior edge 580 surrounding the part of the outer surface 572 that defines the chamber 570. The interior edge 580 includes a protrusion 582 that extends continuously along a length of the interior edge 580. A channel 584 of a peripheral edge 586 of the resonator cover 574 is configured to receive the protrusion 582 therein. An interlocking fit between the protrusion 582 and the channel 584 connects the resonator cover 574 to the base member 550. Fasteners (e.g., bolts) may also be provided to additionally retain the resonator cover 574 with the base member 550. Moreover, a sealing member (e.g., a gasket, such as an O-ring) may be provided at the peripheral edge 586 to ensure an air-tight seal between the resonator cover 574 and the base member 550.

An air outlet of the conduit 505 includes an elbow 325 that is connected to the throttle body 322 which fluidly communicates the conduit 505 to the engine air inlet 315. More specifically, as described above, one end of the throttle body 322 (opposite the end connected to the elbow 325) is connected via the conduit 323 to the airbox 324. In turn, the airbox 324 fluidly communicates the throttle body 322 to the engine air inlet 315 of the engine 30 as described above. It is contemplated that the airbox 324 could be omitted from the engine air intake system 120' in other implementations. In such implementations, the throttle body 322 could be connected to the engine air inlet 315 via a manifold.

As shown in FIGS. 16 and 17, in this implementation, the outer cover 508 of the engine air conduit 504 is generally symmetrical to the outer cover 608 of the CVT air conduit 610 about the longitudinal centerplane 3. Notably, the air inlet 502 and the air inlet 602 are laterally and vertically symmetrical about the longitudinal centerplane 3. With additional reference to FIGS. 13 to 15, in this implementation, both the air inlets 502, 602 are located forwardly of the straddle seat 20 as well as forwardly of the handlebar 42. Moreover, the air inlets 502, 602 are positioned forwardly of the footrests 26 and vertically higher than the footrests 26. The air inlets 502, 602 are however positioned rearwardly of the front suspension assemblies 70. Moreover, as shown in FIG. 17, the engine 30 is disposed in part laterally between the engine air conduit 504 and the CVT air conduit 610.

The positioning of the engine air conduit 504 and the CVT air conduit 610 also cover a part of the engine 30. Notably, with reference to FIGS. 12 to 14, the engine air conduit 504 and the CVT air conduit 610 conceal upper and opposite lateral parts of the engine 30 from view. The vehicle 10" also includes panels for concealing other parts of the engine 30 and other components of the vehicle 10 as well as providing a more appealing aesthetic look of the vehicle 10". For instance, the vehicle 10" has a front panel 702 for concealing a front part of the engine 30, and engine panels 704, 706 for concealing a top part of the engine 30. The vehicle 10" also has lateral panels 708 on opposite lateral sides of the vehicle 10" for concealing a lower part of the engine 30. Other panels may also be provided for concealing other internal components of the vehicle 10".

In addition, the positioning of the engine air conduit 504 and the CVT air conduit 610 does not interfere with other components or driver ergonomics and does not reduce visibility or significantly raise the vehicle's center of gravity.

Exhaust System for Engine

The exhaust system 122 connected to the engine 30 will now be described with reference to FIGS. 1B and 4A.

Each cylinder 108 has an exhaust port 340 defined in the left side thereof. The exhaust system 122 includes an exhaust manifold 342 having three conduits 344. Each conduit 344 is connected to the exhaust port 340 of a corresponding cylinder and extends leftwardly and downwardly therefrom. The exhaust manifold 342 connects the exhaust ports 340 to an exhaust conduit 346 extending longitudinally and rearwardly from the exhaust manifold 342 to a muffler 350 disposed under the seat 20. In the illustrated implementation, the muffler 350 is laterally centered with respect to the longitudinal centerplane 3. The muffler 350 is aligned with the seat 20 in the lateral and longitudinal directions. Thus, there is an overlap between the seat 20 and the muffler 350 when viewed from a top or bottom. It is however contemplated that muffler 350 could not be aligned with the seat 20 in the lateral and/or longitudinal directions. It is contemplated that the muffler 350 could not be laterally centered with respect to the longitudinal centerplane 3. In the illustrated implementation of the vehicle 10, the driveshaft 38 is disposed vertically higher than the muffler 350 when the vehicle 10 is placed on level ground without any driver, passenger, and/or cargo.

The engine 30 is also connected to other systems and components which aid in the functioning of the engine 30.

As best seen in FIGS. 4C and 5D, the front end of the crankcase 102 has bolted thereto a magneto cover 372 for covering a magneto (not shown). The magneto (not shown) is connected to the front end of the crankshaft 31. As is known, the magneto produces electrical power while the engine 30 is running to power some of the engine systems (for example, the ignition and fuel injection systems) and vehicle systems (for example, lights and display gauges).

As best seen in FIGS. 5A and 5C, a starter motor 374 is disposed on a left side of the crankcase 102 and disposed below exhaust ports 340 of the cylinders 108. The exhaust manifold 342 extends downwardly on a left side of the starter motor 374. As is known, the starter motor 374 is an electrical motor operatively connected to the crankshaft 31 in order to initiate rotation of the crankshaft 31 and to thereby start operation of the engine 30.

With reference to FIG. 4C to 5D, the engine 30 has a lubrication system which includes an oil tank 360 connected to the engine 30 on the right side of the engine 30 below the airbox 324. The oil tank 360 is shaped such that it follows the contour of the cylinder block 104 and the crankcase 102. In the illustrated implementation of the engine 30, the oil tank 360 is defined by a cover bolted to the right side of the cylinder block 104. An oil filler neck 362, through which oil is poured to fill the oil tank 360, extends upwardly from the oil tank 360 in order to be easily accessible from above the engine 30. An oil cap 364 is used to selectively close the upper opening of the oil filler neck 362. The oil dipstick 615 (FIG. 27) extends from the oil cap 364 and can be used to determine the level of oil in the oil tank 360. As best seen in FIGS. 4C, 5A and 5D, an oil cooler 366 is connected to the front end of the cylinder block 104 just above the left side of the magneto cover 372. An oil filter housing 368 is also provided at the front end of the cylinder block 104 on the left side of the oil cooler 366. As the name suggests, the oil filter housing 368 houses the oil filter (not shown). The oil filter housing 368 has a removable cap provided at the top thereof to allow for easy access to the oil filter for maintenance and replacement thereof.

The oil in the lubrication system is cooled by a water cooling system including a water pump 370 located at the front end of the cylinder block 104 on a right side of the oil cooler 366.

Other details regarding the engine 30 can be found in United States Patent Application Publication No. 2009/0007878, published on Jan. 8, 2009, and European Patent Application Publication No. 2348201 A1, published on Jul. 27, 2011, the entirety of which are incorporated herein by reference.

The configuration of the vehicle 10 provides a center of gravity positioned at a low and longitudinally forward position compared to other straddle-seat vehicles. The generally vertically oriented inline configuration of the engine 30, the generally vertically oriented CVT 34, the generally vertically oriented transfer case 36, and their longitudinal arrangement allows the vehicle 10 to have a slim profile in the lateral direction. The slim lateral direction profile allows the driver to ride in a foot-forward stance. The narrow lateral direction profile and the lower center of gravity of the vehicle 10 also provide are also dynamically advantageous for three-wheeled straddle-seat vehicles.

Family of Vehicles

The above described vehicle 10 is a member of a family of vehicles.

With reference to FIGS. 6A to 9B, another member 10' of the family of vehicles will now be described.

The vehicle 10' has many features that correspond to features of the vehicle 10 above. Corresponding and similar features of the vehicles 10 and 10' have been labeled with the same reference numbers and will not be described again herein in detail. Features of the vehicle 10' that are different from corresponding features of the vehicle 10 described above have been labeled with the same reference number followed by an apostrophe. The vehicle 10' will only be discussed in detail with regard to the differences from the vehicle 10.

The vehicle 10 and 10' have the same vehicle frames 12, wheels 14, 16, suspension assemblies 70, 80 and steering assembly 40.

A powertrain 100' of the vehicle 10' includes an engine 30' which is similar to the engine 30 except that the engine 30' has one cylinder 108 fewer than the engine 30. The engine 30' is an inline two cylinder engine 30', including a front cylinder 108 and a rear cylinder 108, instead of the inline three cylinder engine 30 of the vehicle 10. The engine 30' is mounted to the vehicle frame 12 such that the rear cylinder 108 of the engine 30' is in the same location as the rearmost cylinder 108 of the engine 30 in the vehicle 10, and the front cylinder 108 of the engine 30' is in the same location as the middle cylinder 108 in the vehicle 10. In the illustrated implementation, the cylinder axis 110 of the rear cylinder 108 of the engine 30' is in the same longitudinal position as the cylinder axis 110 of the rearmost cylinder 108 of the engine 30 in the vehicle 10, and the cylinder axis 110 of the front cylinder 108 of the engine 30' is in the same longitudinal position as the middle cylinder 108 in the vehicle 10. A forward portion of the front cylinder 108 of the engine 30' extends forward of the front wheel plane 18 as can be seen best in FIG. 7B.

It is contemplated that the engine 30' could be mounted to the vehicle frame 12 such that the front cylinder 108 of the engine 30' is in the same location as the front cylinder 108 of the engine 30 in the vehicle 10, and the rear cylinder 108 of the engine 30' is in the same location as the middle cylinder 108 in the vehicle 10. In the illustrated implementation, the cylinder axis 110 of the front cylinder 108 of the engine 30' is in the same longitudinal position as the cylinder axis 110 of the front cylinder 108 of the engine 30 in the vehicle 10, and the cylinder axis 110 of the rear cylinder 108 of the engine 30' is in the same longitudinal position as the middle cylinder 108 in the vehicle 10.

It is also contemplated that the engine 30' could have one cylinder 108 instead of two cylinders 108 as shown herein.

The vehicle 10' has a transfer case 36' that is different from the transfer case 36 of the vehicle 10. The transfer case housing 140 is the same in the respective transfer cases, 36 and 36', in both of the vehicles 10 and 10'. The transfer case housing 140 is mounted to the vehicle frame 12 in the same manner in both vehicles 10 and 10'. In the vehicle 10' however, the gear ratio defined by the input sprocket (not shown) and the output sprocket (not shown) of the transfer case 36' is different than the gear ratio defined by the input sprocket 170 and output sprocket 172 of the transfer case 36 in the vehicle 10. Thus, one or both of the input and output sprockets of the transfer case 36' could be different from the corresponding sprocket 170, 172 in the transfer case 36.

In the illustrated implementation of the vehicle 10', the exhaust manifold 342' is different from the exhaust manifold 342 connected to the engine 30. The exhaust manifold 342' has two conduits 344 corresponding to the two cylinders 108 of the engine 30'.

Similarly, the fuel rail (not shown) of the vehicle 10' is configured for connecting to two cylinders 108 rather than three cylinders 108 and is thus different from the fuel rail 216 of the vehicle 10.

In the illustrated implementation of the vehicle 10', the airbox 324 is identical to the airbox 324 of the engine 30 in the vehicle 10. In the vehicle 10' however, the forwardmost outlets of the airbox 324 is plugged while in the vehicle 10, the forwardmost outlet of the airbox 324 is connected to the third cylinder 108 of the engine 30. Using the same airbox 324 for both engines 30, 30' allows for a reduction in the number of different types of parts that need to be manufactured and stocked for the assembly of the vehicle 10, 10', thereby ultimately leading to an increase in efficiency and cost savings of assembly and/or manufacture. It is however contemplated that a different airbox could be used in the vehicle 10' than in the vehicle 10. The vehicle 10' could have an airbox having two outlets corresponding to the two cylinders of the engine 30' instead of the airbox 324 with three outlets used for the three-cylinder engine 30 of the vehicle 10.

Since the engine 30' is smaller than the engine 30, the oil tank 360 which is formed integrally with the engine 30' is smaller than the oil tank 360 formed integrally with the engine 30. The starter motor 374' of the vehicle 10' is also less powerful than the starter motor 374 in the vehicle 10. In the illustrated implementation of the vehicle 10 and 10', some of the components connected to the engine 30' are however identical to the corresponding components connected to the engine 30. For example, the magneto, the water pump 370, the oil cooler 366, and oil filter housing 368 are identical in the vehicles 10 and 10'. It is also contemplated that any of the magneto, the water pump 370, the oil cooler 366, and oil filter housing 368 used in the vehicle 10' could be different from the corresponding component used in the vehicle 10.

Components connected to the front of the engine 30' such as the magneto, the water pump 370, the oil cooler 366, and oil filter housing 368 are disposed in the same relative location with respect to the front cylinder 108 of the engine 30' as with the respect to forwardmost cylinder 108 of the engine 30. The respective locations of these components with respect to the vehicle frame 12 is thus different in the vehicle 10' compared to the vehicle 10. Relative to the vehicle frame 12, the position of each of these components, has been displaced longitudinally rearwardly in the vehicle 10' compared with their corresponding position in the vehicle 10' as can be seen in FIGS. 6A to 8B.

Figure 7A:
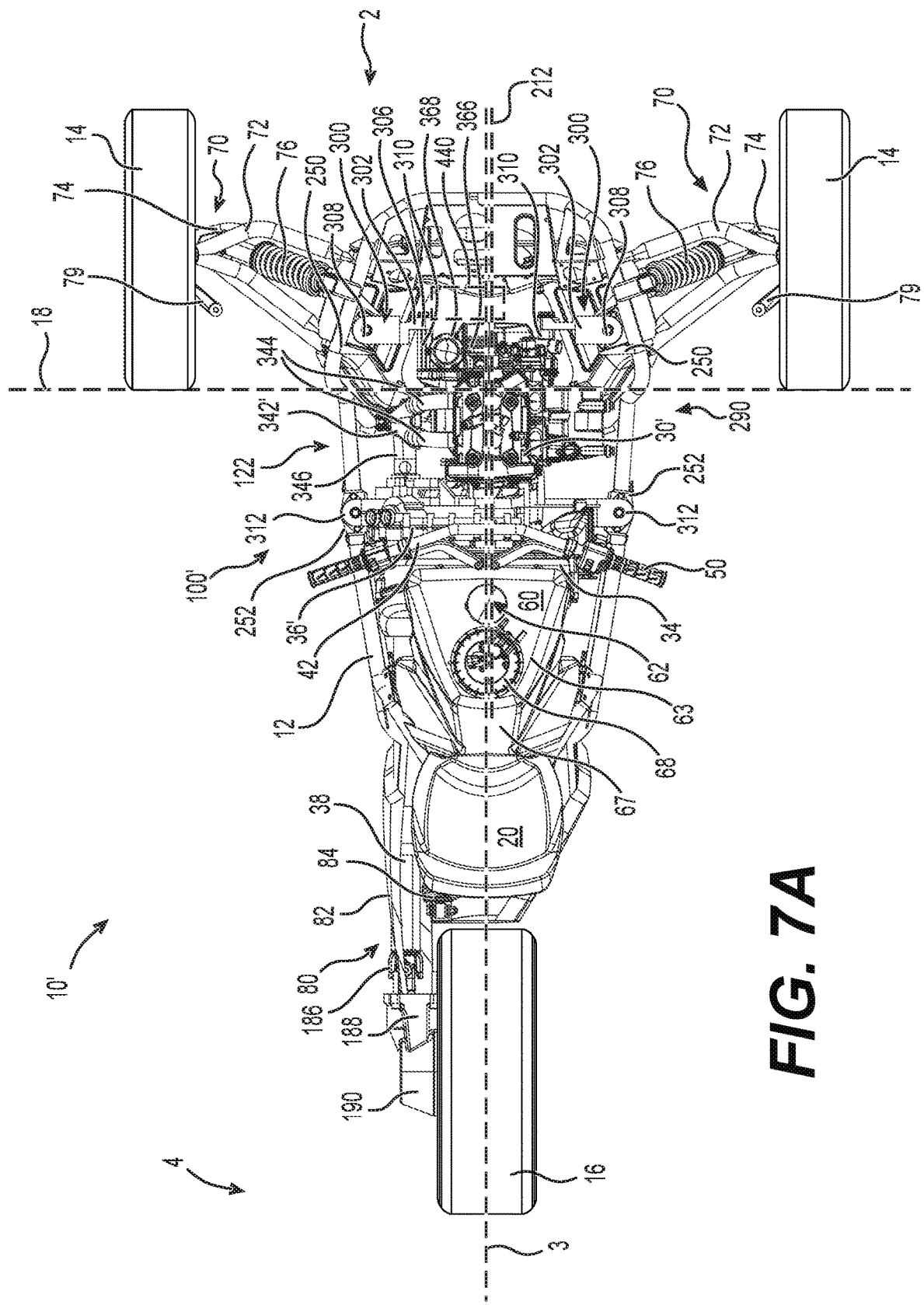
FIG. 7A is a top plan view of the vehicle of FIG. 6A with a portion of the steering assembly being removed for clarity.
Figure 7B:
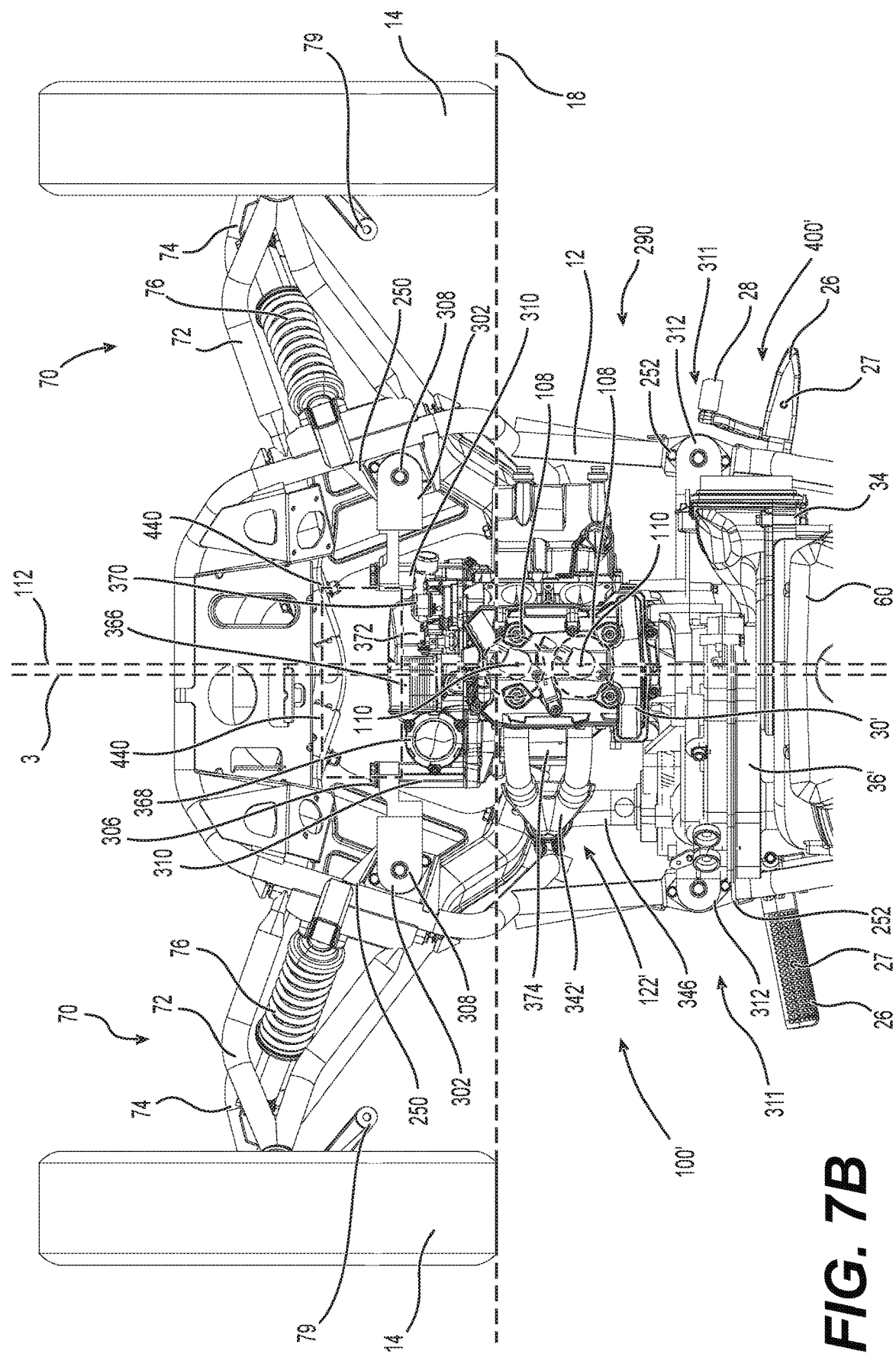
FIG. 7B is a close-up top plan view of the front portion of the vehicle of FIG. 7A.
Figure 8A:
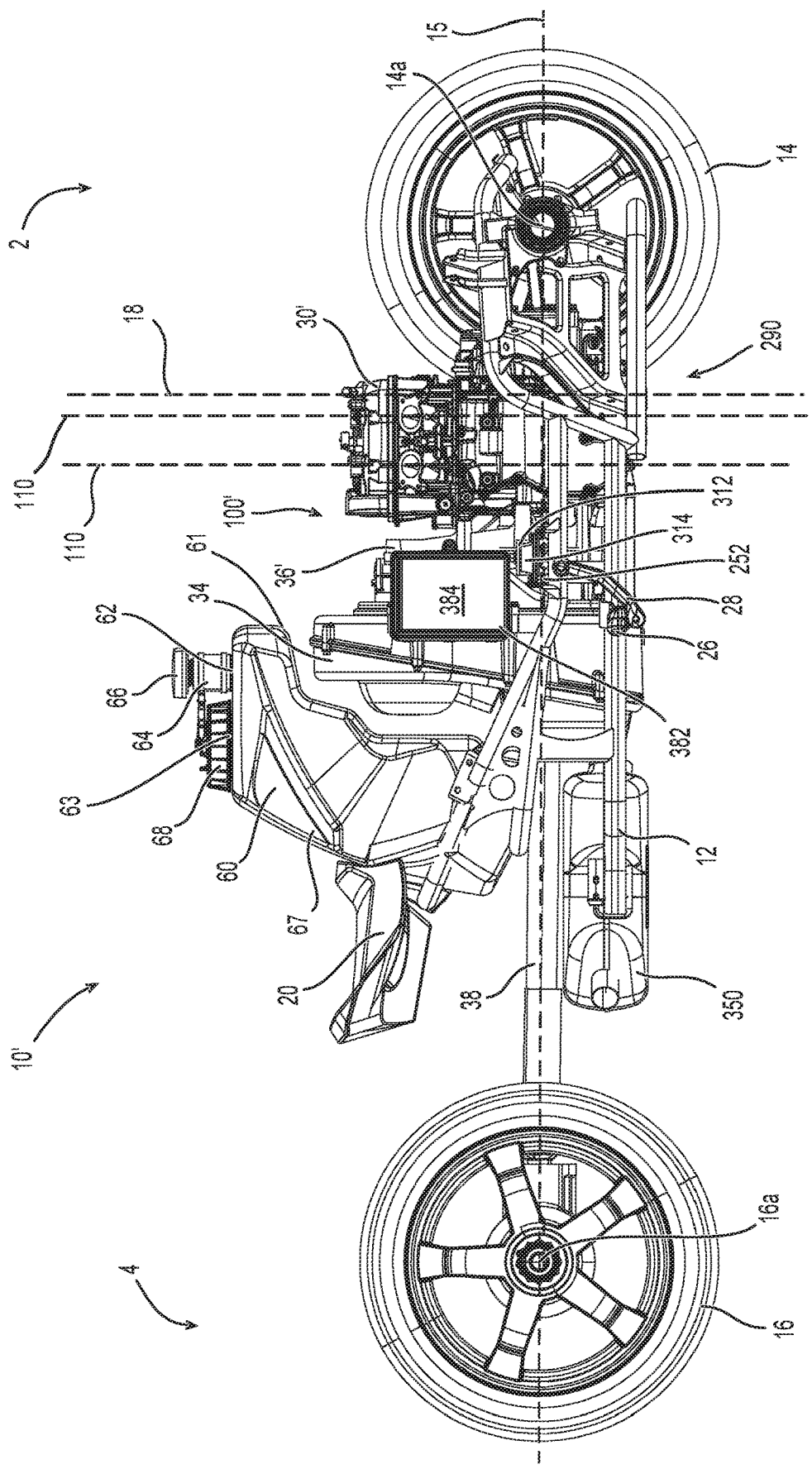
FIG. 8A is right side elevation view of the vehicle of FIG. 6A with the right front wheel, steering assembly and the front left and right suspension assemblies being removed for clarity.
Figure 8B:
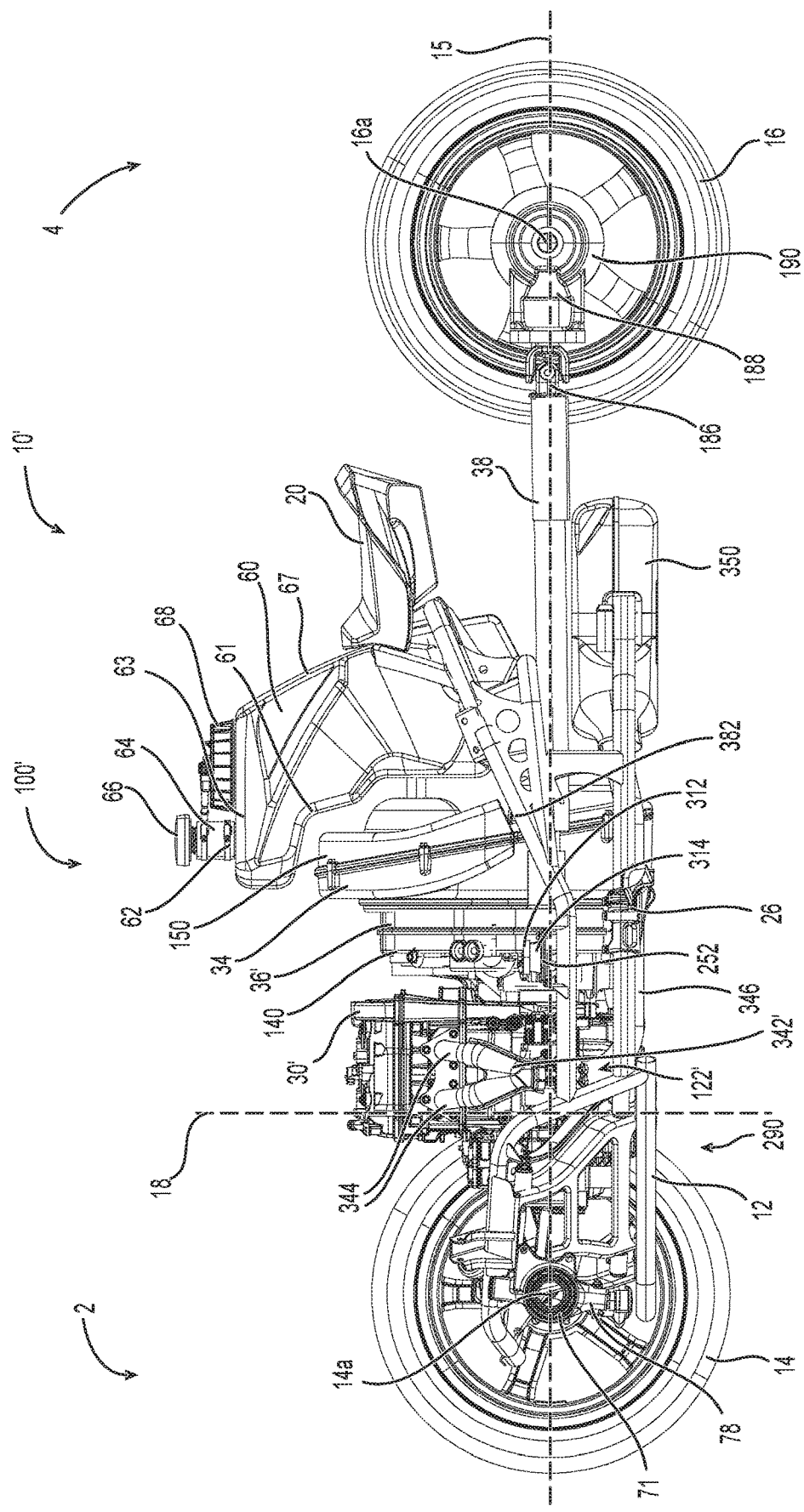
FIG. 8B is left side elevation view of the vehicle of FIG. 6A with the left front wheel, steering assembly and the front left and right suspension assemblies being removed for clarity.
Figure 9A:
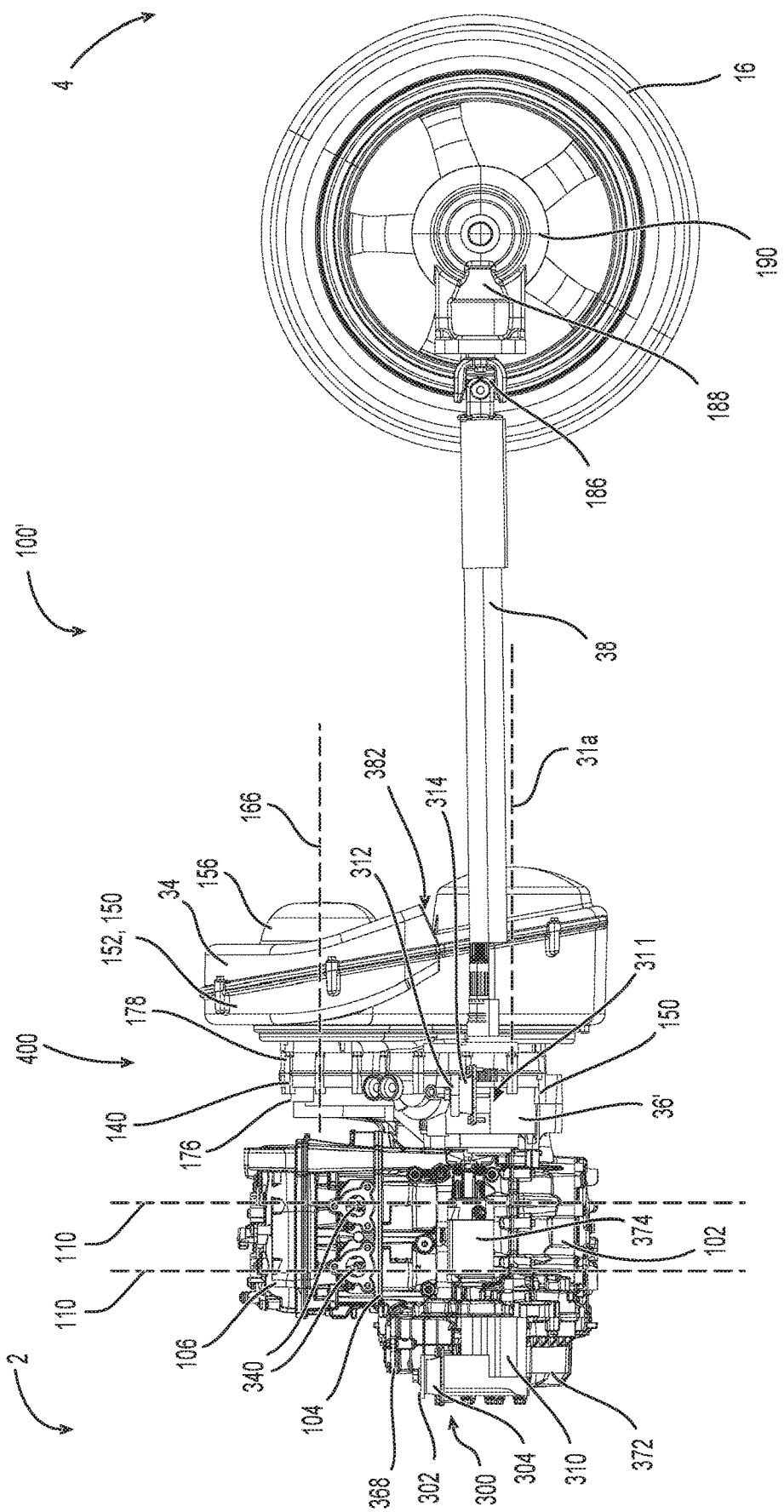
FIG. 9A is a left side elevation view of the powertrain, engine mounting assemblies, and rear wheel of the vehicle of FIG. 6A.
Figure 9B:
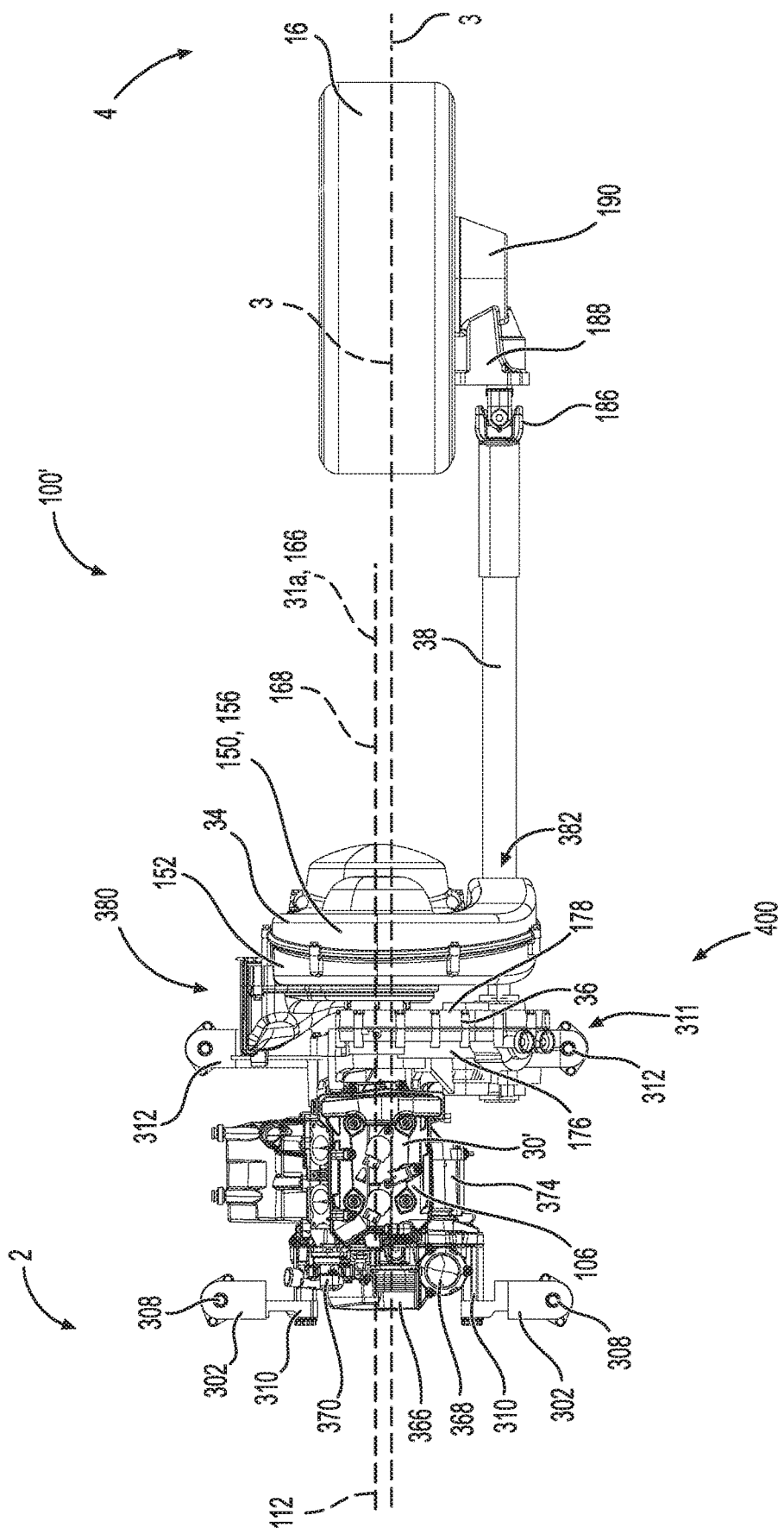
FIG. 9B is a top plan view of the powertrain, engine mounting assemblies, and rear wheel of FIG. 9A.

Since, in the illustrated implementation, the front of the engine 30' is disposed longitudinally rearwardly with respect to the engine mounting brackets 250, the engine 30' is mounted to the engine mounting brackets 250 using spacers 310 in addition to the brackets 302 of the mounting assembly 300 as can be seen best in FIG. 7B. A right spacer 310 has throughholes (not shown) corresponding to the right boltholes (not shown for the engine 30' but identical to the right boltholes 130 of the engine 30) of the engine 30' and the vertical flange of the bracket 302 of the right mounting assembly 300. As can be seen in FIG. 7B, engine bolts 306 are inserted through the vertical flange of the bracket 302, and through the right spacer 310 into the right boltholes disposed in the front of the engine 30' to connect the engine 30' to the vehicle frame 12.

Since the engine cradle 290 is dimensioned to house the larger engine 30, the engine cradle 290 (FIGS. 7A and 7B) has a space 440 in front of the engine 30' when the engine 30' is mounted in the engine cradle 290.

A left spacer 310, similar to the right spacer 310, has throughholes corresponding to the left boltholes (not shown for the engine 30' but identical to the left boltholes 130 of the engine 30) of the engine 30' and the vertical flange of the bracket 302 of the left mounting assembly 300. The left spacer 310 is used to connect the left side of the front of the engine 30' to the vehicle frame similarly as the right spacer 310 described above.

It is contemplated that the front of the engine 30' could be disposed in the same longitudinal position with respect to the engine mounting brackets 250 as the front of the engine 30'. In this case, it is contemplated that a spacer could be used to mount the transfer case housing 140 to each bracket 252. It is also contemplated that the CVT housing 150 and/or a rear portion of the engine 30' could be secured to the vehicle frame 12 instead of, or in addition to, the transfer case housing 140.

It is contemplated that the family of vehicles could have more than two members. All of the members of the family of vehicles are assembled using the same vehicle frame 12. In general, at least one member of the family of vehicles is assembled using a corresponding engine that is different from the engine used to assemble at least one other member of the family of vehicles. Thus the family of vehicles includes at least a first member (vehicle 10) with a first engine 30 and a second member (vehicle 10') with a second engine 30'. The engines 30, 30' of the first and second member have a different number of cylinders 108, but each engine 30, 30' is arranged in the corresponding vehicle 10, 10' in an inline configuration with the cylinder plane 112 extending generally vertically and longitudinally.

In general, individual components of the powertrain 100, 100' of each vehicle 10, 10' of the family of vehicles could be different from the corresponding components of the powertrain 100, 100' of another member 10, 10' of the family of vehicles. However, in each member 10, 10' of the family of vehicles, the components of the powertrain 100, 100' are arranged in the same configuration relative to other components of the powertrain 100, 100'. Thus, in each member 10, 10' of the family of vehicles, the engine 30, 30' is disposed longitudinally forward of the seat 20 and the transmission assembly 400 is disposed longitudinally rearward of the engine 30, 30' and longitudinally forward of the seat 20.

The manufacture and assembly of a family of vehicles including a plurality of members 10, 10' is made more efficient by using components that are common to more than one member 10, 10' of the family of vehicles. As will be understood, the use of common components also leads to a reduction in the numbers of parts that need to be manufactured which could result in a reduction in manufacturing costs.

Modifications and improvements to the above-described implementations of the present vehicle may become apparent to those skilled in the art. The foregoing description is intended to be exemplary rather than limiting. The scope of the present technology is therefore intended to be limited solely by the scope of the appended claims.

What is claimed is:

1. An air intake system for a vehicle, comprising:
   a conduit comprising an internal wall forming an air passage, the internal wall having a top, a bottom, a first lateral side and a second lateral side, the conduit defining a conduit inlet for receiving air into the air passage and a conduit outlet for discharging air from the air passage;
   a deflector connected to the conduit and disposed within the air passage, the deflector having a convex surface facing the conduit inlet, the deflector having a first lateral end and a second lateral end, the first lateral end being spaced apart from the first lateral side of the internal wall, the first lateral end being closer to the first lateral side than the second lateral side; and
   a collector connected to the deflector and positioned to collect at least some moisture from air flowing past the deflector, the collector defining a channel extending generally vertically, the channel being defined by:
      a collection surface generally facing the conduit inlet, at least part of the collection surface extending laterally from the first lateral end of the deflector towards the first lateral side of the internal wall; and
      a limiting surface extending from the collection surface towards the conduit inlet, the collection surface being at least partially laterally between the limiting surface and the first lateral end of the deflector.

2. The air intake system of claim 1, wherein the collection surface of the collector is planar.

3. The air intake system of claim 1, wherein the collection surface extends from the top to the bottom of the deflector.

4. The air intake system of claim 2, wherein the limiting surface is substantially perpendicular to the collection surface.

5. The air intake system of claim 1, wherein the deflector has a concave surface opposite the convex surface.

6. The air intake system of claim 1, wherein the collector is fastened to the deflector.

7. The air intake system of claim 6, wherein at least part of the collector is disposed longitudinally between the deflector and the conduit outlet.

8. The air intake system of claim 1, wherein the collector is made integrally with the deflector.

9. The air intake system of claim 1, wherein the deflector is made integrally with the conduit.

10. The air intake system of claim 1, wherein a ratio of a width of the collection surface over a width of the convex surface is between 0.8 and 1.2 inclusively.

11. The air intake system of claim 1, wherein the second lateral end is spaced apart from the second lateral side of the internal wall.

12. The air intake system of claim 1, wherein the deflector extends from the top to the bottom of the internal wall.

13. The air intake system of claim 1, wherein:
   the first lateral end of the deflector is a first lateral end of the convex surface; and
   the second lateral end of the deflector is a second lateral end of the convex surface.

14. The air intake system of claim 1, wherein:
   the channel is a first channel;
   the collection surface is a first collection surface;
   the limiting surface is a first limiting surface;
   the collector defining a second channel extending generally vertically; and
   the second channel is defined by:
      a second collection surface generally facing the conduit inlet, at least part of the second collection surface extending laterally from the second lateral end of the deflector towards the second lateral side of the internal wall; and
      a second limiting surface extending from the second collection surface towards the conduit inlet, the second collection surface being at least partially laterally between the second limiting surface and the second lateral end of the deflector.

15. The air intake system of claim 14, wherein:
   the collector has an intermediate portion extending laterally between the first channel and the second channel; and the intermediate portion of the collector is fastened to the deflector.

16. The air intake system of claim 1, further comprising a filter disposed longitudinally between the collector and the conduit outlet.

17. The air intake system of claim 1, wherein the conduit comprises at least one drainage hole for draining moisture collected by the collector from the air passage.

18. The air intake system of claim 1, further comprising a lateral wall disposed downstream of the deflector and extending within the air passage, the lateral wall defining at least in part an opening substantially laterally aligned with the deflector.

19. A vehicle, comprising:
   a frame;
   a plurality of ground-engaging members;
   a steering assembly operatively connected to at least one ground-engaging member of the plurality of ground-engaging members for steering the vehicle;
   at least one of:
      an internal combustion engine supported by the frame, the engine defining an engine air inlet for receiving air therein; and
      a continuously variable transmission (CVT) operatively connecting the engine to at least one of the plurality of ground-engaging members, the CVT defining a CVT air inlet for receiving air therein;
   an air intake system fluidly communicating with the at least one of: (i) the engine air inlet for providing air to the engine, or (ii) the CVT air inlet for providing air to the CVT, the air intake system comprising:
      a conduit comprising an internal wall forming an air passage, the internal wall having a top, a bottom, a left side and a right side, the conduit defining a conduit inlet for receiving air into the air passage and a conduit outlet for discharging air from the air passage;
      a deflector connected to the conduit and disposed within the air passage, the deflector having a convex surface facing the conduit inlet, the deflector having a left end and a right end, at least one of the left and right ends of the deflector being spaced apart from a corresponding one of the left and right sides of the internal wall; and
      a collector connected to the deflector and positioned to collect at least some moisture from air flowing past the deflector, the collector defining a channel extending generally vertically, the channel being defined by:
         a collection surface generally facing the conduit inlet, at least part of the collection surface extending laterally from the at least one of the left and right ends of the deflector towards the corresponding one of the left and right sides of the internal wall; and
         a limiting surface extending forwardly from the collection surface towards the conduit inlet, the collection surface being at least partially laterally between the limiting surface and the at least one of the left and right ends of the deflector.

20. The vehicle of claim 19, wherein the conduit inlet faces generally forwardly.

* * * * *